US012617674B2

(12) United States Patent
Mankin et al.

(10) Patent No.: US 12,617,674 B2
(45) Date of Patent: May 5, 2026

(54) PYROLYSIS AND COMBUSTION CONTROL IN PYROLYSIS REACTORS, AND ASSOCIATED SYSTEMS AND METHODS

(71) Applicant: Modern Hydrogen, Inc., Woodinville, WA (US)

(72) Inventors: Max Nathan Mankin, Shoreline, WA (US); Mahdi Mahdi, Shoreline, WA (US); Patrick D. Noble, Seattle, WA (US); Peter Jeremy Scherpelz, Seattle, WA (US); Raghul Manosh Kumar, Bothell, WA (US); Daniel Kraemer, Mukilteo, WA (US); Vikram Seshadri, Bothell, WA (US)

(73) Assignee: Modern Hydrogen, Inc., Woodinville, WA (US)

( * ) Notice: Subject to any disclaimer, the term of this patent is extended or adjusted under 35 U.S.C. 154(b) by 0 days.

(21) Appl. No.: 18/926,203

(22) Filed: Oct. 24, 2024

(65) Prior Publication Data

US 2025/0128942 A1 Apr. 24, 2025

Related U.S. Application Data

(60) Provisional application No. 63/592,904, filed on Oct. 24, 2023.

(51) Int. Cl.
*C01B 3/24* (2006.01)
*F23C 3/00* (2006.01)
(Continued)

(52) U.S. Cl.
CPC ............... *C01B 3/24* (2013.01); *F23C 3/002* (2013.01); *F23C 5/08* (2013.01); *F23C 6/02* (2013.01);
(Continued)

(58) Field of Classification Search
CPC .............. C01B 3/24; C01B 2203/0816; C01B 2203/0822; C01B 2203/1235;
(Continued)

(56) References Cited

U.S. PATENT DOCUMENTS

| | | | |
|---|---|---|---|
| 3,312,840 A | 4/1967 | Gabor | |
| 3,460,524 A | 8/1969 | Lazaridis | |

(Continued)

FOREIGN PATENT DOCUMENTS

| | | | |
|---|---|---|---|
| CN | 106854127 A | 6/2017 | |
| CN | 209508163 U | 10/2019 | |

(Continued)

OTHER PUBLICATIONS

Lohse-Busch et al., "Technology Assessment of a Fuel Cell Vehicle: 2017 Toyota Mirai" , Argonne National Laboratory, Report# ANL/ESD-18/12, Jun. 2018, pp. 80.

(Continued)

*Primary Examiner* — Avinash A Savani
(74) *Attorney, Agent, or Firm* — Fredrikson & Byron, P.A.

(57) ABSTRACT

A pyrolysis system for conducting a hydrocarbon pyrolysis reaction and related systems and methods are disclosed herein. In some embodiments, the pyrolysis system includes a combustion component, a reaction chamber thermally coupled to the combustion component, and a recycling component fluidly coupled to an output of the reaction chamber. The reaction chamber can be couplable to a supply of pyrolysis feedstock. The thermal coupling allows the reaction chamber to transfer heat from the combustion component to the pyrolysis feedstock to generate a product stream that includes hydrogen gas and solid carbon. The recycling component receives the product stream and can direct a portion of the product stream into the combustion (Continued)

component. In some embodiments, the pyrolysis system includes a controller configured to adjust various operational parameters of the pyrolysis system based on various goals for combustion fuel consumption, hydrogen gas output, energy consumption, reactor efficiency, and/or the like.

15 Claims, 28 Drawing Sheets

(51) Int. Cl.

| | |
|---|---|
| *F23C 5/08* | (2006.01) |
| *F23C 6/02* | (2006.01) |
| *F23C 7/00* | (2006.01) |
| *F23D 14/24* | (2006.01) |

(52) U.S. Cl.
CPC .............. *F23C 7/004* (2013.01); *F23D 14/24* (2013.01); *C01B 2203/0816* (2013.01); *C01B 2203/0822* (2013.01); *C01B 2203/1235* (2013.01); *C01B 2203/1614* (2013.01); *C01B 2203/1695* (2013.01); *F23C 2700/04* (2013.01)

(58) Field of Classification Search
CPC ..... C01B 2203/1614; C01B 2203/1695; F23C 3/002; F23C 5/08; F23C 6/02; F23C 7/004; F23C 2700/04; F23D 14/24
USPC ........................................................ 431/5, 18
See application file for complete search history.

(56) References Cited

U.S. PATENT DOCUMENTS

| | | | | |
|---|---|---|---|---|
| 4,797,091 | A | | 1/1989 | Neumann |
| 4,884,555 | A | | 12/1989 | Huang |
| 5,101,633 | A | | 4/1992 | Keller et al. |
| 5,407,347 | A | | 4/1995 | Bortz |
| 5,470,224 | A | | 11/1995 | Bortz |
| 5,589,599 | A | * | 12/1996 | McMullen .............. C10B 53/00 |
| | | | | 210/769 |
| 5,797,356 | A | | 8/1998 | Khizh |
| 5,938,427 | A | | 8/1999 | Suzuki et al. |
| 6,036,480 | A | | 3/2000 | Hughes et al. |
| 6,412,282 | B1 | | 7/2002 | Willis |
| 7,007,477 | B2 | | 3/2006 | Widener |
| 7,537,623 | B2 | | 5/2009 | Etievant et al. |
| 8,312,722 | B2 | | 11/2012 | York et al. |
| 9,212,058 | B2 | | 12/2015 | De Graffenried, Sr. |
| 9,406,957 | B2 | | 8/2016 | Jackson et al. |
| 10,787,362 | B2 | | 9/2020 | De Graffenried, Sr. |
| 11,826,749 | B2 | | 11/2023 | Pannala et al. |
| 11,897,768 | B2 | | 2/2024 | Radaelli et al. |
| 2002/0007594 | A1 | | 1/2002 | Muradov |
| 2008/0147241 | A1 | * | 6/2008 | Tsangaris ............... C10K 1/101 |
| | | | | 700/273 |
| 2009/0260286 | A1 | * | 10/2009 | Sasauchi .................... C10J 3/24 |
| | | | | 48/89 |
| 2010/0035103 | A1 | | 2/2010 | Jackson et al. |
| 2010/0043291 | A1 | | 2/2010 | Ljunggren |
| 2010/0175639 | A1 | | 7/2010 | Al-Dawood et al. |
| 2010/0244336 | A1 | | 9/2010 | Cain et al. |
| 2013/0213256 | A1 | | 8/2013 | Mcalister |
| 2017/0159930 | A1 | * | 6/2017 | Lin ........................ H10N 10/13 |
| 2020/0294779 | A1 | | 9/2020 | Wood et al. |
| 2021/0380407 | A1 | | 12/2021 | Goyal et al. |
| 2022/0315424 | A1 | | 10/2022 | Radaelli et al. |
| 2022/0387952 | A1 | | 12/2022 | Mahdi et al. |
| 2023/0003381 | A1 | | 1/2023 | Mueller-Hagedorn et al. |
| 2024/0217815 | A1 | | 7/2024 | Radaelli et al. |
| 2025/0189120 | A1 | | 6/2025 | Kraemer et al. |

FOREIGN PATENT DOCUMENTS

| | | |
|---|---|---|
| CN | 112390227 A | 2/2021 |
| EP | 317110 A2 | 5/1989 |
| JP | 2002543033 A | 12/2002 |
| JP | 2019200996 A | 11/2019 |
| WO | 9958614 A1 | 11/1999 |
| WO | 02057395 A1 | 7/2002 |
| WO | 2009014980 A2 | 1/2009 |
| WO | 2010127961 A1 | 11/2010 |
| WO | 2019226416 A1 | 11/2019 |
| WO | 2021102521 A1 | 6/2021 |
| WO | 2021247768 A2 | 12/2021 |

OTHER PUBLICATIONS

International Search Report and Written Opinion for International Patent Application No. PCT/US2024/052825, mailed Apr. 3, 2025, 10 pages.

* cited by examiner

400

| Feedstock | | | Customer goal: optimize... | | | Operation | |
|---|---|---|---|---|---|---|---|
| Low cost electricity | Low CI electricity | Low cost gas | $/kg H2 | CI of H2 | $/kg H2 AND CI of H2 (in some TBD ratio) | Shift toward gas-driven energy input | Shift toward electricity-driven energy input |
| 1 | 0 | 0 | 1 | 0 | 0 | 0 | 1 |
| 1 | 0 | 0 | 0 | 1 | 0 | 1 | 0 |
| 1 | 0 | 0 | 0 | 0 | 1 | 1 | 1 |
| 0 | 1 | 0 | 1 | 0 | 0 | 1 | 0 |
| 0 | 1 | 0 | 0 | 1 | 0 | 0 | 1 |
| 0 | 1 | 0 | 0 | 0 | 1 | 1 | 1 |
| 1 | 1 | 0 | 1 | 0 | 0 | 0 | 1 |
| 1 | 1 | 0 | 0 | 1 | 0 | 0 | 1 |
| 1 | 1 | 0 | 0 | 0 | 1 | 0 | 0 |
| 0 | 0 | 1 | 1 | 0 | 0 | 1 | 0 |
| 0 | 0 | 1 | 0 | 1 | 0 | 1 | 0 |
| 0 | 0 | 1 | 0 | 0 | 1 | 0 | 0 |
| 1 | 1 | 1 | 1 | 0 | 0 | 1 | 1 |
| 1 | 1 | 1 | 0 | 1 | 0 | 1 | 1 |
| 1 | 1 | 1 | 0 | 0 | 1 | 1 | 1 |

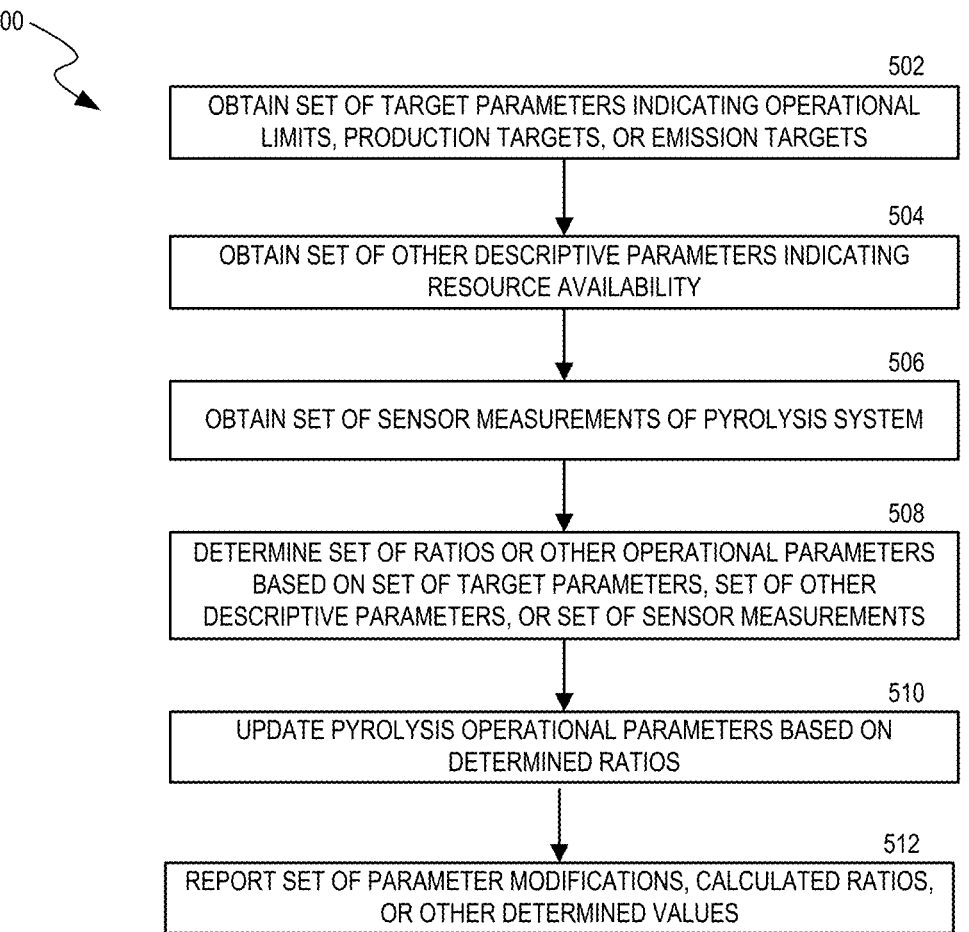

500

502
OBTAIN SET OF TARGET PARAMETERS INDICATING OPERATIONAL LIMITS, PRODUCTION TARGETS, OR EMISSION TARGETS

504
OBTAIN SET OF OTHER DESCRIPTIVE PARAMETERS INDICATING RESOURCE AVAILABILITY

506
OBTAIN SET OF SENSOR MEASUREMENTS OF PYROLYSIS SYSTEM

508
DETERMINE SET OF RATIOS OR OTHER OPERATIONAL PARAMETERS BASED ON SET OF TARGET PARAMETERS, SET OF OTHER DESCRIPTIVE PARAMETERS, OR SET OF SENSOR MEASUREMENTS

510
UPDATE PYROLYSIS OPERATIONAL PARAMETERS BASED ON DETERMINED RATIOS

512
REPORT SET OF PARAMETER MODIFICATIONS, CALCULATED RATIOS, OR OTHER DETERMINED VALUES

FIG. 5

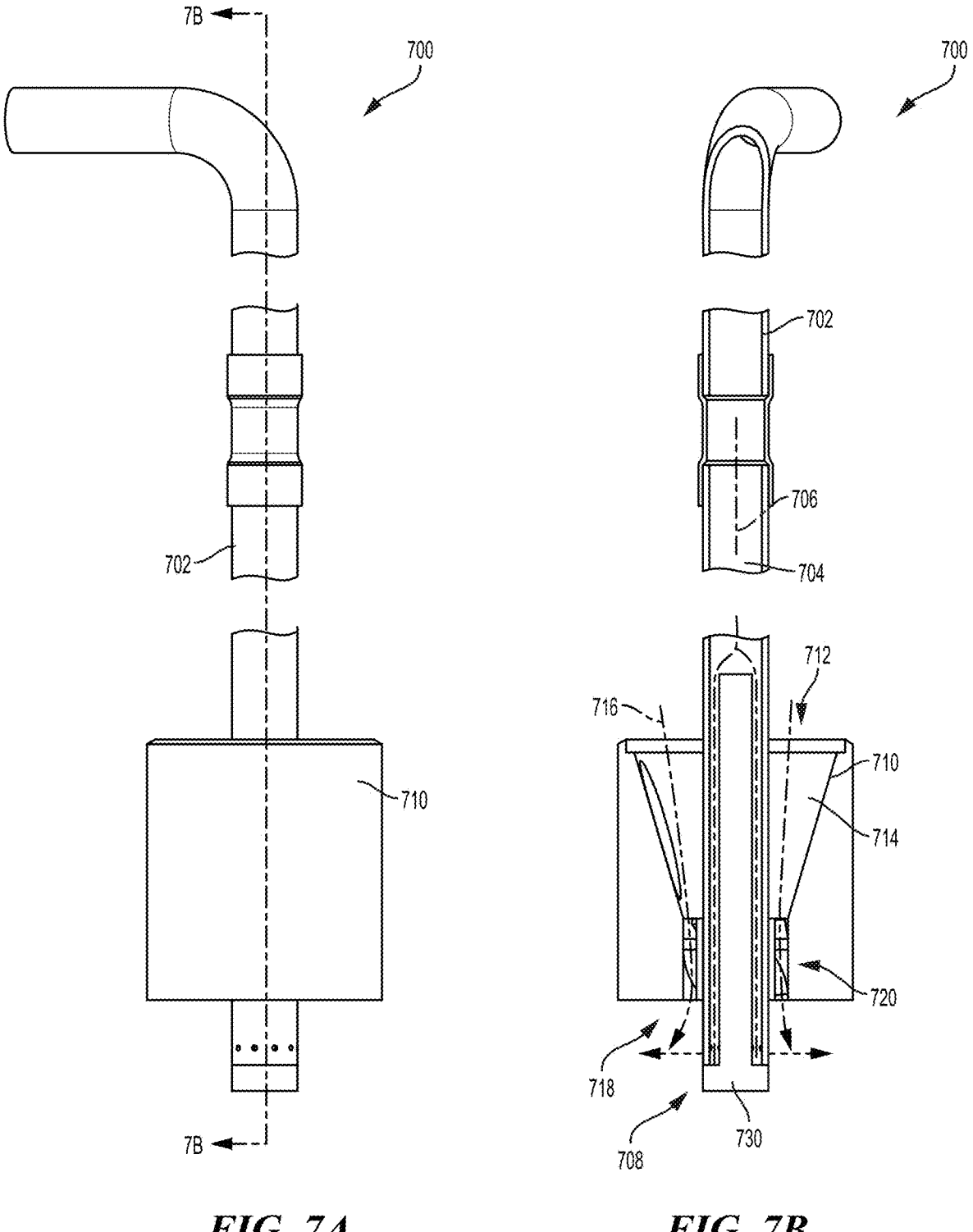
*FIG. 7A*           *FIG. 7B*

1200

1212

1240

1250          1244

PYROLYSIS AND COMBUSTION CONTROL IN PYROLYSIS REACTORS, AND ASSOCIATED SYSTEMS AND METHODS

CROSS-REFERENCE TO RELATED APPLICATION(S)

This application claims priority to U.S. Provisional Application No. 63/592,904 filed Oct. 24, 2023, the entirety of which is incorporated herein by reference.

TECHNICAL FIELD

The present technology is directed generally to pyrolysis reactors, and more specifically to combustion-powered pyrolysis reactors and associated systems and methods.

BACKGROUND

Pyrolysis reactors are used to produce various types of compounds, such as phenolic compounds, biochar, and hydrogen gas, and can convert environmentally unfriendly fuels into usable chemical feedstocks and clean-burning hydrogen fuel. Pyrolysis reactors heat hydrocarbon reactants or other feedstock materials in a low-oxygen or oxygen-free environment to enable a pyrolysis reaction. A pyrolysis reactor used to produce hydrogen gas as a target output can often produce additional byproducts, such as hydrocarbon byproducts, solid carbon particles, carbon dioxide, etc. The proper disposal or additional processing of these byproducts can be important for the long-term viability of pyrolysis reactor operations.

SUMMARY

Embodiments of the present technology include pyrolysis reactors configured to heat feedstock components to decompose them into one or more target materials, such as hydrogen gas, ethylene, or other materials usable as fuel or feedstock for downstream operations. For example, pyrolysis reactors can decompose the hydrocarbon components in natural gas, such as methane and ethane, to generate hydrogen gas and carbon particulate, where the hydrogen gas and/or the carbon particulate can be target outputs of the pyrolysis reactor. In some embodiments, changing the way a pyrolysis reactor operates can change the composition of the pyrolysis reactor outputs or the efficiency of pyrolysis reactor operations.

Embodiments of the present technology can vary in the types of inputs (e.g., compositions, gases, fluids, etc.) they are designed to receive, types of target outputs and target output distributions they to produce, and types of operations they are capable of performing. In many cases, the difference between a successful or failed set of pyrolysis reactor operations will depend on the successful integration of the various components of the physical reactor into an efficient, cohesive system. This system can be able to achieve necessary performance targets by optimizing heat distribution in a pyrolysis reactor, recycling heat in a system, reducing the amount of undesirable byproducts produced by the reactor, and processing different fuel systems. Pyrolysis reactor features capable of achieving such goals can provide a more environmentally friendly reactor.

Embodiments of the present technology can form an engineered combustion zone to produce heat. For example, a reactor system can include a burner having an end in a combustion chamber. The burner can include a first set of channels for oxygen-containing fluids (e.g., air, a specialized oxygen-rich environment, etc.) and a second set of channels for fuel fluids (e.g., methane, ethane, mixed gases, liquid fuels, etc.). The burner can be formed such that one or more injection orifices of the burner direct flame production in a radially distributed shape, which can create a corresponding radially distributed combustion zone that permits fast redistribution of heat produced at the combustion zone across an axial direction throughout the combustion chamber. This redistribution can provide a more uniform heat distribution from the combustion chamber to a pyrolysis chamber (or another type of reaction chamber), which can increase hydrogen production and reduce undesirable greenhouse gas (GHG) emissions.

In some embodiments, a system can effectively allocate the produced heat to pyrolysis chambers by using concentric tubular chambers that are operated in a counter-current manner. In some embodiments, efficient heat transfer is performed under laminar flow conditions to maximize the size of an ideal reaction zone for pyrolysis. Furthermore, operating a reactor under a laminar flow regime can create a more controllable flow with respect to fuel consumption or other controllable parameters of a pyrolysis reactor and reduce reactor susceptibility to carbon deposit fouling.

In some embodiments, a system can effectively make use of chemical byproducts for additional combustion, and for effectively preserving radiant heat. While pyrolysis reactor operations can produce various types of byproducts in addition to any target, plant configuration can provide a way of recycling these byproducts that can enhance the efficiency of the pyrolysis reactor. The efficiency of recycling operations in a pyrolysis reactor can play an important role in the viable environmental sustainability of the pyrolysis reactor.

Furthermore, the physical complexity of some reactor embodiments can correspond with an integrated approach to adjusting different reactor parameters. Features of some reactor embodiments can permit the reactor to efficiently produce hydrogen while responding to day-to-day or even real-time changes in the composition of a target input feedstock, changes in energy supply, and the composition of one or more target outputs. For example, features of a reactor system can provide means of adjusting a production rate, preventing or permitting emission intensity or other byproduct production, or selecting the fuel or other source of energy to be used to power pyrolysis reactor operations.

Some embodiments of the present technology use a variety of energy sources, heating components, or fluid recycling control systems to satisfy one or more target parameters. For example, some embodiments can switch between gas heating sources, geothermal heating sources, solar heating sources, and/or electric heating sources, change the flowrates or compositions of fluids flowing into or through one or more components of the pyrolysis reactor, change the operating temperature of one or more components of the pyrolysis reactor, or perform other operations that increase the efficiency of the pyrolysis reactor. Such configurations can reduce the environmental impact of pyrolysis reactions by reducing carbon emission output and permitting the use of more environmentally friendly energy sources.

While many of the examples described herein disclose hydrogen as a target gas or hydrocarbons as a feedstock material, it should be understood that other target gases are possible, and that other feedstock materials can be used without any loss in the applicability of these examples, unless otherwise stated. Furthermore, unless described otherwise, a first value is considered to be approximately a second value if the first value is within the range of 90% to 110% of the second value. For example, a temperature value is approximately 200° Celsius (° C.) if the temperature value is inclusively between 180° C. and 220° C.

BRIEF DESCRIPTION OF THE DRAWINGS

FIG. 4 depicts a table to guide control of a combustion component and a set of electrically powered heating elements, in accordance with some embodiments of the present technology.

FIG. 5 is a flow diagram of a method to control recycling operations and heating element operations in a pyrolysis system, in accordance with some embodiments of the present technology.

FIGS. 7A and 7B are partially schematic front and cross-sectional views, respectively, of a burner with an extended fuel nozzle configured in accordance with embodiments of the present technology.

Figure 1:
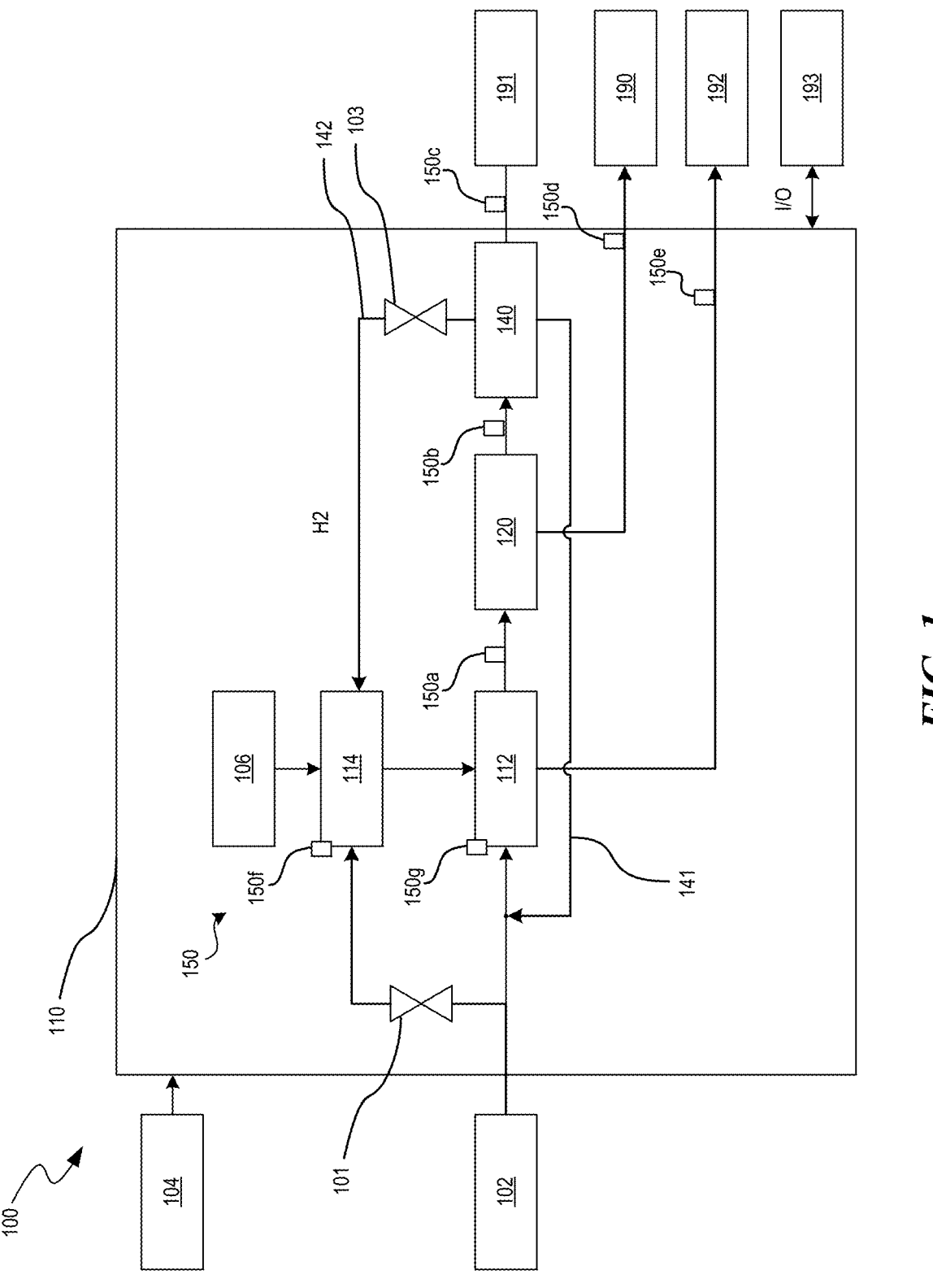
FIG. 1 is a schematic block diagram of a pyrolysis system, in accordance with embodiments of the present technology.

The drawings have not necessarily been drawn to scale. Additionally, some components or operations can be separated into different process portions or combined into a single process portion for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

I. Overview

Pyrolysis reactors heat hydrocarbon reactants (e.g., methane, natural gas, ethane, propane, butane, pentane, gasoline, diesel, kerosene, and/or the like) to decompose them into hydrogen gas, solid carbon, and various products. For example, pyrolysis reactors can decompose the methane, ethane, propane, and other hydrocarbon components in natural gas to generate hydrogen gas. In the example of methane, the pyrolysis reaction is:

$$CH4(gas) \rightarrow C(solid) + 2H2(gas).$$

The hydrogen gas can then be substituted as the combustion fuel anywhere the natural gas, or other hydrocarbons, would have been used. For example, the hydrogen gas can be consumed by various heating units (e.g., furnaces, water heaters, water boilers, steam boilers, and/or the like), combustion engines, fuel cells and/or power generators (e.g., in a backup power generator), combined heat and power systems, cooking units (e.g., gas stoves), and/or in various other suitable uses. Additionally, or alternatively, the hydrogen can be used in various industrial processes, such as producing various ammonia-based products (e.g., ammonia fertilizers), providing process heat, and/or other chemical processing industries and/or injected back into the natural gas pipeline to partially decarbonize the natural gas in the pipeline. Further, the solid carbon can be collected and used in various downstream applications. Purely by way of example, the solid carbon product can partially replace binders in asphalt products, thereby effectively sequestering the carbon from the hydrocarbon reactant.

Systems for producing hydrogen gas for local distribution, consumption, or storage, and related devices and methods are disclosed herein. In some embodiments, a representative system can use a reactor that includes one or more reactor tube subsystems, where each reactor tube subsystem includes a set of concentric tubes. In some embodiments, a first annular region between an outer tube of the reactor tube subsystem and an inner tube of the reactor tube subsystem can act as pyrolysis chamber, and a second region inward of an inner tube of the reactor can serve as a combustion chamber. The annular design can simplify separation of a pyrolysis stream (and the resulting product stream) from a combustion stream, and offers significant advantages over other reactor designs such as molten salt reactors. One major challenge for the annular pyrolysis reactors, however, is ensuring enough heat is transferred from the combustion chamber to the reaction chamber to efficiently drive the pyrolysis reaction. The systems and methods disclosed herein provide various solutions to this challenge. For example, various embodiments of the present technology include a burner (or combustion component) that is configured to increase flame-wall and/or flue gas-wall interactions within the combustion chamber. As a result, the burner can help increase the amount of heat that is transferred through the wall and into a pyrolysis chamber. Additionally, or alternatively, the pyrolysis reactors disclosed herein can include various thermal bodies positioned within the combustion chamber to help facilitate heat transfer. Additionally, or alternatively, the pyrolysis reactors disclosed herein can include various heat recycling components to help preheat incoming pyrolysis fuel (sometimes also referred to herein as a "pyrolysis feedstock," a "pyrolysis reactant," and/or the like), incoming combustion fuel, and/or air entering the burner to help increase an efficiency of the combustion and/or the pyrolysis reaction.

For ease of reference, the components described in this disclosure are sometimes described herein with reference to top and bottom, upper and lower, upwards and downwards, or horizontal plane, x-y plane, vertical, or z-direction relative to the spatial orientation of the embodiments shown in the figures. It is to be understood, however, that components can be moved to, and used in, different spatial orientations without changing the structure or function of the disclosed embodiments of the present technology.

II. Representative Recycling and Heating Operations

A pyrolysis reactor can produce various byproducts (e.g., volatile organic compounds (VOCs), semi-volatile organic compounds (SVOCs), pyrolysis oil, asphaltenes, acetylene, carbon monoxide, carbon dioxide, water, ethane, ethene, propane, propene, propene, higher-order saturated and unsaturated hydrocarbons, oils, and/or waxes) during pyrolysis reactions. For example, a pyrolysis reactor being used to produce hydrogen gas from methane can also produce intermediate molecules or byproducts. These byproducts or other intermediates can be problematic for various downstream operations and degrade reactor equipment or pollute any final hydrogen gas product. The proper handling of these byproducts can be the difference between a sustainable or unsustainable plant operation.

While some embodiments can simply purify pyrolysis gases to remove any intermediates, some embodiments can recycle pyrolysis byproducts. Such recycling operations can return byproducts back to an input stream for a pyrolysis chamber or redirect the byproducts to the combustion fuel for use as a combustion fuel in a pyrolysis reactor's combustion chamber. In some embodiments of the present technology, steady state operations of a pyrolysis reactor can include at least one mode of operation during which only recycled product is used to fuel combustion, without requiring additional fuel from an external fuel source.

FIG. 1 is a schematic block diagram of a pyrolysis system 100, in accordance with embodiments of the present technology. The pyrolysis system 100 includes a reactor system 110, a fuel supply 102 and a power supply 104 to provide fuel and energy, respectively, to the reactor system 110. The reactor system 110 can include an air compressor 106, one or more burners 114 ("burner(s) 114," sometime also referred to herein as a "burner") positioned to receive fuel from the fuel supply 102 and air from the air compressor 106, and a pyrolysis chamber 112 configured to house or produce pyrolysis reactions. The fuel supply 102 can provide fuels including methane, ethane, natural gas (NG), other hydrocarbon, and/or hydrogen. In some embodiments, the burner(s) 114 or another burner of another pyrolysis system may include burners disclosed in U.S. Patent Publication No. 2023/0025491, titled "Combustion systems including heat modules, and associated devices and methods," which is incorporated herein by reference in its entirety. The fuel supply 102 can provide fuel to either the pyrolysis chamber 112 or the burner(s) 114, and a valve 101 can control the fuel flow from the fuel supply 102 to the burner(s) 114. The burner(s) 114 uses the air provided via the air compressor 106 in combination with the fuel provided by the fuel supply 102 to generate a flame that acts as a heat source for pyrolysis reactions in the pyrolysis chamber 112. Flue gas or other exhaust gas generated by the burner(s) 114 can be directed to an exhaust system 192. The pyrolysis system 100 can further include a controller 193 in communication with and configured to control aspects (e.g., flow, temperature, pressure, etc.) of the pyrolysis system 100, as described further elsewhere herein.

During operations of the reactor system 110, fuel provided to the pyrolysis chamber 112 can produce hydrogen gas and carbon (and other byproducts), which can be provided to a carbon separator 120 in which the carbon is transferred to a carbon sink 190. The carbon sink 190 can include a carbon conditioning system, a carbon storage system, a carbon disposal system, a carbon compaction or pelletization system, or a carbon utilization system. The output material or process stream comprising hydrogen gas that exits the pyrolysis chamber 112 can be directed from the carbon separator 120 to a hydrogen conditioning system 140 that can pressurize, depressurize, cool, heat, purify, and/or otherwise prepare the hydrogen for transport via a hydrogen delivery system 191.

In some embodiments, the hydrogen conditioning system 140 can collect any produced intermediates, such as byproducts, and recycle these produced intermediates. The hydrogen conditioning system 140 can recycle the intermediates by pumping or otherwise causing these intermediates to be transported back to the pyrolysis chamber 112, e.g., via a fluid path 141. Recycled byproducts and/or other intermediate molecules can then decompose into hydrogen or solid carbon in the pyrolysis chamber 112. As a result, redirecting the byproducts and/or other intermediates can advantageously enhance the yield or purity of any produced hydrogen gas. Alternatively, or additionally, the hydrogen conditioning system 140 can transfer intermediate byproducts such as byproducts to the burner(s) 114 to fuel combustion reactions via a fluid path 142. In some embodiments, the fluid path 142 includes a valve 103 to control fluid flow from the hydrogen conditioning system 140 to the burner(s) 114.

In some embodiments, the reactor system 110 or another component of the pyrolysis system 100 includes a set of sensors 150a-150g (collectively referred to as "sensors 150") capable of obtaining environmental or other data associated with one or more components of the pyrolysis system 100. In some embodiments, the sensors 150 can be used to determine various types of properties or other characteristics of one of the components of the pyrolysis system 100. For example, in some embodiments the sensor 150a receives sensor data indicating about the product stream, e.g., data from an optical sensor, e.g., to determine an amount of solid carbon produced by the reactor system 110, e.g. to determine the composition or the heating value of the product stream. Additionally or alternatively, the sensor 150b can determine an amount of carbon removed from the product stream. Some embodiments can further use the derived information to determine that a set of criteria is satisfied based on the sensor measurements or information derived from the sensor measurements and, in response, trigger one or more actions associated with the set of criteria. For example, some embodiments can generate an alert for a user based on a determination that a byproduct fraction of a product stream is greater than a fraction threshold and, in response, modify byproduct recycling operations to divert a greater amount of byproduct to a combustion chamber.

As described elsewhere, the sensors 150 can measure one or more types of properties. For example, the sensors 150 can measure electrical characteristic (e.g., resistivity, dielectric strength, frequency-dependent resistivity, electrical impedance, or any other suitable characteristics). In some embodiments, the sensors 150 can include (i) ultrasound sensors able to perform ultrasound measurements usable for determining reactant flow through the pyrolysis chamber 112 or a carbon build-up within the pyrolysis chamber 112, (ii) gas flowrate sensors that can determine a ratio of reactant (e.g., methane) to a product (e.g., hydrogen) flowing out of the pyrolysis chamber 112, e.g., to indicate the efficiency or extent of the pyrolysis reaction occurring within the pyrolysis chamber 112, (iii) a thermocouple, flame detector, and/or other temperature sensor that measures the temperature of the pyrolysis chamber 112, the burner(s) 114, or another component of the pyrolysis system 100 (iv) a current-measuring sensor to monitor an amount of methane or other reactant, and/or (v) a flow sensor to determine a hydrogen production rate, and/or (vi) another sensor configured to measure another property of the product stream, combustion gas, other fluid described herein.

The controller 193 can include one or more processors, one or more non-transitory media, or other circuitry to implement program instructions to control one or more components of the reactor system 110. For example, the controller 193 can control the valve 101 to increase the amount of fuel (e.g., methane or other hydrocarbons) flowing into the burner(s) 114, control the valve 103 to increase the amount of byproducts to recycle back to the burner(s) 114, or control fluid flow in other parts of the reactor system 110. It should be understood that additional valves or other forms of controlling fluid flow can be used in the reactor system 110. For example, the fluid path 141 can include one or more valves controlled by the controller 193, e.g., to control the rate of recycled byproducts flowing from the hydrogen conditioning system 140 to the pyrolysis chamber 112.

The controller 193 can be operably coupled via input/output (I/O) links to sensors (e.g., the sensors 150), actuators, or other components of the pyrolysis system 100. Furthermore, the controller 193 can adjust operations of the pyrolysis system 100 based on a set of measurements obtained by the sensors 150 of the pyrolysis system 100. For example, the controller 193 can adjust the input flow of the reactant or the operating temperature of the pyrolysis chamber 112 by manipulating a valve actuator based on the ratio of reactant to hydrogen gas measured at the exit of the pyrolysis chamber 112. In some embodiments, the controller 193 can include or be coupled to a memory storing previously measured data, operating parameters, predictions generated for future measurements or operating parameters, or other data associated with the pyrolysis system 100. Furthermore, the controller 193 can also receive data from data sources that provide real-time natural gas, electricity, or hydrogen prices. Some embodiments can then determine or otherwise update a set of operational parameters for the operation of the pyrolysis system 100 based on the sensor data, the information derived from the sensor data, data obtained from other data sources, and/or data derived from data obtained from other data sources. In some embodiments, adjustments to the set of operational parameters can cause temperature changes, pressure changes, or flow rate changes. For example, embodiments of the present technology can cause actuator adjustments that change the flow of fluids through the pyrolysis system 100 or can cause other physical changes to the pyrolysis system 100.

In some embodiments, the controller 193 can operate the reactor system 110 in different operating modes and can further switch between different operational modes, e.g., in response to a determination that a set of criteria is satisfied. In some embodiments, controller 193 can operate the reactor system 110 in a first operational mode during an initial initialization mode that causes the fuel supply 102 to transmit flow directly into both the pyrolysis chamber 112 and the burner(s) 114. The controller 193 can then receive measurements from at least one sensor of the sensors 150 in the reactor system 110 to determine that a set of criteria are satisfied. The set of criteria can include a criterion that a minimum temperature in the burner(s) 114 has been reached, a criterion that a minimum temperature in the pyrolysis chamber 112 has been reached, a criterion that a hydrogen production rate threshold has been reached, a criterion that a target hydrogen gas purity is reached (e.g., 50% or more, 75% or more, 85% or more, 95% or more), a criterion that a carbon dioxide emission target is reached, etc. In some embodiments, the set of criteria can include a first criterion that the pyrolysis chamber 112 has achieved a minimum predetermined temperature (e.g., 250° Celsius (° C.), 500° C., 750° C., 1000° C., 1250° C., 1500° C., 2000° C., or above 2000° C.) and that the flow of hydrogen detected by the sensor 150c measuring hydrogen content in a product stream exiting the pyrolysis chamber 112 indicates a that minimum hydrogen flowrate has been reached. In response to a determination that the set of criteria is satisfied, the controller 193 can switch operations of the reactor system 110 to a second operational mode. During the second operational mode, as an example, the fuel supply 102 does not directly provide any fuel to the burner(s) 114 and only provides methane, NG, or other fuel to the pyrolysis chamber 112. Instead, during the second operational mode, the reactor system 110 can provide all of the required heat to maintain steady state operations by recycling product and/or byproducts from the hydrogen conditioning system 140 back to the burner(s) 114. Alternatively, or additionally, the controller 193 can modify operations of the reactor system 110 to balance the amount of gas recycled back into the pyrolysis chamber 112 and the burner(s) 114 to satisfy a hydrogen production rate target, hydrogen gas purity target, GHG emission targets, total production rate target, etc.

Figure 2:
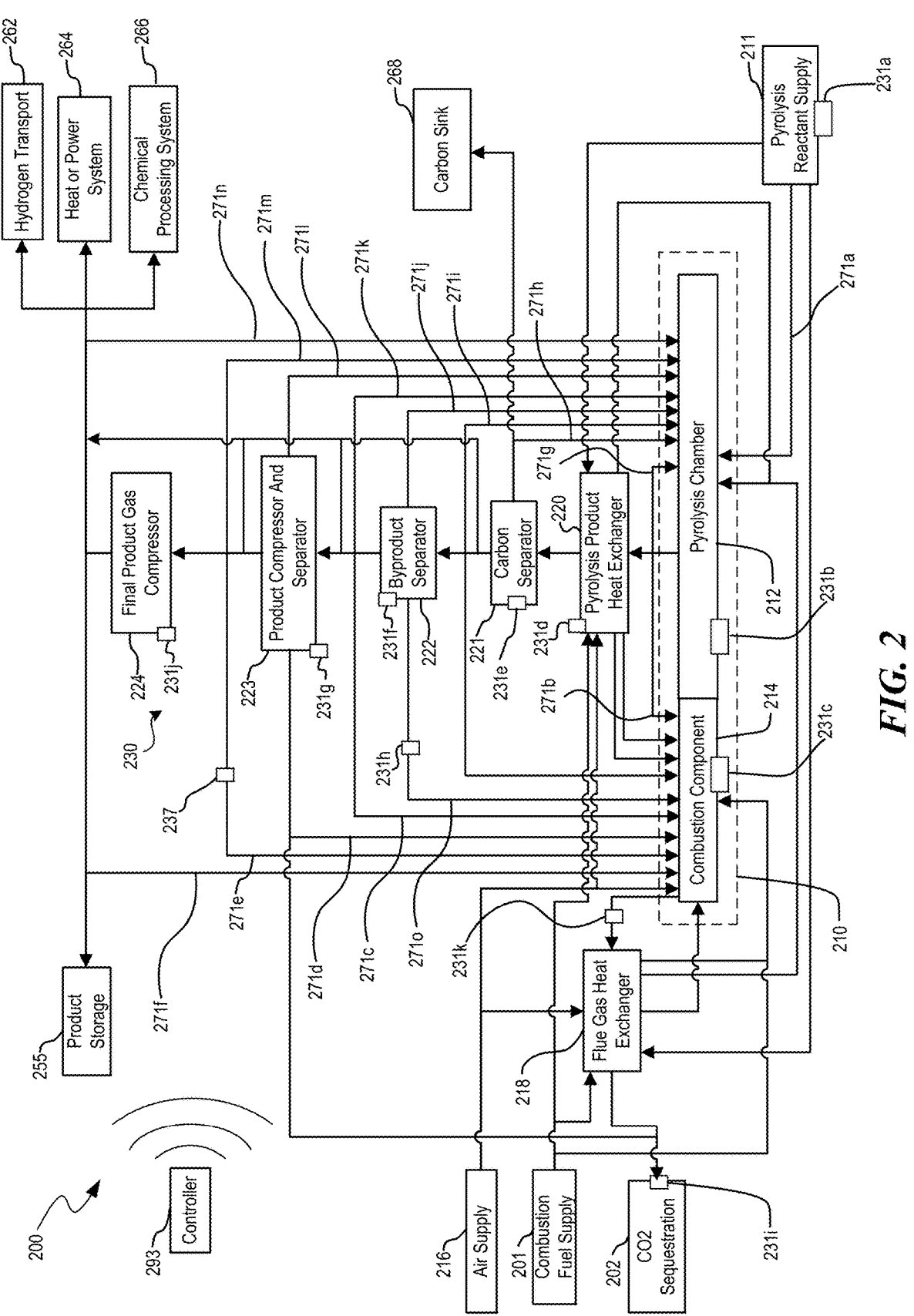
FIG. 2 is a schematic block diagram of a pyrolysis system configured in accordance with embodiments of the present technology.

FIG. 2 is a schematic block diagram of a pyrolysis system 200 configured in accordance with embodiments of the present technology. In the illustrated embodiment, the pyrolysis system 200 includes a pyrolysis reactor 210 to generate hydrogen in a product gas produced via pyrolysis reactions, a pyrolysis product heat exchanger 220 to transfer heat to the pyrolysis reactor 210 or another component of the pyrolysis system 200, and a carbon separator 221 (e.g., the carbon separator 120 of FIG. 1). The pyrolysis system 200 also includes a byproduct separator 222 to separate byproducts (e.g., unreacted hydrocarbons, partially reacted hydrocarbons, intermediate molecules) from product gas produced by the pyrolysis reactor 210, and a product compressor-separator system 223 to separate byproducts from product gas produced by the pyrolysis reactor 210. Fluids can flow along any one of multiple flow paths, as indicated by a set of flow paths 271a-271o (collectively referred to as the "flow paths 271"). Each respective one of the flow paths 271 can include one or more valves, pipes, tubing, or other connections to permit and control fluid flow. In some embodiments, the flow path can act as a heat flow path, where temperature differences between fluid flowing in the flow path and other components of the pyrolysis system 200 can cause heat transfer. Furthermore, the pyrolysis system 200 can include a set of sensors 231a-231k (collectively referred to as the "sensors 231") to collect sensor data, where the set of sensors can include a pressure sensor, flow meter or other sensor to measure flowrate, temperature sensor, ionization detector, photoelectric detector, gas analyzer or other type of gas sensor, or another type of sensor. For example, the sensor 231i can measure a flowrate of carbon dioxide or an amount of carbon dioxide in the carbon dioxide sequestration component 202. Furthermore, while the pyrolysis system 200 depicts the sensors 231 at particular locations in the pyrolysis system 200, the sensors 231 can be positioned in other parts of the pyrolysis systems described herein. In some embodiments, the sensors 231 can be positioned to obtain measurements within, at an input port of, or at an output port of hydrogen generation units (e.g., pyrolysis chambers), combustion units (e.g., combustion chambers), or other components described herein. In some embodiments, the sensors 231 provide a direct measure of energy or mass transfer in a hydrogen generation system such as the pyrolysis system 200. Alternatively, the sensors 231 can provide measurements that a computing system receiving data from the sensors 231 can then use to determine a measure of energy or mass transfer of a hydrogen generation system such as the pyrolysis system 200.

The pyrolysis reactor 210 includes a pyrolysis chamber 212 (e.g., the pyrolysis chamber 112 of FIG. 1) and a combustion component 214 (e.g., the burner(s) 114 of FIG. 1, sometimes also referred to herein as a "burner"). The pyrolysis chamber 212 is fluidly coupled to a pyrolysis reactant supply 211 to receive a hydrocarbon reactant, such as natural gas, pure methane, gasoline, etc. The pyrolysis reactant supply 211 can hold various types of fluids or fluids mixtures, such as methane, ethane, propane, butanes, pentanes, carbon dioxide, water vapor, diesel, etc. In some embodiments, different types of input fluids from the pyrolysis reactant supply 211 can result in the generation of different amounts of impurities produced by the pyrolysis chamber 212. As used herein, the term "fluidly coupled" means that two or more components are connected via one or more conduits to one another such that a fluid can be conveyed between them via the one or more conduits. The hydrocarbon reactant can travel from the pyrolysis reactant supply 211 via the first flow path 271a coupling the pyrolysis chamber 212 to a NG supply or pipeline of the pyrolysis reactant supply 211. Alternatively, or additionally, the pyrolysis chamber 212 can recycle some of the product stream by sending a portion of the unpurified product stream from the pyrolysis chamber 212 to the combustion component 214 via the second flow path 271b. Furthermore, the pyrolysis chamber 212 can send unreacted methane or other reactant fluid back into the pyrolysis chamber 212 for further reaction via the seventh flow path 271g.

The pyrolysis chamber 212 can use heat provided by the combustion component 214 to heat a hydrocarbon reactant in the pyrolysis chamber 212 to an enthalpy point for representing a minimum energy for a pyrolysis reaction to occur. For example, some embodiments can use the combustion component such that it provides at least 400 Watts per square meter heat flux to the pyrolysis chamber 212. Alternatively, some designs may implement an alternative minimum wattage per square meter, such as at least 200 Watts per square meter, at least 300 Watts per square meter, or at least 500 Watts per square meter. As a result, the pyrolysis chamber 212 causes a pyrolysis reaction that breaks the hydrocarbon reactant into hydrogen gas and carbon. For example, some embodiments can provide heat to the pyrolysis chamber 212 sufficient to provide the enthalpy of the pyrolysis reactions that convert methane and other hydrocarbons in natural gas to solid carbon, hydrogen gas, and other products and byproducts.

In some embodiments, the combustion component 214 includes one or more burners that receives and combusts a combustion fuel. The combustion component 214 is fluidly coupled to a fuel supply 201 of the pyrolysis system 200 to receive a combustion fuel along a path that includes one or more valves or fluid pipelines couplable to the fuel supply 201. The combustion fuel can include one or more various types of combustible fluids such as methane, ethane, an alkane mixture, gasoline, diesel, natural gas, hydrogen gas, etc. In some embodiments, the fuel supply 201 can include hydrogen gas or other products produced by the pyrolysis chamber 212.

The pyrolysis system 200 also includes an air supply 216 (e.g., a blower, a compressor, a tank, a pump, and/or any other suitable air supply) that is fluidly coupled with the combustion component 214 to provide air to the combustion component 214. The pyrolysis system 200 also includes a flue gas heat exchanger 218 that is fluidly coupled to or integrated with the pyrolysis reactor 210. For example, the air supply 216 can be coupled to the combustion component 214 along a flow path to supply air, oxygen, or another oxygen-carrying fluid to the combustion component 214. Adjusting operations of the air supply 216 can help control an oxygen-to-fuel ratio in the combustion component 214 that, in turn, controls a combustion rate and a correlated thermal output of the combustion component 214. In some embodiments, the air supply 216 is integrated directly with the combustion component 214. For example, the air supply 216 can be part of a fuel-mixing component upstream from the burners of the combustion component 214. Alternatively, the air supply 216 can be a separate component that is operably coupled to the combustion component 214. For example, the air supply 216 can be integrated with the pyrolysis reactor 210. Furthermore, the air supply 216 can be separated from and operably coupled to the pyrolysis reactor 210.

During combustion operations, the combustion component 214 can direct any resulting flue gas toward the flue gas heat exchanger 218, which can absorb at least a portion of the heat remaining in the flue gas to recycle the heat. For example, the air supply 216 can direct incoming air or other oxygen-carrying fluids toward the flue gas heat exchanger 218. The flue gas heat exchanger 218 can then preheat and direct the air toward the combustion component 214. For example, the air can be preheated to at least 250° C., at least 500° C., or at least a temperature greater than another threshold value (e.g., 100° C., 200° C., 260° C., etc.). By preheating the air, the flue gas heat exchanger 218 can reduce the temperature difference between the incoming air and the combustion temperature. As a result, the combustion component 214 does not need to raise the temperature of the incoming air as far to initiate combustion, thereby improving the efficiency of the combustion component 214. Furthermore, the flue gas heat exchanger 218 can be fluidly coupled to the fuel supply 201 to receive the combustion fuel. For example, the flue gas heat exchanger 218 can preheat and direct the combustion fuel toward the combustion component 214. Such preheating operations can reduce the energy required to raise the temperature of incoming combustion fuels to initiate combustion and increase the efficiency of the combustion component 214. Furthermore, the flue gas heat exchanger 218 can recycle the heat for another application, such as for heating a building, heating water, etc.

After absorbing heat from the flue gas, the flue gas heat exchanger 218 can direct the flue gas toward a carbon dioxide sequestration component 202 of the pyrolysis system 200 or an exhaust system. The carbon dioxide sequestration component 202 can remove at least a portion of the carbon dioxide from the exhaust when the combustion component. As a result, the carbon dioxide sequestration component 202 can reduce the carbon footprint associated with the pyrolysis system 200. Furthermore, the sensor 231i can measure a flowrate of fluid in general or a flowrate of carbon dioxide being sent to the carbon dioxide sequestration component 202 or an amount of carbon dioxide stored in the carbon dioxide sequestration component 202. Additionally, while the carbon dioxide sequestration component 202 is shown as receiving carbon dioxide from the flue gas heat exchanger 218, the carbon dioxide sequestration component 202 can also receive carbon dioxide from other sources, such as directly from the product compressor-separator system 223. Furthermore, while the pyrolysis system 200 is shown as directing carbon dioxide from the product compressor-separator system 223 or the flue gas heat exchanger 218 to the carbon dioxide sequestration component 202, some embodiments can direct carbon dioxide from other components of the pyrolysis system 200 or to other destinations.

In some embodiments, the pyrolysis chamber 212 uses heat from combustion component 214 to decompose hydrocarbons in a pyrolysis reaction. For example, the pyrolysis chamber 212 can decompose gases sourced from the pyrolysis reactant supply 211 to generate a target fluid, such as hydrogen gas, or another product such as a solvent or a fuel. The pyrolysis chamber 212 can also produce one or more byproducts filtered from the product stream of the pyrolysis chamber 212 to isolate produced hydrogen or other target fluids. For example, the product stream of variously configured pyrolysis chambers 212 can include byproducts such as resins, oils, fuels, hydrocarbons, aromatics, volatile compounds, solvents, hydrocarbon byproducts, etc.

In some embodiments, the product stream from the pyrolysis chamber 212 can be directed to the pyrolysis product heat exchanger 220. The pyrolysis product heat exchanger 220 can absorb at least a portion of the heat in the product stream to recycle the heat. For example, embodiments of the present technology can direct the absorbed heat back to the combustion component 214 to help heat incoming combustion fuel, incoming air, or other components of the pyrolysis system 200. Additionally, or alternatively, some embodiments can direct the heat back to the pyrolysis chamber 212 to help preheat incoming pyrolysis feedstock thereby reducing the volume of combustion fuel that must be consumed to heat the pyrolysis feedstock to the enthalpy point. Additional details on examples of suitable recuperators are disclosed in U.S. Patent Publication No. 2022/0315424, titled "Systems and Methods for Local Generation and/or Consumption of Hydrogen Gas and U.S. Patent Publication No. 2022/0120217, titled "Power Cells and Heat Transfer Systems for Combined Heat and Power, and Related Systems and Methods," each of which is incorporated herein by reference in their entireties. Additionally, or alternatively, some embodiments can direct the heat to one or more heating units (e.g., an HVAC unit, water heater, steam boiler, process heater, line heater, or the like), a power generation device (e.g., the combined heat and power component, a thermionic device, thermoelectric device, thermoacoustic device, fuel cell, engine, turbine, or any other suitable power generator), or the like.

The pyrolysis product heat exchanger 220 can extract heat from the product stream from the pyrolysis reactor 210 by pumping a heat-collecting fluid in thermal contact with the product stream of the pyrolysis reactor 210. The heat-collecting fluid from pyrolysis product heat exchanger 220 can flow such that it is in thermal contact with the input stream of the pyrolysis chamber 212 or the combustion component 214. For example, the heat collecting fluid from the pyrolysis product heat exchanger 220 can flow in a counter-current manner with respect to the flow of combustion fuel from the fuel supply 201 to preheat the combustion fuel.

The carbon separator 221 can receive some or all of the product stream from the pyrolysis chamber 212 after the product stream passes through the pyrolysis product heat exchanger 220. The carbon separator 221 removes some or all the carbon in the product stream leaving the pyrolysis chamber 212 and directs the carbon toward a carbon sink 268. The carbon separator 221 can include various types of carbon separation components, such as a cyclone separator, a gas-liquid separator, a filter (e.g., a baghouse filter, a mesh filter, etc.), electrostatic separator, or another type of separator. The carbon separator 221 can also redirect some or all of any collected carbon back into the pyrolysis chamber 212 via the eighth flow path 271h. Some embodiments can balance carbon redirection based on a detected degree of carbon deposition. For example, some embodiments can use a sensor (e.g., the sensor(s) referred to in FIG. 1) to detect that a carbon buildup is too great and, in response, redirect carbon flow to increase an amount of carbon flowing into the carbon sink 268 instead of the pyrolysis chamber 212.

Some embodiments can direct a product stream from the pyrolysis chamber 212 towards the byproduct separator 222. For example, the pyrolysis system 200 can pump a product stream from the pyrolysis reactor 210, through the carbon separator 221, and to the byproduct separator 222. The byproduct separator 222 can separate byproducts, such as hydrocarbon byproducts, from the product stream by one or more means. For example, the byproduct separator 222 can condense byproducts into a liquid or freeze the byproducts into solids so that they separate from the gas, such as hydrogen, in the product stream. For example, some embodiments can condense the byproducts of a product stream into a liquid at temperatures between about 40° C.

and about 200° C., between about 40° C. and about 350° C., or between about 40° C. and about 500° C. The byproduct separator 222 can then remove the liquid or solid byproducts from the product stream via cooling or condensing the product stream while the hydrogen remains gaseous. Additionally, or alternatively, the byproduct separator 222 can include a system for separating lower molecular weight byproducts from the product stream. For example, some embodiments can pass a product stream through a bed of activated carbon or zeolite of byproduct separator 222 to remove the byproducts by adsorption.

After removing the byproducts, the byproduct separator 222 can redirect the collected byproducts to the pyrolysis chamber 212 via the tenth flow path 271j. Alternatively, the byproduct separator 222 can redirect collected byproducts to the combustion component 214 via a fifteenth flow path 271o. The pyrolysis system 200 can include a controller 293 configured to determine whether the byproduct separator 222 sends any processed fluid to the pyrolysis chamber 212 or the combustion component 214 based on user-provided target parameters, sensor-provided data, or predictions generated using a prediction model. Furthermore, some embodiments can also redirect some or all of the product stream after the product stream is processed by the byproduct separator 222. For example, some embodiments can send a partially purified hydrogen gas product to the pyrolysis chamber 212 via the eleventh flow path 271k (e.g., which may direct a portion of the product stream from the byproduct separator 222 to the pyrolysis reactor 210). Alternatively, or additionally the byproduct separator 222 can send a partially purified hydrogen gas product to the combustion component 214 via the third flow path 271c.

The byproduct separator 222 can direct the byproduct-filtered product stream to the product compressor-separator system 223. The product compressor-separator system 223 can remove various additional impurities from the product stream that were not removed by the carbon separator 221 or the byproduct separator 222. For example, the product compressor-separator system 223 can remove additional carbon particulates that were not captured by the carbon separator 221, unreacted methane, other gaseous molecules, etc. The product compressor-separator system 223 can then compress the resulting product stream for increasing transportation efficiency. In some embodiments, the product compressor-separator system 223 can recycle at least some of the filtered byproducts (e.g., carbon particulate, byproducts, unreacted fuel, etc.) to the combustion component 214 via the fourth flow path 271d. Alternatively, or additionally, the product compressor-separator system 223 can recycle at least some of the filtered byproducts (e.g., carbon particulate, byproducts, unreacted fuel, etc.) back to the pyrolysis chamber 212 via the twelfth flow path 271l.

The product compressor-separator system 223 can direct the filtered product stream to a final product gas processing subsystem 224, where the final product gas processing subsystem 224 can include a compressor, cooler, heater, pressure swing absorber, filter, temperature swing absorber, zeolite, membrane, or another purification system. In some embodiments, the final product gas processing subsystem 224 can adjust properties of a final product gas to be at a target pressure, target temperature, or target purity. Alternatively, or additionally, the product compressor-separator system 223 can redirect the filtered product stream to the combustion component 214 via a fifth flow path 271e or to the pyrolysis chamber 212 via a thirteenth flow path 271m. As discussed elsewhere, re-directing a portion of the filtered product stream exiting the product compressor-separator system 223 can reduce any reliance on an external fuel source, such as the fuel supply 201.

The final product gas processing subsystem 224 compresses the product stream from the product compressor-separator system 223 to prepare the resulting hydrogen or product gas comprising hydrogen for delivery to a hydrogen transport system 262. The hydrogen transport system 262 can include one or more hydrogen storage tanks, fluid transport pipes, pumps, etc. The final product gas processing subsystem 224 can also supply a product stream to a heat or power system 264 or provide the product stream for use as a feedstock for chemical processing system 266. Furthermore, some embodiments can use the final purified hydrogen product as fuel for the combustion component 214 by directing a purified product stream (e.g., a purified hydrogen gas) to the combustion component 214 via the sixth flow path 271f or to the pyrolysis chamber 212 via the fourteenth flow path 271n. Transporting a portion of the purified product to the combustion component 214 reduces reliance on the fuel supply 201.

In some embodiments, the controller 293 includes one or more processors and one or more memory devices to store program instructions that causes the one or more processors to perform operations to determine different amounts of recycling or redirection based on specific operating targets. In many cases, satisfying specific operational targets can include determining ratios of product or byproduct redirection corresponding with different processing elements. For example, some embodiments can recycle a combination of purified product gas and unpurified or partially purified product stream, where the ratio of purified to unpurified or partially purified product can be varied in a target amount to satisfy an operational target. For example, some embodiments can receive a target energy efficiency rate and, in response, determine a first rate of purified product stream exiting the final product gas processing subsystem 224 and traveling via the fifth flow path 271e or the sixth flow path 271f to the combustion component 214 and then determine a corresponding amount of byproduct to redirect to the combustion component 214 via the fourth flow path 271d. Alternatively, or additionally, some embodiments can determine a recycling ratio indicating an amount of purified product gas to unreacted hydrocarbon to send back to the pyrolysis chamber 212. For example, some embodiments can determine a ratio of flowrates between the flow of purified product gas flowing through the thirteenth flow path 271m and the flow of unreacted methane flowing through the twelfth flow path 271l from the product compressor-separator system 223 to the pyrolysis chamber 212. Alternatively, or additionally, some embodiments can determine a recycling ratio for a ratio of amounts of unpurified product to a partially or completely purified product and operate valves of the pyrolysis system 200 to satisfy this ratio. For example, some embodiments can determine a ratio of an amount of unpurified product stream flowing through the seventh flow path 271g to redirect to the pyrolysis chamber 212 to an amount of partially purified product stream flowing through the ninth flow path 271i to the pyrolysis chamber 212.

As shown in the pyrolysis system 200, a portion of a product stream can be redirected to the pyrolysis chamber 212. For example, some embodiments can redirect a portion of an unpurified product stream, partially purified product stream, or terminal purity product stream to the pyrolysis chamber 212 via the seventh flow path 271g, ninth flow path 271i, thirteenth flow path 271m, or fourteenth flow path 271n. By redirecting a product stream portion to the pyrolysis chamber 212, the product stream can be refined or purified by forcing the product stream portion to be re-processed by the pyrolysis chamber 212, the carbon separator 221, the byproduct separator 222, the product compressor-separator system 223 or the final product gas processing subsystem 224. Alternatively, or additionally, redirecting a portion of the product stream can be used as a method of controlling the products of the pyrolysis reaction by diluting the concentration of the pyrolysis feedstock in the pyrolysis chamber 212. In some embodiments, the controller 293 can vary the ratio of product stream that is redirected to the pyrolysis chamber 212 relative to the product stream that is permitted to flow into a destination other than the pyrolysis chamber 212 based on a measured purity of the product stream exiting pyrolysis chamber 212.

In some embodiments, the controller 293 can obtain a set of target parameters indicating a target hydrogen production rate, a target carbon dioxide emission rate or another target GHG emission rate, etc. Some embodiments can manipulate fluid flow of a product steam or byproduct stream based on the set of target parameters, sensor measurements, and data from external sources (e.g., weather, fuel prices, hydrogen prices, data related to GHG emission credits, etc.). For example, some embodiments can determine that a carbon content of a product stream is greater than a carbon content threshold and, in response, redirect a portion of the product stream exiting the carbon separator 221 through the ninth flow path 271i to the pyrolysis chamber 212. As another example, some embodiments can obtain a change to an operational target that indicates an increase in required hydrogen content to be sent to the hydrogen transport system 262. In response, to the detected change, the controller 293 can send program instructions to a valve of the fourteenth flow path 271n to decrease an amount of gas diverted from the final product gas processing subsystem 224 back to the pyrolysis chamber 212. As described elsewhere, a pyrolysis reactor controller can obtain various types of operational targets and/or live plant performance feedback (i.e., process conditions, composition, or customer input).

In various embodiments, the pyrolysis system 200 can omit one or more of the components discussed above and/or include one or more additional (or alternative) components. Purely by way of example, the pyrolysis system 200 can include additional processing components downstream from final product gas processing subsystem 224 (e.g., to further condition hydrogen gas for an endpoint), one or more intermediate processing components between the carbon separator 221 and the carbon sink 268 (e.g., heat exchangers, cooling beds, and/or the like to help cool the solid carbon for further processing), and/or the like. In another example, the product stream exiting the carbon separator 221, the byproduct separator 222, and/or the product compressor-separator system 223 can be directed directly to various endpoints instead of being directed into downstream processing components (e.g., when the pyrolysis system 200 operates at a temperature and/or pressure suitable for the downstream usage).

Figure 3:
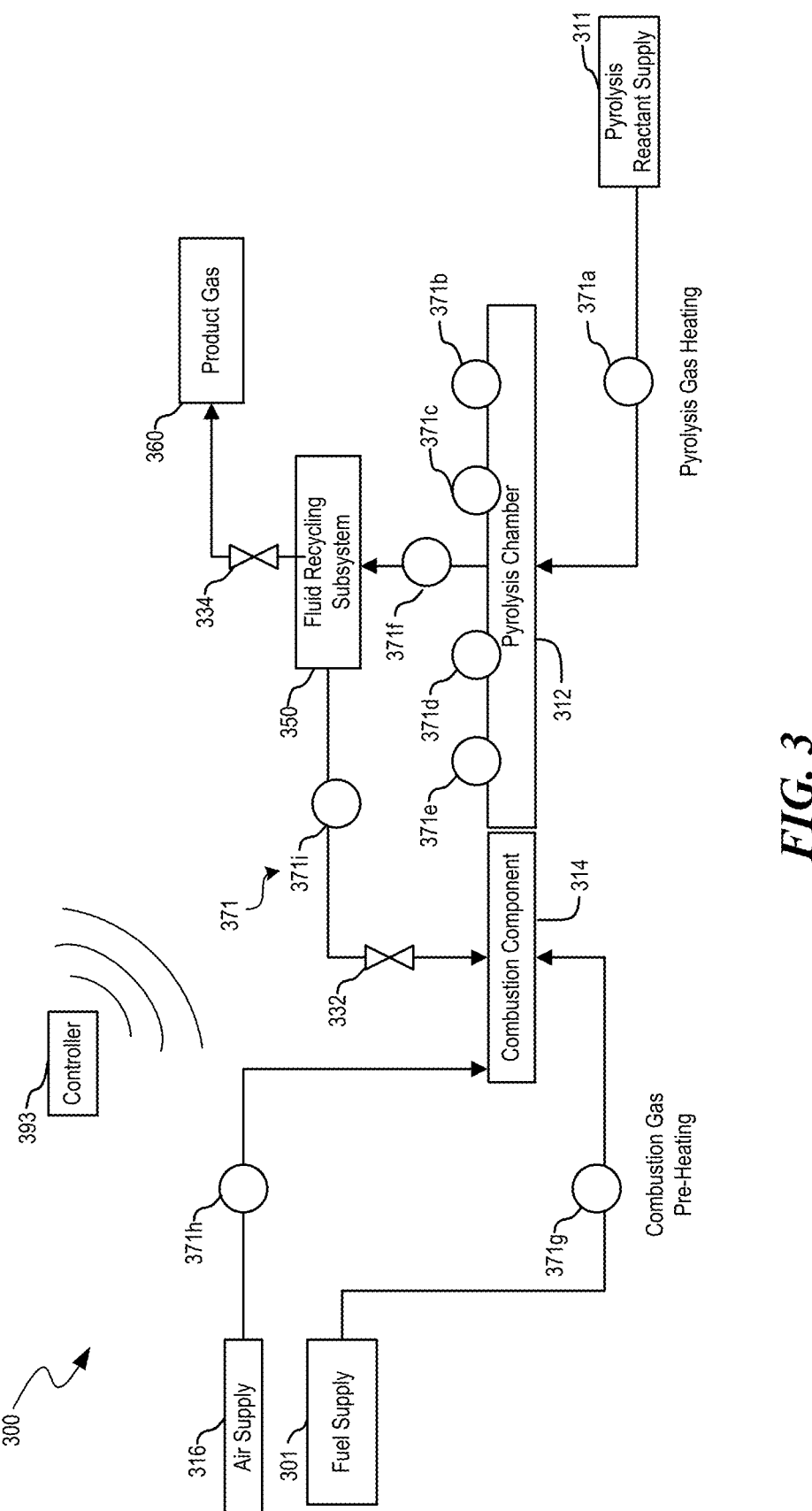
FIG. 3 is a schematic block diagram of a pyrolysis system that includes a set of heating elements, in accordance with embodiments of the present technology.

FIG. 3 is a schematic block diagram of a pyrolysis system 300 that includes a set of heating elements, in accordance with embodiments of the present technology. The pyrolysis system 300 can be used to perform pyrolysis reactions to generate a production stream that includes one or more target molecules, such as hydrogen gas. The pyrolysis system 300 includes a pyrolysis chamber 312 (e.g., the pyrolysis chamber 212) and a combustion component 314 (e.g., the combustion component 214). The pyrolysis system 300 also includes a set of heating elements 371a-371h (collectively referred to as "the heating elements 371") to provide thermal energy to fluids flowing into or from the pyrolysis chamber 312, the combustion component 314, or another component of the pyrolysis system 300. The heating elements 371 can include electric heating elements, solar-powered heating elements, geothermal heating elements, nuclear-powered heating elements, waste process heating elements, microwave heaters, plasma heaters, etc. One or more heating elements of the heating elements 371 can directly heat the pyrolysis chamber 312. Alternatively, or additionally, at least one of the heating elements 371 can preheat the reactant, fuel, air, or other fluids used in the pyrolysis system 300.

The pyrolysis chamber 312 is fluidly coupled to a pyrolysis reactant supply 311 to receive a hydrocarbon reactant (e.g., methane, natural gas, and/or any other suitable hydrocarbon). The hydrocarbon reactant can travel from the pyrolysis reactant supply 311 to the pyrolysis chamber 312 along an input channel (e.g., pipes). The input channel can include a first heating element 371a. That is, the pyrolysis system 300 can include the first heating element 371a positioned between the pyrolysis reactant supply 311 and the pyrolysis chamber 312, such that the first heating element 371a can preheat the incoming pyrolysis reactant upstream from the pyrolysis chamber 312.

In the illustrated embodiments, the second heating element 371b, third heating element 371c, fourth heating element 371d, and/or fifth heating element 371e can provide additional heat (e.g., to supplement heat from the combustion component 314) to the pyrolysis chamber 312. In some embodiments, the second-fifth heating elements 371b-371e, when operated at maximum capacity, provide enough heat for the pyrolysis chamber 312 to reach a target enthalpy point and/or drive pyrolysis reactions. As a result, the second-fifth heating elements 371b-371e can drive pyrolysis reactions in the pyrolysis chamber 312 while the combustion component 314 is turned off (e.g., for maintenance). Additionally, or alternatively, some embodiments of the present technology can reduce the fuel consumed by the combustion component 314 and activate or increase use of at least one of the heating elements 371 in reaction to available power for the second-fifth heating elements 371b-371e. Furthermore, some embodiments can fully deactivate the combustion component 314 and rely on at least one of the second-fifth heating elements 371b-371e to heat the pyrolysis chamber 312.

Additionally, or alternatively, the second-fifth heating elements 371b-371e can help maintain a temperature of the pyrolysis chamber 312 between active reaction periods (e.g., during periods of low demand for hydrogen). Said another way, the second-fifth heating elements 371b-371e can help keep the pyrolysis chamber 312 at (or near) reaction temperature when the pyrolysis system 300 is otherwise inactive, allowing the pyrolysis system 300 to quickly respond to demand and/or increasing an efficiency of the pyrolysis system 300 by reducing warm-up periods.

In some embodiments, the combustion component 314 includes one or more burners (e.g., the burner(s) 114 of FIG. 1) that receive fuel from a fuel supply 301 (e.g., the fuel supply 201 of FIG. 2) along an input channel. Similar to the reactant input channel, the input channel for the combustion fuel can include the seventh heating element 371g to preheat incoming combustion fuel. The heat provided by the seventh heating element 371g can increase an efficiency of the combustion (e.g., reducing the amount of fuel needed to achieve a target heat output, reducing the amount of input heat needed to start the combustion, and/or the like). Further, the pyrolysis system 300 can include (or be couplable to) an air supply 316 (e.g., any of the examples of the air supply 216 of FIG. 2) to supply air or another oxygen-carrying fluid to the combustion component 314. An input channel for the air can include the eighth heating element 371$h$, allowing the eighth heating element 371$h$ to preheat the incoming air. Similar to the discussion above, the heat provided by the eighth heating element 371$h$ can increase the efficiency of the combustion (e.g., reducing the amount of fuel needed to achieve a target heat output, reducing the amount of input heat needed to start the combustion, and/or the like).

As further illustrated in FIG. 3, the pyrolysis system 300 can include a controller 393 that is operably coupled to one or more of the components of the pyrolysis system 300. Purely by way of example, the controller can adjust operation parameters of the air supply 316 to control an oxygen-to-fuel ratio in the combustion component 314. The oxygen-to-fuel ratio can, for example, alter a temperature of the combustion and/or alter byproducts produced by the combustion. In another example, the controller 393 can control operating parameters of the heating elements 371.

In some embodiments, the operational parameters of one or more of the heating elements 371 depends on (and/or is otherwise based on) a flowrate of an associated flow path. For example, the seventh heating element 371$g$ can be an electrical heating element that the controller 393 can control via a drive current parameter. In this example, the controller 393 can increase the drive current in response to an increase in a fuel flowrate from the fuel supply 301 to the combustion component 314 (e.g., based on explicit instructions to increase the flow rate, a measured increase, and/or the like). As a result of the increase in the drive current, the seventh heating element 371$g$ can deliver more heat to the input channel. In turn, for example, the controller 393 can increase the thermal flux from the seventh heating element 371$g$ to maintain the heat transfer rate per volume of incoming fuel. In some embodiments, the controller 393 adjusts the operation of one or more of the heating elements 371 based on the flowrate in one or more adjacent flow paths. For example, the controller 393 can adjust the operating parameters of the first heating element 371$a$ to increase the heat delivered by the first heating element 371$a$ in response to a decrease in the flow rate from the fuel supply 301 to the combustion component 314. The increase can help ensure that the pyrolysis reactant is heated to the enthalpy point (and/or beyond) within the pyrolysis chamber 312.

As further illustrated in FIG. 3, the pyrolysis system 300 can include a fluid recycling subsystem 350 that is fluidly coupled to an output of the pyrolysis chamber 312. The fluid recycling subsystem 350 can recycle one or more components (e.g., hydrogen gas, byproducts, unreacted hydrocarbons, and/or the like) of a product stream generated by the pyrolysis chamber 312. More specifically, the fluid recycling subsystem 350 can receive the product stream and recycle a portion of the product stream through the combustion component 314. In various embodiments, the fluid recycling subsystem 350 can include one or more valves, one or more gas separators (e.g., to isolate and/or recycle specific gasses in the product stream), one or more product separators (e.g., to remove various products and/or byproducts from the product stream and/or the recycling stream), one or more sequestration components (e.g., a carbon dioxide sequestration component to absorb $CO_2$ from the product stream), one or more gas analysis components to analyze a content of the product stream and/or the recycle stream, and/or the like. Said another way, in various embodiments, the product recycling system can include the carbon separator 221, a sequestration component generally similar to the carbon sequestration component 202, the byproduct separator 222, the product compressor-separator system 223, and/or associated components discussed above with reference to FIG. 2. Further, the pyrolysis system 300 can include various components that help facilitate recycling and/or increase an efficacy of the recycling.

For example, the sixth heating element 371$f$ can be coupled to a channel between the pyrolysis chamber 312 and the fluid recycling subsystem 350 to heat the product stream exiting the pyrolysis chamber 312. The sixth heating element 371$f$ can help reduce an energy required by one or more components of the fluid recycling subsystem 350 (and/or components attached to the fluid recycling subsystem 350) to separate constituents in the product stream. For example, the sixth heating element 371$f$ can reduce the power consumed by a carbon separator, a byproduct separator, another type of separator, a compressor, and/or the like. In another example, the sixth heating element 371$f$ can cause further reaction of compounds in the product stream. The further reactions can help remove byproducts, heat a catalyst, and/or complete the pyrolysis reactions. In yet another example, the sixth heating element 371$f$ can help maintain a heat in the product stream, some of which can be recycled to the combustion component 314 by the fluid recycling subsystem 350. By maintaining the heat in the product stream, the sixth heating element 371$f$ can help maintain efficient combustion and/or heat transfer from the combustion component 314 to the pyrolysis chamber 312.

As further illustrated in FIG. 3, the pyrolysis system 300 can include a first valve 332 and a second valve 334. The first valve 332 is coupled to a flow path between the fluid recycling subsystem 350 and the combustion component 314. The first valve 332 can control (e.g., block, limit, allow, and/or the like) a flow between the fluid recycling subsystem 350 and the combustion component 314. Similarly, the second valve 334 is coupled to a flow path between the fluid recycling subsystem 350 and a product gas storage or delivery 360. The second valve 334 can control a flow between the fluid recycling subsystem 350 and the product gas storage or delivery 360. The controller 393 can be operatively coupled the first and second valves 332, 334. As a result, the controller 393 can manipulate the first valve 332 to start, increase, decrease, or stop the flow from the fluid recycling subsystem 350 to the combustion component 314. Additionally, or alternatively, the controller 393 can manipulate the second valve 334 to start, increase, decrease, or stop the flow to a product gas storage or delivery 360.

Furthermore, the controller 393 can cause a corresponding change to operating parameters of the ninth heating element 371$i$ based on performance of the combustion component 314, a temperature of products (and byproducts) that are recycled and by the fluid recycling subsystem 350 and directed toward the combustion component 314, and/or a flow rate of the recycled stream. For example, the controller 393 can receive instructions to reduce a flow rate of recycled Hydrogen into the combustion component 314. The controller 393 can then adjust the valve 332 to reduce the flow from the fluid recycling subsystem 350 and adjust an operational parameter controlling the ninth heating element 371$i$ to reduce the amount of heat generated by the ninth heating element 371$i$.

Different embodiments can vary in the position, type, and number of heating elements of a pyrolysis system. Some embodiments can include heating elements in other positions, can lack one or more heating elements described in this disclosure, or can include no heating elements whatsoever. Furthermore, heating elements used in pyrolysis system 300 can be of the same type or can vary between types. For example, a first heating element used to preheat a reactant gas before the reactant gas enters a pyrolysis chamber of a pyrolysis system can be a waste heat heating element that transports a coolant (e.g., water) that was in thermal contact with the product stream exiting a pyrolysis chamber to an inlet stream of the pyrolysis chamber. A second heating element of the pyrolysis system can be powered by an electrical connection to an electrical grid and provide heat in the pyrolysis chamber itself to augment or replace the heat provided by a combustion chamber. For example, another heating element can provide microwave or plasma heating to the process fluid in the pyrolysis system.

Pyrolysis systems may be deployed in a variety of geographies with varying user goals or prices of fuels and electricity. Even in a given location, the cost of fuel and/or electricity can shift throughout the day, thereby shifting how the pyrolysis system 300 should be operated to reduce (or minimize) operating costs. As a result, it is valuable to be able to shift between electrical heating versus fuel-based heating. Additionally, or alternatively, demand for constituents of the product stream can vary throughout the day. As a result, it is valuable to be able to re-route fluid flows within the pyrolysis system to achieve different goals (e.g., to meet varying demand for hydrogen and/or solid carbon, lower operating cost, lower carbon intensity (CI) of hydrogen produced, and/or the like).

FIG. 4 depicts an example of a table that a pyrolysis system and/or controller can use to guide control of the relative energy input from a combustion component and a set of electrically powered heating elements, in accordance with some embodiments of the present technology. The table 400 (sometimes also referred to herein as a "look-up-table," a conceptual logic table, and/or the like) includes a set of other descriptive parameters represented in dashed box 481, a set of product targets represented in dashed box 482, and a set of operational shift instructions represented in dashed box 483 used to adjust operational parameters. A "1" in the dashed box 481 or the dashed box 482 indicates an associated threshold value corresponding to a column has been satisfied. For example, with reference to the first row of the conceptual logic table 400, in cases where the "low electricity" is set to "1," the "low CI electricity" is set to "0," "low gas" is set to "0," "$/kg H2" is set to "1," "CI of H2" is set to 0, and "$/kg H2 AND CI of H2 (in some TBD ratio)" is set to "0," the pyrolysis system and/or controller can modify operations to shift to electricity driven input. Some embodiments can use an application performing operations based on the table 400 to operate a pyrolysis reactor.

In some embodiments, a controller of a pyrolysis system (e.g., the controller 393 with reference to FIG. 3, or the controller 293 with reference to FIG. 2, and/or the like) automatically, or via operator instruction, recognizes that different operating conditions indicated by the set of other descriptive parameters represented in the dashed box 481 have been met. Alternatively, some embodiments may determine that customer goals indicated in the set of product targets represented in dashed box 482 have changed. In response to a determination that a set of operating conditions is met or that a set of product targets have changed, the pyrolysis system and/or controller can tweak how the pyrolysis system is operating (e.g., by adjusting relative energy input of electricity versus combustion, adjusting the amount of product gas recycled to the combustion system, and/or the like).

In a specific, non-limiting example (represented by the first row of the table 400), in a scenario where electricity price is variable (indicated by "1" for the column "low cost electricity"), an operating cost is an indicated product target (indicated by "1" for the column "$/kg H2"), a controller use more electricity (indicated by "1" for the column shift toward electricity-driven energy input") to drive operation of the pyrolysis system. In another specific, non-limiting example (represented by the tenth row of the table 400), when electricity prices increase, the controller can modify operations of the pyrolysis system to use less electricity and more gas. In yet another specific, non-limiting example (represented by the first and second rows of the table 400 together), in a scenario where carbon credit price is variable, a the controller (automatically or via customer input) can flip between rows 1 and 2 of FIG. 4 when carbon credit prices are low and high, respectively. In yet another specific, non-limiting example, the controller account for a first interval during which pyrolysis system efficiency is prioritized and a second during which pyrolysis system efficiency is de-prioritized. For example, some embodiments can prioritize system efficiency because more power is required in a target application and then de-prioritize efficiency when the target application requires less power. To account for such scenarios, the controller (or other suitable component) can switch from recycling more fluid from a product stream to recycling less fluid from the product stream. The switch can represent a change in operational mode that is less efficient to an operational mode that is more efficient, where the less efficient operational mode corresponds with a lesser carbon intensity relative to the carbon intensity corresponding with the more efficient operational mode.

FIG. 5 is a flow diagram of a process 500 for controlling recycling operations and heating element operations in a pyrolysis system (e.g., the pyrolysis systems 100, 200, or 300), in accordance with some embodiments of the present technology. The process 500 can be implemented by a controller and/or one or more processors in one or more of the systems described in this disclosure. The controller can be within the pyrolysis system (e.g., the controller 293 of FIG. 2 and/or the controller 393 of FIG. 3) or a remote component communicably coupled to the pyrolysis system. In some embodiments, one or more operations of the process 500 be implemented in response to input from a user.

In the illustrated embodiments, the process 500 begins at block 502 by obtaining a set of target parameters indicating operational limits, production targets, and/or emission targets. The target parameters can be received directly from a user via a user interface (UI), such as a command line prompt, or a graphical user interface (GUI). Additionally, or alternatively, the target parameters can be obtained based on values stored in or referred to by a configuration file, values transmitted to the controller from an external source, derived from the values transmitted to the controller, and/or based on values received via an application program interface (API) of a server.

In some embodiments, production targets can include a target hydrogen production rate and/or a target GHG emission rate and/or an operating cost rate. For example, a production target can include a target hydrogen production rate (e.g., 500 kilograms (kg) per day). Additionally, or alternatively, a production target can indicate an optimization to achieve a maximum or minimum value for a production target. For example, the process 500 at block 502 can include receiving a production target indicating a target hydrogen production rate, and determining and/or identifying solutions in a parameter space of possible operational parameters that satisfy the production target. In some embodiments, the process 500 identifies the possible operational parameters using a loss function that penalizes deviations from the production target.

In some embodiments, operational limits can include a minimum hydrogen production rate, a maximum GHG generation rate, a maximum electricity consumption rate, a maximum or target operating cost rate, etc. In the context of an optimization operation, solutions in the parameter space of parameters used to affect operations of a pyrolysis system can be constrained by an obtained set of operational limits. For example, the process 500 can include obtaining indications of a set of user preferences (e.g., targeting cost savings, targeting combustion fuel conservation, targeting hydrogen production rates) from an operator user of a pyrolysis system. As described elsewhere in this disclosure, the process 500 can include determining a set of parameter values for combustion fuel flowrate, reactant flowrate, recycled material flowrates, heating element rates, etc.

At block 504, the process 500 includes obtaining a set of descriptive parameters (e.g., cost parameters, financial parameters, etc.) indicating a resource availability. The set of descriptive parameters can include information not provided by sensors of a pyrolysis system, such as an availability of an external power supply, a cost of electrical power, a cost of hydrocarbon fuel, a price or reward value for hydrogen or carbon dioxide credits/offsets, a temperature forecast, a category or quantity indicating a current or future weather-elated event, needed fuel for a customer application, etc. For example, the process 500 can include receiving (or retrieving) a current gas and electricity price and determine whether to activate or an amount of power to provide to an electrical heating element.

At block 506, the process 500 includes obtaining a set of sensor measurements of the pyrolysis system. For example, the process 500 can obtain (receive and/or retrieve) sensor measurements from one or more sensors that are positioned to measure various characteristics of a pyrolysis chamber, a combustion chamber, a fluid flow path, a separator, a compressor, a reactant supply, a combustion fuel supply, and/or the like. In a specific, non-limiting example, the process 500 can obtain a set of flowrate measurements from flow meters attached to an outlet of a pyrolysis chamber, a byproduct separator, and/or a reactant supply. In another specific, non-limiting example, the process 500 can obtain a set of temperature measurements from temperature sensors attached to the outlet of the pyrolysis chamber, the byproduct separator, and/or the reactant supply.

In many cases, the complexity and specific variations in a pyrolysis system can make physics-based simulations impractical for real-time operations (e.g., to make real-time and/or near real-time decisions on how to control the pyrolysis system). To help address the complexity, a controller (or other suitable component) can use one or more prediction models, parameter-to-performance maps, look-up-tables, and/or the like, to predict outcomes or vary operational parameters based on the predictions and iterations to match the predictions with target outcomes. For example, the process 500 can obtain a target carbon intensity (CI) in relation to a hydrogen production operation. The CI of the hydrogen production operation can be based on (with reference to FIG. 2), a measure of (i) carbon output from a pyrolysis system (e.g., the pyrolysis system 200) using a carbon output sensor (e.g., the sensor 231*g*) attached to a product gas compressor or a flowrate and gas composition sensor (e.g., the sensor 231*k*, which is measures flowrate and composition from the combustion component 214 to the flue gas heat exchanger 218), and (ii) a hydrogen production rate using a hydrogen sensor (e.g., the sensor 231*j*) attached to an output of a product separator subsystem of the pyrolysis system. The process 500 can then compute the CI based on the measured carbon output and the measured hydrogen production rate, then provide the CI to a prediction model (e.g., a machine learning model, a Monte Carlo model, and/or a model based on random walk operations) to identify adjustments to operating parameters of the pyrolysis system.

At block 508, the process 500 includes determining a set of operating parameters based on the set of target parameters, set of descriptive parameters, and/or measurements from one or more sensors. The operating parameters can include a ratio of purified product stream to unpurified product stream that is diverted by a product stream recycling component (e.g., the fluid recycling subsystem 350 of FIG. 3) to the combustion component. Additionally, or alternatively, the operating parameters can include a ratio of purified product stream to unreacted reactant in the product stream diverted by the product stream recycling component to the combustion component. Additionally, or alternatively, the operating parameters can include a ratio of purified product stream to unreacted reactant in the product stream diverted by the product stream recycling component to the pyrolysis chamber. Additionally, or alternatively, the operating parameters can include a ratio of product stream diverted by the product stream recycling component to the combustion component to hydrocarbon fuel entering the combustion component. Each of the ratios can effect the energy generated by the combustion component, a content of the flue gas from the combustion component (e.g., carbon emission in the flue gas), an efficiency of the pyrolysis reactor, and/or a content of the product stream from the pyrolysis reactor. Further, various types of ratios can be computed, such as a thermal efficiency ratio, energy use ratio, CI, and/or the like.

In some embodiments, the operating parameters include drive parameters for one or more non-combustion heaters in the pyrolysis system (e.g., the heating elements 371 of FIG. 3). The drive parameters can help determine how much heat the non-combustion components provide to the pyrolysis system and/or where the non-combustion heat is provided.

At block 510, the process 500 includes updating operational parameters of the pyrolysis system based on the operational parameters determined at block 508. For example, the process 500 can adjust operational parameters (e.g., valve settings and/or the like) to satisfy one or more of the determined ratios, a target hydrogen production rate, an/or other target value. The target value(s) can include a target CI with respect to an amount of hydrogen produced, a hydrogen purity value, a target thermal efficiency, a target cost associated with production (where cost can be computed as a function of the descriptive parameters, price and an amount of fuel use, a carbon storage cost, an electricity cost), and/or the like. In some embodiments, the process 500 at block 510 adjusts one or more operational parameters based on a current ratio or a predicted ratio.

In some embodiments, the process 500 determines a ratio of hydrocarbon and non-hydrocarbon energy used to control for a set of heating elements of a pyrolysis reactor based on a set of sensor measurements and/or the descriptive parameters. The process 500 can then adjust the operational parameters (e.g., an amount of byproduct recycling, an amount of fuel to transfer to a combustion chamber, an amount of external electricity used, and/or the like) to adjust the ratio. For example, the process 500 can obtain a target parameter indicating instructions to maximize thermal efficiency. The process 500 can then modify a recycle rate, for example by manipulating one or more flows of fluid from a pyrolysis product heat exchanger, a carbon separator, a byproduct separator, a product compressor-separator system, and/or a product gas compressor to a pyrolysis chamber and/or a combustion component of the pyrolysis system. Additionally, or alternatively, the process 500 can modify an air-to-fuel ratio of fluids entering the combustion component (e.g., by increasing or decreasing fluid flow from an air supply of the pyrolysis system, a fuel supply of the pyrolysis system, and/or another component of the pyrolysis system).

In some embodiments, the process 500 uses a prediction model to generate a recommended set of operational parameters and update a user interface to indicate the recommended set of operational parameters. In some embodiments, the user interface requests a user's confirmation before the process 500 makes the recommended changes to the operational parameters at block 510. Alternatively, the process 500 can directly modify one or more operational parameters of a hydrogen production system without requiring a user's confirmation. For example, the process 500 can receive another descriptive parameter indicating a change in an electricity cost and, in response, modify a hydrogen recycling rate from a product compressor-separator system to a combustion component of a pyrolysis system. In some such embodiments, the process 500 includes presenting the change to the user after implementing the change, allowing the user to override the change and return to previous operational parameters.

In some embodiments, the process 500 adjusts different ratios to create intermediate targets, then uses the intermediate targets and/or measurements to adjust one or more operational parameters. For example, the process 500 can obtain a ratio of recycle gas composition, then use the recycle gas composition to increase or reduce an efficiency ratio (e.g., a ratio indicating an amount of hydrogen production with respect to an amount of energy or fuel consumed). In some embodiments, the process 500 uses an analytical model, an empirical model, a machine learning model, or another type of model that predicts a carbon dioxide production rate based on the efficiency ratio and, in response, determines a target efficiency ratio that the model predicts will result in the carbon dioxide production rate being satisfied. The process 500 can then update a set of operational parameters based on the target efficiency ratio by actuating a valve controlling an amount of gas being recycled into a combustion chamber or a pyrolysis chamber.

In some embodiments, the process 500 obtains a target hydrogen purity and modifies operational parameters over time to maintain the target hydrogen purity. For example, the process 500 can determine a hydrogen purity via a sensor attached to a product compressor-separator system of the pyrolysis system, then modify operational parameters (e.g., a flowrate or a fluid composition of fluid flowing into the combustion component, a flowrate or a fluid composition of fluid flowing into the pyrolysis chamber, temperature of fluid moving into the pyrolysis chamber, an amount of preheating delivered to the fluid moving into the pyrolysis chamber, adjust one or more valves, and/or the like) to help maintain (or adjust) the hydrogen purity. In a specific, non-limiting example, the process 500 can detect a drop in hydrogen purity resulting from a carbon buildup or a change in gas composition from a pyrolysis reactant supply of the pyrolysis system. The process 500 can then modify operations of a carbon separator to increase the separation capacity, reduce redirection of fluids back into the pyrolysis chamber, modify operations of a byproduct separator to reduce redirection of extracted byproduct back into the pyrolysis chamber, increase a recycle rate of the byproduct into the combustion component, and/or the like to increase the purity of the hydrogen. In another specific, non-limiting example, the process 500 can detect a decrease in hydrogen purity and, in response, modify operations of the pyrolysis system to increase a flowrate of recycling stream (e.g., product stream recycling, byproduct recycling) back into the pyrolysis chamber. Additionally, or alternatively, the process 500 can receive inputs (e.g., data and/or instructions) from an external computing device to increase a hydrogen production rate. In response, the process 500 can, for example, decrease a flowrate of one or more recycling streams (e.g., flow rate of a hydrogen being re-directed to the combustion chamber) and/or increase the flowrate of fuel being pumped into a combustion chamber.

It will be understood that a variety of prediction models can be used to predict target values. Further, it will be understood that the process 500 can use multiple models. For example, the process 500 use a first model that outputs a first value when provided with a first measurement, or a second model that outputs a second value when provided with a second measurement. In some embodiments, the outputs from one model are used as inputs for a second model. For example, a controller implementing the process 500 can receive instructions from a user indicating a new target carbon dioxide production rate. In this example, the controller can use an application storing a first machine learning model to predict a carbon dioxide production rate based on an efficiency ratio. The application can use the first machine learning model by iteratively or concurrently providing the first model with various efficiency ratios to determine a target efficiency ratio that, when provided as input to the first model, will cause the first model to output the target carbon dioxide production rate. The controller can then use the identified efficiency ratio in a second model to determine operating parameters that provide the identified efficiency ratio. Additionally, or alternatively, the application can store a second machine learning model that outputs a target efficiency ratio when provided with the target carbon dioxide production rate as an input.

At block 512, the process 500 can include reporting a set of parameter modifications, calculated ratios, or other determined values (e.g., to a user). In various embodiments, the process 500 can report various types of parameters, ratios, intermediate target parameters, or other values discussed above. Reporting a value can include displaying the value on a UI and/or sending the value to a remote device (e.g., from a server or other set computing devices). For example, the process 500 can use SCADA or another telecommunication system to report a set of sensor measurements, such as a measurement indicating a fluid composition of a final product gas, a flow rate, a temperature, a pressure, and/or the like. Additionally, or alternatively, some embodiments can calculate values, such as CI, a hydrogen production rate, etc. In some embodiments, a carbon offset associated with a CI or other values provided can be given a unique identifier (e.g., an identifier encrypted and stored in a blockchain system). Additionally, or alternatively, reporting the value can include storing the value in a database or other data structure.

In some embodiments, the process 500 reports values that are derived from other reported values. For example, the process 500 can report ratios such as a CI with respect to an amount of produced hydrogen or total carbon produced by calculating the mass balance based on a recycle rate, a fuel input, a composition of various fluid streams, and/or a hydrogen production. Some embodiments can then associate a value indicating the total carbon produced with an identifier stored on a blockchain or other type of distributed ledger. For example, some embodiments can determine that one ton of carbon was produced and update a value associated with the unique identifier to indicate an increase of one ton. Some embodiments can communicate, via SCADA or other telecommunications systems, with a computer system to indicate carbon or hydrogen production information. In some embodiments, the computer system may execute a set of applications implementing a digital marketplace for credits or rewards associated with hydrogen production, carbon production, or avoiding carbon dioxide emissions.

In some embodiments, the reported values cause additional operations in the process 500. For example, the process 500 can determine that a reported amount of produced solid carbon satisfies a solid carbon production threshold and/or that a reported amount of produced carbon oxides satisfies a carbon-oxide production threshold. In response to the determination(s), the process 500 can decrease a flowrate of one or more fluids flowing through a hydrogen production system (e.g., by adjusting one or more valves in the pyrolysis system). Additionally, or alternatively, the process 500 can modify the operations of and/or deactivate one or more subsystems of the hydrogen production system (e.g., modifying a product stream processing component). Additionally, or alternatively, the other operations can include execution of one or more operations of a distributed application executing on a distributed computing system. For example, the process 500 can update a distributed ledger to indicate a carbon production amount (e.g., a carbon production amount based on a CI ratio) and a distributed application (e.g., a smart contract application) can execute a transfer of carbon credits based on the update to the distributed ledger.

It should be understood that although the process 500 is discussed above primarily in the context of the identifying, determining, adjusting, and/or setting target parameters and/or operation parameters based on CI-related parameters or values derived from CI, the process 500 is not so limited. Purely by way of example, the process 500 can determine an amount of hydrogen produced based on a measured hydrogen production rate and execute a set of operations based on a determination that the amount of produced hydrogen causes a controller to actuate a valve to initialize transfer of hydrogen to secondary hydrogen storage facility.

III. Representative Burner

Embodiments of the present technology can include one or more burners that are configured to improve (or optimize) heat transfer from a combustion (and the resulting flue gas) to a stream of pyrolysis feedstock within the reactor. For example, as described in more detail below, the burner(s) can include components (e.g., internal flow paths for air, oxygen, combustion fuel, and/or the like; outlet nozzles; gas swirlers; internal fins; and/or any other suitable components) that are geometrically arranged to generate combustion and/or flue gas that travels radially and/or transverse to a longitudinal axis of a combustion chamber. The radial and/or transverse flow can help improve radial heat transfer from a first chamber (e.g., the combustion chamber) to a second chamber (e.g., a reaction chamber) that is peripheral and/or internal to the first chamber. Said another way, the burner(s) can include components that are configured to generate turbulence in the combustion chamber adjacent to the burner to help increase thermal transfer through the wall(s) of the combustion chamber. In a specific, non-limiting example, the burner(s) can include a set of radially symmetric orifices to help generate a radial combustion zone. In contrast to a point or spherical combustion zone, such as the combustion zone of a point burner, the heat from a radial combustion zone can be more effectively distributed along the inner wall of the combustion chamber. As a result, compared to a point combustion zone, the burner(s) can help increase the amount of heat transferred to the inner wall of the first chamber (and then into the second chamber) instead of being carried out of the first chamber by the flue gas.

Examples of suitable burner(s), their components, and associated systems and methods are discussed below with reference to FIGS. 6A-14. However, it will be understood that the present technology is not limited to any of the specific examples disclosed herein. For example, except where specifically indicated otherwise, components and/or design aspects from one example can be implemented in combination with components and/or design aspects from another example and/or modified to include various other components and/or designs. In a specific, non-limiting example, while many of the embodiments disclosed herein illustrate orifices that expel air and fuel in a generally parallel direction, the technology disclosed herein is not so limited. In some embodiments, the burner(s) disclosed herein include a set of orifices for air injection that are non-parallel with a set of orifices for fuel injection.

Figures 6A, 6B:
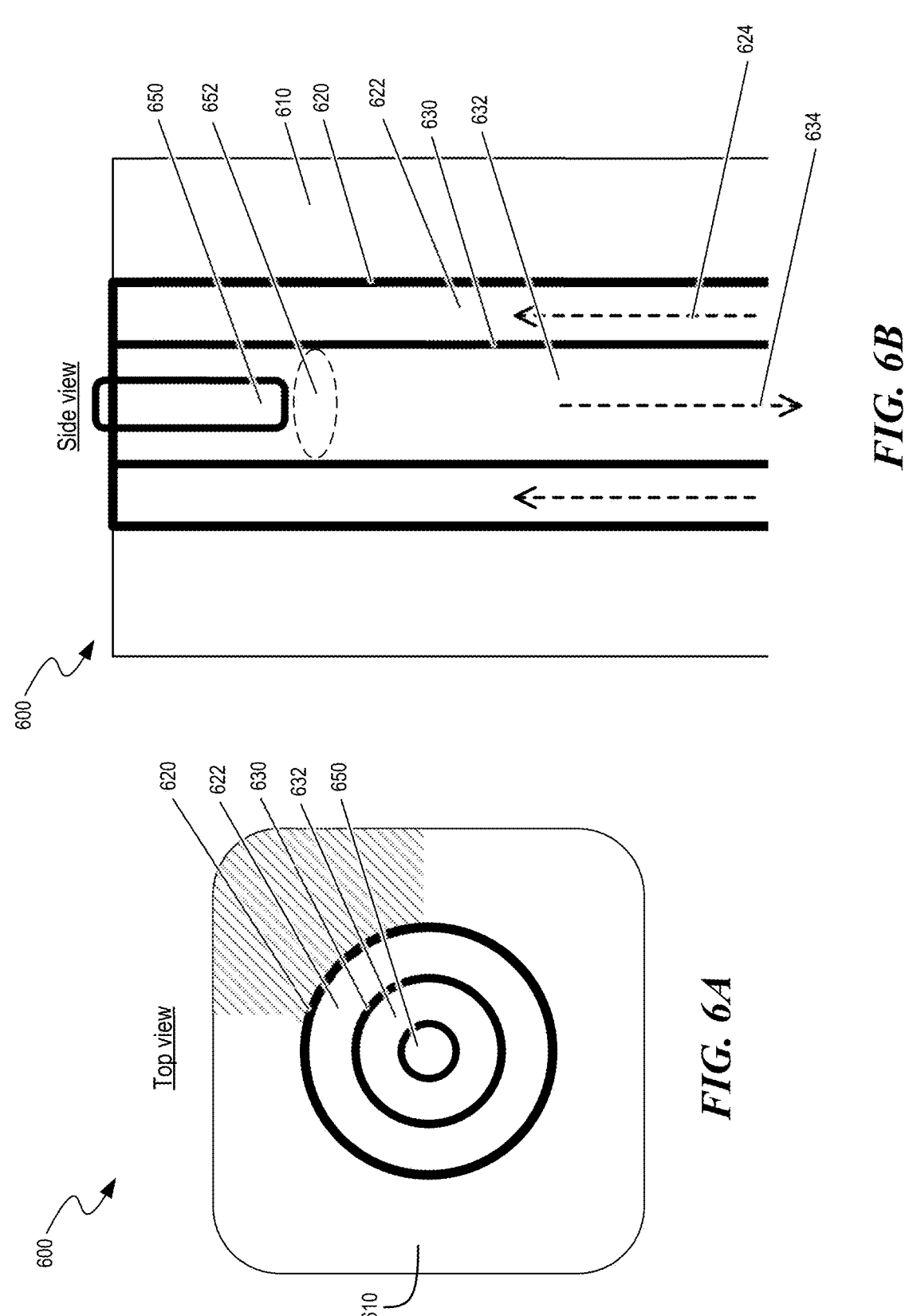
FIGS. 6A and 6B are partial schematic diagrams of a pyrolysis reactor, configured in accordance with embodiments of the present technology.

FIGS. 6A and 6B are partially schematic top and side views, respectively, of a pyrolysis reactor 600 configured in accordance with embodiments of the present technology. Referring to FIGS. 6A and 6B together, the pyrolysis reactor 600 can include an outer insulation layer 610, a first chamber 620 (sometimes also referred to as an "outer pyrolysis tube") surrounded by the outer insulation layer 610, and a second chamber 630 (sometimes also referred to as an "inner pyrolysis tube") that is surrounded by and concentric (and/or coaxial) with the first chamber 620. The pyrolysis reactor 600 also includes a burner 650 that is at least partially within and concentric (and/or coaxial) with the second chamber 630. The second chamber 630 can define a combustion chamber 632 downstream from the burner 650 (sometimes also referred to herein as a "combustion component"). Similarly, the first chamber 620 can define a pyrolysis chamber 622 between the wall of the first chamber 620 and the wall of the second chamber 630.

During operation of the pyrolysis reactor 600, the first chamber 620 can be fluidly coupled to a pyrolysis feedstock supply (e.g., a natural gas pipeline, a supply of natural gas, a supply of methane, and/or any other hydrocarbon supply) to receive a pyrolysis feedstock generally along a first flow path 624 (FIG. 6B). Meanwhile, the burner 650 can generate and ignite a mixture of a combustion fuel (e.g., a hydrocarbon fuel such as natural gas, methane, and/or the like; hydrogen gas; a mixture of hydrogen gas and a hydrocarbon fuel; and/or any other suitable fuel) and air (or pure oxygen, referred to generically as air herein) in a combustion zone 652 (FIG. 6B), downstream from the burner 650. Hot flue gas from the combustion can then flow through the combustion chamber 632 generally along a second flow path 634. As the flue gas flows along the second flow path 634, a portion of the heat from combustion is transferred to the pyrolysis feedstock through the wall of the second chamber 630 (e.g., via thermal interactions between the hot flue gas and the wall). The transferred heat can thereby drive a pyrolysis reaction within the pyrolysis chamber 622 of the type discussed above, thereby generating hydrogen gas and solid carbon (and/or various byproducts).

In the illustrated embodiment, the first flow path 624 and the second flow path 634 are positioned in generally opposite directions. It will be understood, however, that the technology is not so limited. For example, in some embodiments, the first flow path 624 and the second flow path 634 are generally parallel (e.g., flow in the same direction). Further, although the first flow path 624 and the second flow path 634 are illustrated as having a continuous, linear pathway, it will be understood that the technology disclosed herein is not so limited. In various other embodiments, the first flow path 624 and/or the second flow path 634 can include at least one turn (e.g., an elbow and/or curved joint between two linear portions) and/or can be generally curved.

An overall efficiency of the pyrolysis reactor 600 can depend on, among other factors, how much of the heat from the combustion is transferred from the combustion chamber 632 to the pyrolysis chamber 622 versus how much heat is carried out of the combustion chamber 632 by the flue gas moving along the second flow path 634. That is, the overall efficiency of the pyrolysis reactor 600 can depend on what portion of the heat is transferred from the combustion chamber 632 to the pyrolysis chamber 622. Further, the burner 650 can include various features discussed in more detail below to help increase a heat transfer rate between combustion chamber 632 and the pyrolysis chamber 622. Said another way, the burner 650 can be configured to increase the amount (and/or the portion) of heat from the combustion transferred from the combustion chamber 632 to the pyrolysis chamber 622. For example, the burner 650, configured in accordance with the embodiments of the technology described herein, can help transfer between about 55% and about 95% of the heat from the combustion (in the combustion chamber 632) to the pyrolysis chamber 622 to drive the pyrolysis reaction therein. In various other examples, the burner 650 helps transfer at least 55%, at least 60%, at least 65%, at least 70%, at least 75%, at least 80%, at least 85%, at least 90%, and/or at least 95% of the heat from the combustion to the pyrolysis chamber 622. In still further examples, the burner 650 helps transfer between about 65% and about 75% of the heat from the combustion to the pyrolysis chamber 622.

Purely by way of example, as discussed in more detail below, the burner 650 can include independent delivery channels for the combustion fuel and the air (e.g., the burner 650 can avoid mixing the fuel and the air until the combustion zone 652). Further, the independent delivery channels can be coupled to orifices that are positioned and/or oriented to manipulate a flame from the combustion and/or a flow of flue gas away from the combustion. More specifically, the orifices are positioned and/or oriented to generate a radial and/or transverse component (e.g., radially and/or transverse with respect to a longitudinal axis of the burner 650 and/or the second chamber 630) to the combustion flames and/or a flow of the flue gas. The radial and/or transverse component can generate and/or increase flame-wall interactions and/or gas-wall (as compared to a point burner) to help increase the portion of the heat transferred from the combustion chamber 632 to the pyrolysis chamber 622. Said another way, the burner 650 can manipulate the way that the flames are generated to help establish indirect radial heat transfer through the wall of the second chamber 630 (and into the pyrolysis chamber 622). As a result, the burner 650 can help improve heat transfer efficiency to drive the pyrolysis reaction with less fuel combustion compared to a point burner.

In a specific, non-limiting example discussed in more detail below, the orifices coupled to the delivery channel(s) for the fuel can be coaxial (e.g., positioned annularly within and/or annularly around) with the orifices coupled to the delivery channel(s) for the air. As a result, the combustion can require gasses to move transverse to the longitudinal axis of the burner 650 and/or the combustion chamber 632, resulting in flame-wall and/or gas-wall interactions that can transfer heat from the combustion chamber 632 to the pyrolysis chamber 622. In another specific, non-limiting example discussed in more detail below, one or more of the orifices can be positioned to direct fuel gas and/or air at an angle to the longitudinal axis of the burner 650 and/or the combustion chamber 632. As a result, the combustion (and the resulting flue gasses) can travel at least partially at an angle to the longitudinal axis of the burner 650 and/or the combustion chamber 632. In turn, combustion flames and/or flue gas can interact with the wall of the second chamber 630, resulting in heat transfer from the combustion chamber 632 to the pyrolysis chamber 622. In yet another specific, non-limiting example discussed in more detail below, the burner can include one or more swirler components upstream from the orifices. The swirler components can result in a vortex flow in the combustion zone 652 that directs flames and/or flue gas radially and/or transverse to the longitudinal axis of the burner 650 and/or the combustion chamber 632. That is, the vortex flow from the swirler components can help increase flame-wall and/or gas-wall interactions that can transfer heat from the combustion chamber 632 to the pyrolysis chamber 622. Additional details on these and other examples are discussed below with respect to the embodiments of FIGS. 7A-14.

Further, a burner configured in accordance with embodiments of the present technology (e.g., the burner 650 of FIGS. 6A and 6B) can result in temperatures on surfaces of the burner of at least 1000° Celsius (° C.), at least 1050° C., at least 1100° C., at least 1150° C., at least 1200° C., at least 1250° C., at least 1300° C., at least 1350° C., or 1400° C. In some embodiments, the temperature of distal surfaces of the burner can range between about 1100° C. and about 1500° C., or between about 1200° C. and about 1400° C. To help accommodate the relatively high temperature (e.g., compared to a point burner), the burner can include various non-conventional materials and/or omit various common materials. For example, in various embodiments, the burner can include Nickle-200 (sometimes also referred to as "Ni200"), Nickle-201, Haynes-214, Haynes-230, Inconel-602CA, Inconel-301, Inconel-800H, Inconel-718, Inconel-625, Hastelloy X, Ohmalloy-145B, Kanthal APM, Kanthal APMT, UNS S31600, UNS S31603, UNS S30400, UNS K91470, UNS K91670, UNS NO2201, UNS NO2200, UNS N10276, or UNS N06002, various other suitable aluminum oxide forming metals, and/or the like. While these materials can be difficult and/or expensive to work with while forming and/or assembling components burner, these materials can advantageously form and/or include an aluminum oxide coating on the hot surfaces that can be resistant to oxidation, coking, corrosion, and/or the like at the relatively high temperatures. As a result, these materials can help increase a lifespan of the burner and/or reduce the maintenance required for an associated reactor system. In another example, the burner does not include any stainless steel in the components of the burner. The omission of stainless steel can also help reduce oxidation, coking, corrosion, and/or the like at the relatively high temperatures. Additional details on these and other examples are also discussed below with respect to the embodiments of FIGS. 7A-14.

FIGS. 7A and 7B are partially schematic front and cross-sectional views, respectively, of a burner 700 with an extended fuel nozzle configured in accordance with embodiments of the present technology. As illustrated in FIG. 7A, the burner 700 (sometimes also referred to herein as a "combustion component") can include an input channel and a burner housing 710 coupled to a distal end region of the input channel 702. As best illustrated in FIG. 7B, the input channel 702 (sometimes also referred to herein as a "first input channel," a "fuel input channel," and/or the like) can be a pipe with a central passageway 704 that provides a first flow path 706 for incoming combustion fuel (e.g., natural gas, methane, hydrogen gas, and/or the like). The first flow path 706 extends through the central passageway 704 to one or more first orifices 708 (sometimes also referred to herein as "fuel outlets") at a distal end region of the input channel 702. Similarly, the burner housing 710 includes a channel 714 (sometimes referred to herein as a "second input channel," an "air input channel," and/or the like) extending from one or more inputs 712 to one or more second orifices 718 (sometimes also referred to herein as "air outlets"). The channel 714 can have a conical frustum shape (or any other suitable shape) to provide a second flow path 716 for incoming air (e.g., from a blower, compressor, pump, and/or any other suitable air supply). The burner housing 710 can be positioned at least partially within a chamber (e.g., a combustion chamber, a combined combustion and pyrolysis chamber, and/or the like) of a pyrolysis reactor (e.g., within the second chamber 630 of FIGS. 6A and 6B). As a result, the one or more first orifices 708 and the one or more second orifices 718 can direct the incoming fuel and air, respectively, into the chamber to create a mixture downstream from the burner 700 for combustion within the chamber.

Further, the burner 700 can include various components that help create a radial and/or transverse flow (e.g., with respect to a longitudinal axis of the chamber) in the mixture and/or flue gas from the combustion. As discussed above, the radial and/or transverse flow help generate interactions between the combustion flames and/or flue gas and walls of the chamber, thereby helping to transport heat from the combustion through the walls (e.g., from the second chamber 630 of FIGS. 6A and 6B and into the first chamber 620 to drive a pyrolysis reaction therein). For example, in the illustrated embodiments, the one or more first orifices 708 are at a non-zero angle with respect to the longitudinal axis of the burner 700 and/or the longitudinal axis of the chamber coupled thereto (e.g., positioned to direct the incoming fuel at a non-zero angle with respect to the longitudinal axis of the burner 700). The non-zero angle directly creates a transverse component to the flow of the mixture and/or turbulence by directing the combustion fuel at least partially transverse to the longitudinal axis. In some embodiments, the non-zero angle can be about 90 degrees (e.g., a right angle), thereby directing the combustion gas orthogonal (e.g., perpendicular) to the longitudinal axis of the burner 700 and/or the longitudinal axis of the chamber coupled thereto.

That is, during operation, a combustion fuel can flow along the first flow path 706 while air flows along the second flow path 716. The combustion fuel is then emitted through the one or more first orifices 708 at an angle with respect to the longitudinal axis of the burner 700 and/or a corresponding chamber while the air is emitted along the longitudinal axis. As a result, the fuel crosses paths with the air to create a mixture that is flowing at least partially at a non-zero angle with respect to the longitudinal axis. The mixture can then be combusted, creating flame and/or flue gas interactions with the walls of the corresponding chamber. The interactions, in turn, can help increase the transfer of heat from the combustion through the wall of the chamber (e.g., allowing the heat to drive a pyrolysis reaction in an adjacent chamber).

Additionally, or alternatively, the burner 700 can include a swirler component 720 fluidly coupled to the second flow path 716. For example, the swirler component 720 (sometimes also referred to herein as a "swirler," a "vortex generator," and/or the like) can be positioned within the channel 714 such that an incoming flow of air must travel through the swirler component 720. As discussed in more detail below, the swirler component 720 can include one or more fins, channels, grooves, and/or the like that are positioned at an angle with respect to the longitudinal axis and wrap annularly around the input channel 702. As a result, the air delivered to the chamber through the one or more second orifices 718 can generate a vortex within the chamber. The vortex, in turn, generates radial flow in the mixture and/or combustion flames to help transfer heat into the wall of the chamber. The number, length, angular orientation, and/or thickness of the fins (or other) components of the swirler component 720 can be chosen to create the vortex based on a predetermined target heat flux profile (e.g., to transfer between about 55% and about 95% of the heat from the combustion through the wall of the chamber).

The incoming air can have a relative weight that is higher than the incoming combustion fuel. Accordingly, it is advantageous to swirl the incoming air to establish the vortex. As a result, in the illustrated embodiments, the swirler component 720 is positioned within the channel 714 to swirl the incoming air along the second flow path 716. However, it will be understood that the technology is not so limited. In some embodiments, the swirler component 720 is positioned within the central passageway 704 to swirl incoming fuel along the first flow path 706. Alternatively, the burner can include a first swirler component positioned within the central passageway 704 to swirl incoming fuel along the first flow path 706 and a second swirler component positioned within the channel 714 to swirl the incoming air along the second flow path 716. As a result, the multiple swirler components can help create a vortex with complex flows to increase flame-wall and/or flue gas-wall interactions.

During operation of the burner 700, the combustion of the mixture can gradually heat components at a distal end region of the burner 700. For example, as further illustrated in FIG. 7B, the burner 700 can further include an endcap 730. During operation of the burner 700, a distal-facing surface of the endcap 730 (and/or various other components such as a distal end region of the first input channel 702, a distal surface of the burner housing 710, and/or the like) can reach temperatures of at least 1000° C., at least 1050° C., at least 1100° C., at least 1150° C., at least 1200° C., at least 1250° C., at least 1300° C., at least 1350° C., or 1400° C. In some embodiments, the temperatures of the distal components of the burner can be between about 1200° C. and about 1400° C. In such embodiments, the burner 700 can include various features to help address the relatively high temperatures. For example, as discussed above, components of the burner 700 can be manufactured from heat-resistant and/or aluminum oxide-forming materials (e.g., Ni200). While more difficult to manufacture (e.g., to weld, shape, and/or the like), these materials can be more resistant to detrimental effects at the relatively high temperatures. Additionally, or alternatively, the burner 700 can omit stainless steel from the components thereof to help eliminate potential sources for oxidation, coking, corrosion, and/or the like.

As further illustrated in FIG. 7B, the burner 700 can further include an endcap 730. In the illustrated embodiments, the endcap 730 closes a distalmost portion of the input channel 702 (e.g., closing the central passageway 704) and extends in a proximal direction through the central passageway 704. The endcap 730 can include a thermally conductive material (e.g., any of the aluminum oxide formers discussed above with reference to FIG. 6B). As a result, the endcap 730 can transport heat away from the distalmost portion of the input channel 702. The transportation, in turn, can provide two benefits to the burner 700. First, the transportation can help prevent the distalmost portion of the input channel 702 from overheating, which can lead to coking in the one or more first orifices and/or other degradation of the burner 700. Second, the transportation can provide the transported heat to incoming combustion fuel. That is, the transportation can preheat incoming combustion fuel to help increase an efficiency of the combustion (e.g., requiring less input energy and/or increasing output energy), and therefore help increase the efficiency of the burner 700 and/or an associated pyrolysis reactor.

It will be understood that the burner 700 of FIGS. 7A and 7B can include various additional (or alternative) components. For example, the burner 700 can include another tube (or pipe) that is coaxial with the pipe of the input channel 702 that provides a connection for an ignition component. In another example, the burner 700 can include various other heat management components thermally coupled to the distal region of the burner 700. In a specific, non-limiting example, the burner 700 can include one or more fins that extend proximally from the distal end region of the burner 700 through the channel 714 (and any other channel providing the second flow path 716 for incoming air). As a result, similar to the endcap 730, the fin(s) can help preheat incoming air to help improve the efficiency of the burner 700 and/or the pyrolysis reactor overall.

Figure 8:
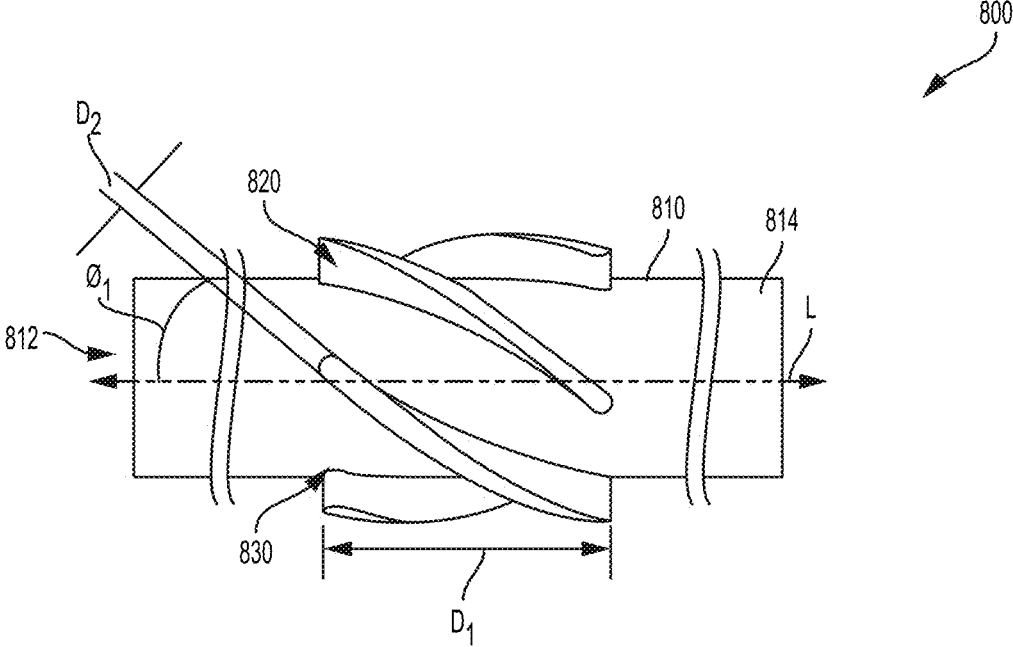
FIG. 8 is a schematic side view of a swirler component for a burner configured in accordance with embodiments of the present technology.

FIG. 8 is a schematic side view of a swirler component 800 for a burner configured in accordance with embodiments of the present technology. In the illustrated embodiment, the swirler component 800 includes a core portion 810 (e.g., a core tube and/or pipe) that has an internal channel 812 extending therethrough and an outer surface 814. The internal channel 812 can allow the swirler component 800 to be positioned coaxially with one or more other components (e.g., the input channel 702 of FIGS. 7A and 7B). As further illustrated in FIG. 8, the swirler component 800 can also include one or more fins 820 (four shown illustrated in FIG. 8) coupled to the outer surface 814. The fins 820 (sometimes also referred to herein as "veins," "channel walls," "dividers," and/or the like) define flow channels 830 between adjacent fins 820. Further, the fins 820 (and the flow channels 830 therebetween) are at an angle $\Theta_1$ with respect to a longitudinal axis L of the swirler component 800 (and/or a corresponding burner and/or chamber of a pyrolysis system). As a result, air flowing through the flow channels 830 (e.g., along the second flow path 716 of FIG. 7B) is directed radially around the core portion 810, thereby generating a vortex flow pattern.

The vortex that is generated can depend on a length of the fins 820 (sometimes also referred to as fin height), a thickness of the fins 820, the angle $\Theta_1$ of the fins 820, and/or the number of the fins 820. Further, because the vortex is created in the incoming air (which, as discussed above, has a larger weight than the incoming fuel), the resulting vortex can dictate heat transfer properties of a corresponding burner (e.g., the amount of flame-wall interactions, the amount of much flue gas-wall interactions, what portion of the heat from the combustion is transferred, and/or the like). In various embodiments, the fins 820 can extend along a portion of the outer surface having a length $D_1$ (e.g., the effective length of the fins 820) between about 0.5 inches (in.) and about 1.2 in.; a thickness $D_2$ of the fins 820 can be between about 0.03 in. and about 0.125 in.; the swirler component 800 can include between 4 and 12 of the fins 820; and the angle $\Theta_1$ of the fins 820 can be between about 45 degrees and about 75 degrees. Swirler components having fins according to the above ranges can result in between about 55% and about 95% of the heat from combustion being transferred through the walls of a corresponding combustion chamber.

Figure 9A:
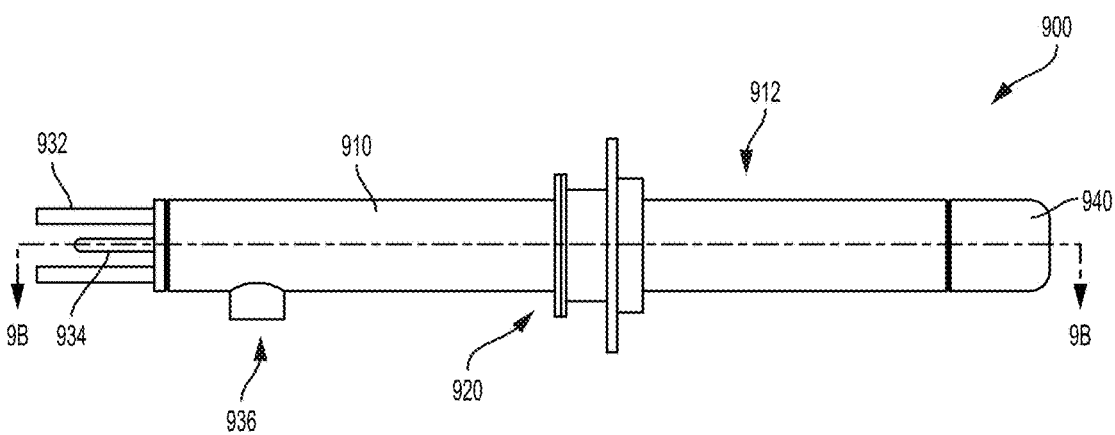
FIGS. 9A-9E are partially schematic illustrations of a burner with a parallel aperture structure configured in accordance with embodiments of the present technology.

FIGS. 9A-9E are partially schematic illustrations of a burner 900 with a parallel aperture structure configured in accordance with embodiments of the present technology. As illustrated in FIG. 9A, the burner 900 is generally similar to the burner discussed above with reference to FIGS. 7A and 7B. For example, as illustrated in FIG. 9A, the burner 900 includes a main body 910 that is couplable to a chamber of a pyrolysis reactor (e.g., the second chamber 630 of FIGS. 6A and 6B) via a flange component 920. The burner also includes a tool channel 932, a first input channel 934, and a second input channel 936 extending through the main body 910, as well as an outlet component 940 at a distal end region 912 of the main body 910.

Figure 9B:
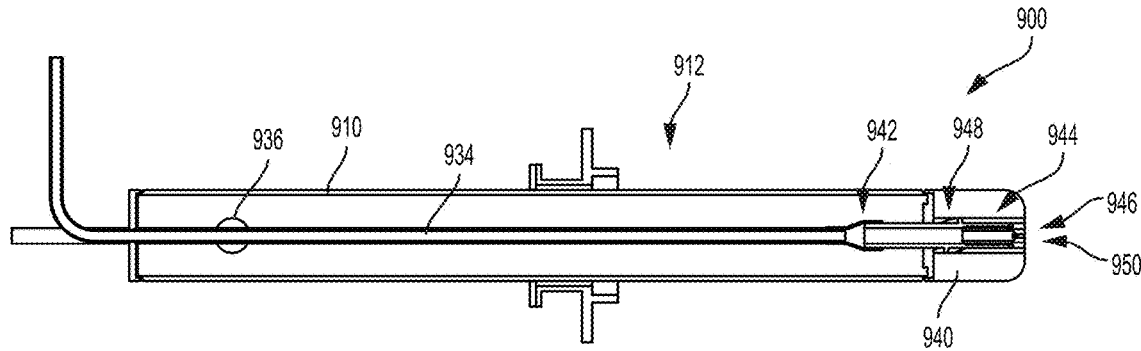
Figure 9C:
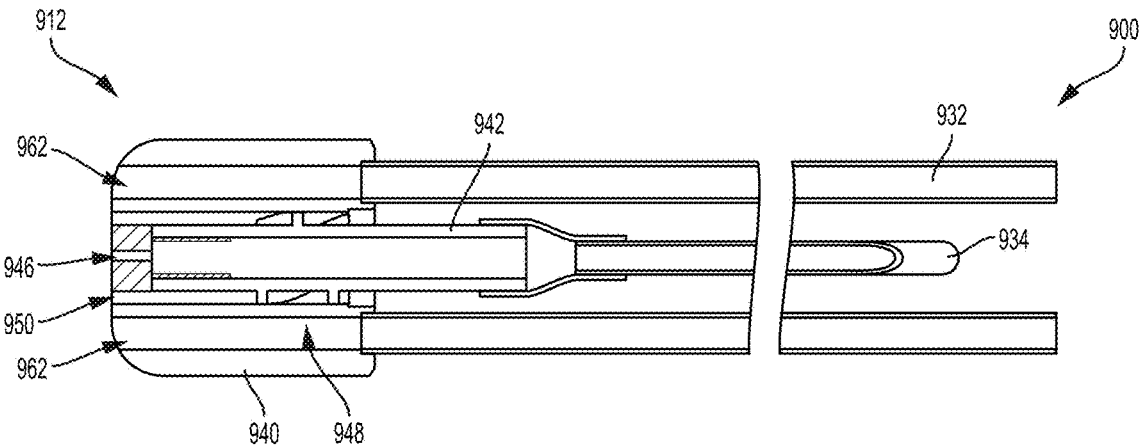

As best illustrated in FIGS. 9B and 9C, referred to collectively, the first input channel 934 can extend through the main body 910 to an injection chamber 942 that is coupled to a modified bolt 944. The modified bolt 944 can have a hollow center and one or more first orifices 946 at a distalmost surface of the outlet component 940. Together, the first input channel 934, the injection chamber 942, and the modified bolt 944 provide a flow path for incoming fuel. Further, the injection chamber 942 and modified bolt 944 can help preheat the incoming fuel. Still further, the modified bolt 944 can be removed to perform maintenance (e.g., clean) on the one or more first orifices 946 and/or to adjust the number of the first orifices 946. For example, the number, size, and/or distribution of the first orifices 946 can be selected to help adjust a resulting flow path downstream from the burner 900 and/or heat transfer into the wall of the corresponding chamber.

As further illustrated in FIGS. 9B and 9C, the second input channel 936 can similarly extend through the main body 910, through a swirler component 948 in the outlet component 940, and out of one or more second orifices 950 positioned annularly around the one or more first orifices 946. Together, the second input channel 936, the swirler component 948, and the one or more second orifices 950 provide a flow path for incoming air. The swirler component 948 can generate a vortex in the air that is emitted through the one or more second orifices 950, thereby helping to increase the transfer into the wall of the corresponding chamber.

As still further illustrated in FIGS. 9B and 9C, the tool channels 932 can provide a lumen through the main body 910 to tool orifices 962 at the outlet component 940. The tool orifices 962 can provide access to the corresponding chamber (and a mixture of the fuel and air emitted by the burner 900) to various tools, such as an ignition component, a temperature sensor, a flame detector, and/or the like. In the illustrated embodiments, the tool channels 932 (and the tool orifices 962) are positioned peripheral to the first and second orifices 946, 950 with respect to a central axis of the burner 900. It will be understood, however, that the technology is not so limited. Purely by way of example, a tool channel 932 for the ignition component can extend directly along the central axis (e.g., coaxial with and/or within the first input channel 934).

Figure 9D:
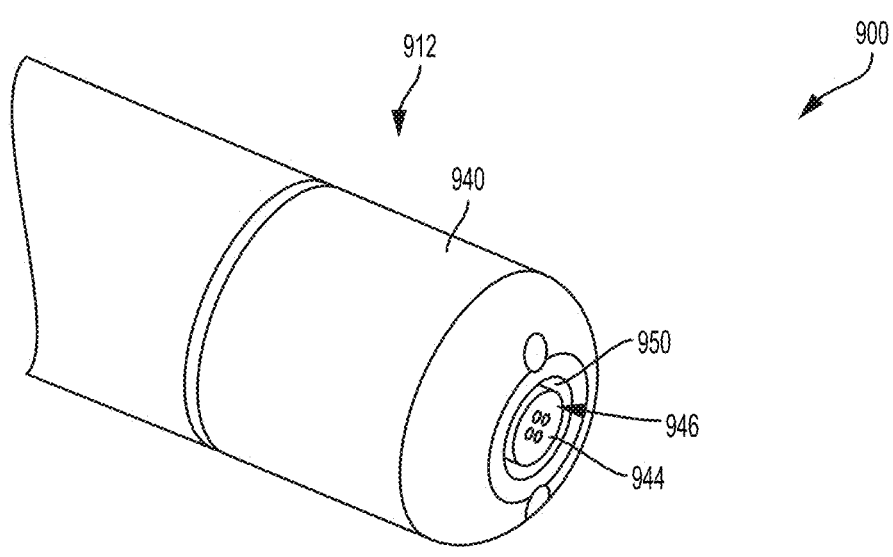
Figure 9E:
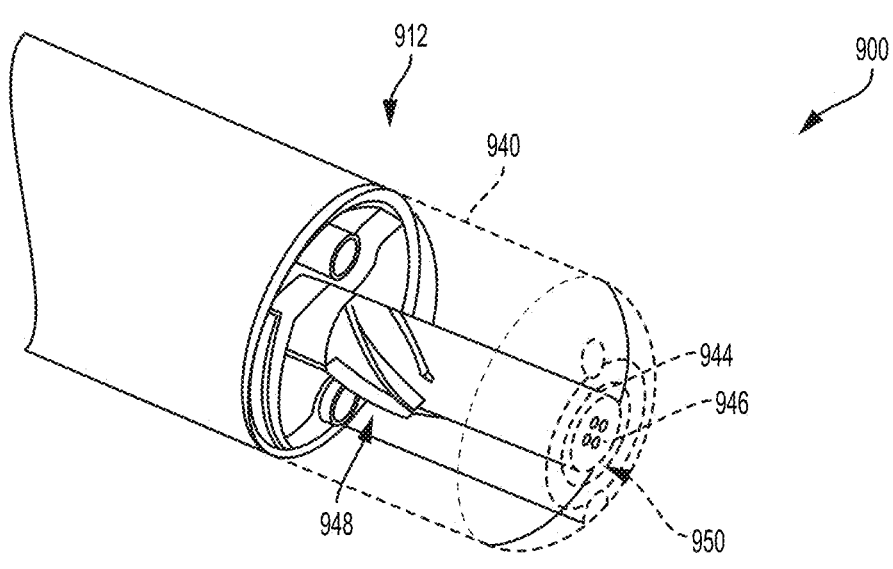

FIGS. 9D and 9E are isometric views illustrating additional details on specific examples of the components of the burner 900 in accordance with embodiments of the present technology. In the illustrated embodiments, the modified bolt 944 includes four of the first orifices 946, while the one or more second orifices 950 includes a single orifice coaxial with, and extending circumferentially around, the modified bolt 944. As a result, for example, the vortex generated by the swirler component 948 can be generally uninterrupted as it flows out of the second orifice 950. Further, as best illustrated in FIG. 9E, the swirler component 948 can be generally similar to the swirler component 800 discussed above with reference to FIG. 8. For example, the swirler component 948 includes a plurality of fins that are at an angle with respect to a longitudinal axis of the burner 900.

Figure 10:
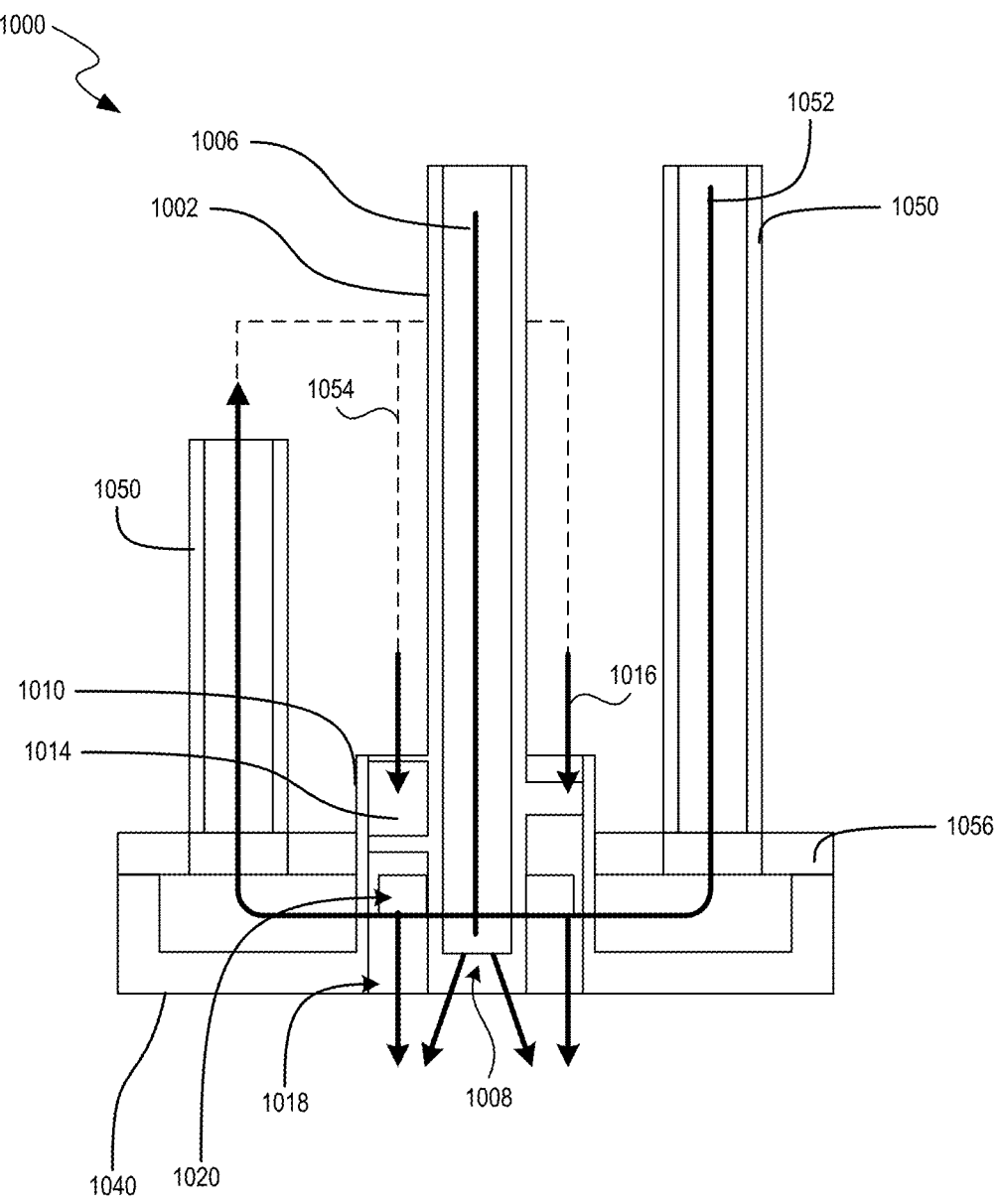
FIG. 10 is a schematic cross-sectional view of a burner with a parallel aperture structure configured in accordance with further embodiments of the present technology.

FIG. 10 is a schematic cross-sectional view of a burner 1000 with a parallel aperture structure configured in accordance with further embodiments of the present technology. As illustrated in FIG. 10, the burner 1000 is generally similar to the burner discussed above with reference to FIGS. 7A, 7B and 9A-9E. In the illustrated embodiments, however, burner 1000 includes heat-distributing components to help address a build-up of heat at a flame-facing surface of the burner 1000. In the illustrated embodiments, the burner 1000 includes a first input channel 1002 (e.g., an inner coaxial tube) that provides a first flow path 1006 for incoming fuel, as well as a second input channel 1010 (e.g., an outer coaxial tube) that provides a second flow path 1016 for incoming air. In the illustrated embodiments, the first input channel 1002 provides an inner wall for the second input channel 1010. Similar to the burners discussed above, the first input channel 1002 extends to a first orifice 1008 (or a plurality of first orifices) and the second input channel 1010 extends to a second orifice 1018 (or a plurality of second orifices). The second orifice 1018 can circumferentially surround the first orifice 1008. As a result, the fuel must travel transverse to the longitudinal axis of the burner 1000 (and a corresponding chamber) as it exits the first orifice 1008 to mix and combust with the air. In some embodiments, the first orifice 1008 (and/or each of the plurality of first orifices) is positioned at a non-zero angle with respect to the longitudinal axis to help direct the fuel in the transverse direction. Additionally, or alternatively, the burner 1000 can include a swirler component 1020 positioned in a distal end portion 1014 of the second input channel 1010. As discussed above, the swirler component 1020 can generate a vortex flow in the air that is emitted by the second orifice 1018. As a result of the coaxial arrangement of the first and second orifices 1008, 1018 and the vortex generated by the swirler component 1020, the burner 1000 can create a flow in a mixture of the fuel and air, the combustion flames, and/or the resulting flue gas that has a radial component and/or additional transverse component to the flow in the chamber of the pyrolysis reactor.

As further illustrated in FIG. 10, the burner 1000 can include a face plate 1040 at a distalmost end of the burner 1000. As a result, the face plate 1040 is positioned to be directly exposed to any flame or heat generated by the burner 1000 when combusting the incoming fuel and air. As a result, the face plate 1040 can heat up during the operation of the burner 1000. The heat in the face plate 1040 can, in turn, be recycled to preheat incoming fuel and/or air. For example, in the illustrated embodiments, the burner 1000 further includes a heat-recycling channel 1050 that is fluidly coupled to a hollow-disk 1056. The heat-recycling channel 1050 and the hollow-disk 1056 define a recycling flow path 1052 for incoming air to absorb and carry heat away from the face plate 1040. As a result, the heat-recycling channel 1050 and the hollow-disk 1056 can help cool the face plate 1040. Further, at least a portion of the heated air can be recycled along a return flow path 1054 to the second flow path 1016 in the burner 1000. Said another way, at least a portion of the heated air can return to the burner 1000 as a preheated supply of air for combustion. As a result, the heat-recycling channel 1050 and the hollow-disk 1056 can help preheat incoming air, thereby increasing the efficiency of the burner 1000 (and the corresponding pyrolysis reactor overall).

In some embodiments, the recycling flow path 1052 can be thermally coupled to various other components of the burner 1000. For example, the recycling flow path 1052 can be thermally coupled to the first input channel 1002 to transfer at least a portion of the heat absorbed from the face plate 1040 into incoming fuel to preheat the fuel. In another example, the recycling flow path 1052 can be thermally coupled to the first and second orifices 1008, 1018 to help cool the first and second orifices 1008, 1018.

Figure 11A:
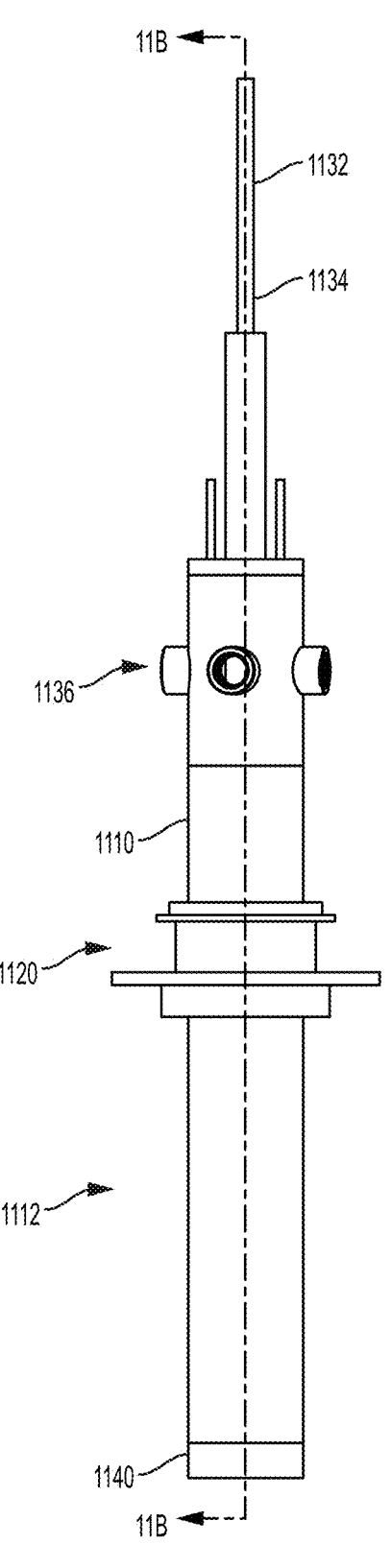
FIGS. 11A-11C are partially schematic views of a burner with a parallel aperture structure configured in accordance with further embodiments of the present technology.
Figure 11B:
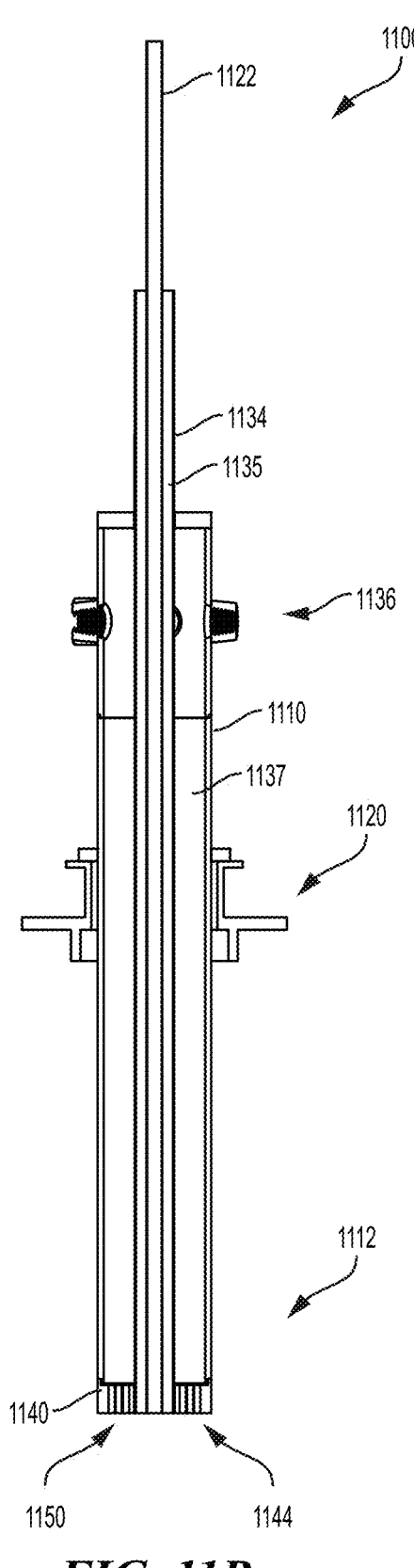
Figure 11C:
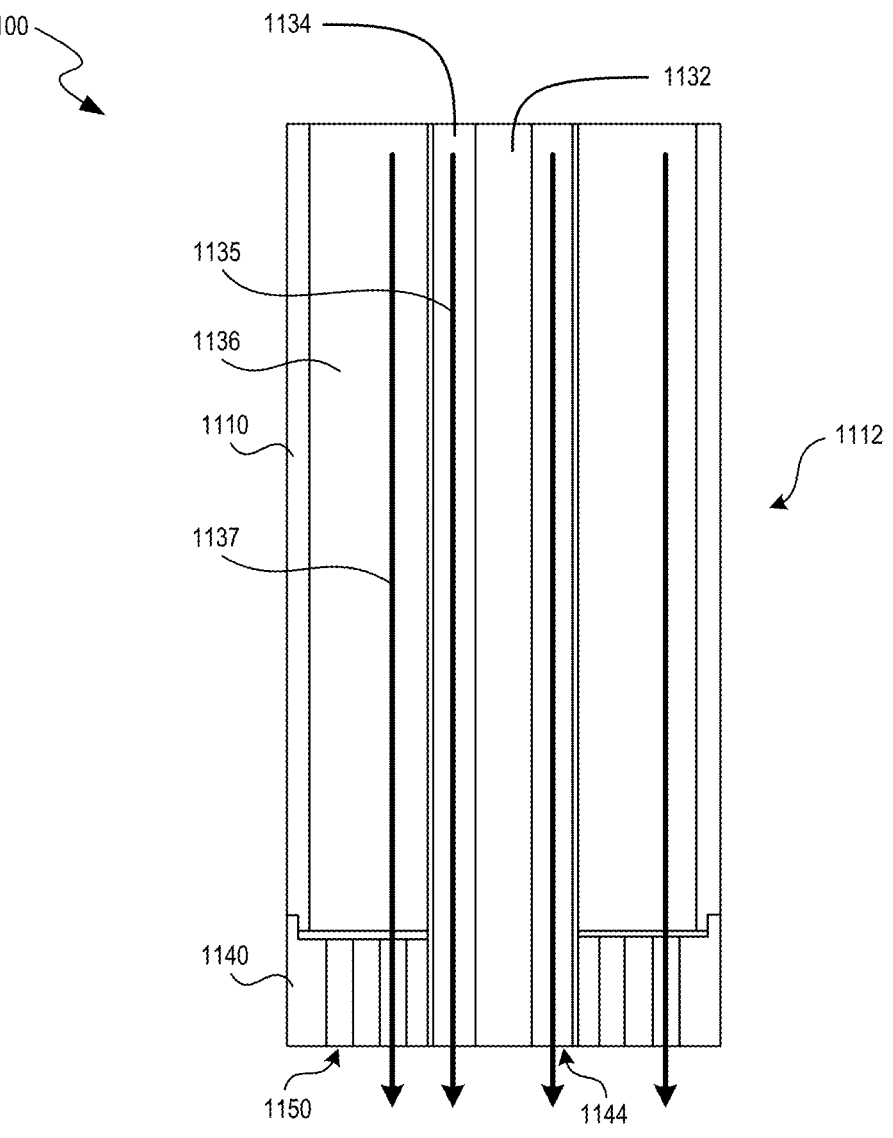

FIGS. 11A-11C are partially schematic views of a burner 1000 with a parallel aperture structure configured in accordance with further embodiments of the present technology. In the illustrated embodiments, the burner 1100 is generally similar to the burners discussed above with reference to FIGS. 7A, 7B, and 9A-10. For example, as illustrated in FIGS. 11A and 11B, the burner 1100 includes a main body 1110 and a flange component 1120 to couple the main body 1110 to a chamber of a pyrolysis reactor (e.g., the chamber 630 of FIGS. 6A and 6B). The burner 1100 also includes a tool channel 1132, a first input channel 1134, and a second input channel 1136 that each extends to an outlet component 1140 at a distal end portion 1112 of the main body 1110. In the illustrated embodiments, however, the burner 1100 is configured to generate a radial and/or transverse flow in the chamber of the pyrolysis reactor via parallel orifices.

For example, as best illustrated in the zoomed-in cross-sectional view of the distal end region of FIG. 11C, the first input channel 1134 can provide a first flow path 1135 for an incoming flow of air. The first flow path 1135 extends through the main body 1110 to a first orifice 1144 in the outlet component 1140. The second input channel 1136 is coaxial with the first input channel 1134 and provides a second flow path 1137 for incoming fuel. The second flow path 1137 extends through the main body 1110 to a plurality of second orifices 1150 in the outlet component 1140 that are positioned around the first orifice 1144.

The radial distribution of the second orifices 1150 can force gasses to spread in a radial and/or transverse direction for combustion, thereby directing heat away from a longitudinal axis of the burner 1100 (and the chamber of the pyrolysis reactor). Further, the parallel orientation of the first orifice 1144 and the second orifices 1150 can increase the shear layer mixing between the air and fuel streams. The increased shear layer mixing can allow the burner to produce relatively long flames with a different temperature and heat release profile in comparison to the flames produced by the burners discussed above with a vortex flow. The relatively long profile can help provide control of the axial dimension of flames generated by the burner 1100.

As further illustrated in FIG. 11C, the tool channel 1132 can also extend through the main body 1110 to the outlet component 1140 at the distal end portion 1112. As a result, for example, the tool channel 1132 can provide a dedicated space for an ignition component and/or temperature sensing component of the burner 1100.

Figure 12:
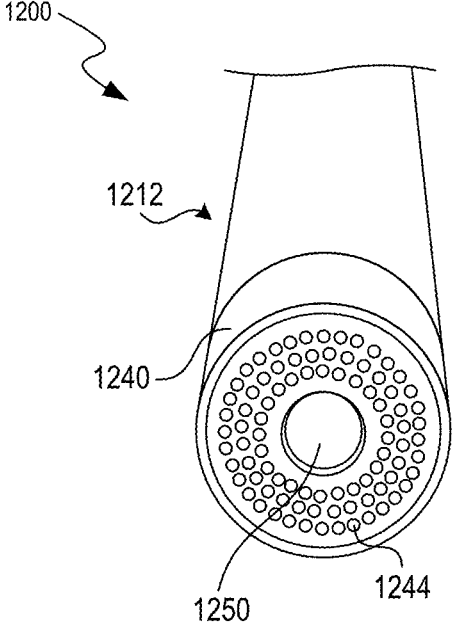
FIG. 12 is a partially schematic isometric view of distal end portion of a burner configured in accordance with embodiments of the present technology.

FIG. 12 is a partially schematic isometric view of a distal end portion 1212 of a burner 1200 configured in accordance with embodiments of the present technology. As illustrated in FIG. 12, the distal end portion 1212 of the burner 1200 is generally similar to the distal end portion 1112 of the burner discussed above with reference to FIGS. 11A-11C. For example, the burner 1200 includes an outlet component 1240 at the distal end portion 1212, and the outlet includes a first orifice 1244 and a plurality of second orifices 1250 distributed radially around the first orifice 1250. During operation of the burner 1200, fuel can exit from the second orifices 1250 and encounter air exiting the first orifice 1244 to form a mixture that is then combusted by an ignition component. As discussed above, the first orifice 1244 and the second orifice 1250 can be designed to generate radial and/or transverse components in the flow of the mixture and/or heat from the combustion to communicate heat out of the chamber of the pyrolysis reactor. More specifically, the radial and/or transverse components of the flow of the mixture and/or heat from the combustion can depend on a diameter of the first orifice 1244, a number of the second orifices 1250, a diameter of each of the second orifices 1250, and/or a distribution of the second orifices 1250.

For example, a wider diameter of the first orifice 1244 can advantageously result in a wider flame from the combustion of the mixture of fuel and air. However, the diameter of the first orifice 1244 can be limited by a requirement for a generally equal pressure and volume between the incoming air and the incoming fuel. In various embodiments, the diameter of the first orifice 1244 can range between about 0.375 in. and about 1 in. In some embodiments, the diameter is about 0.65 in. The number and diameter of the second orifices 1150 can be selected to help generally match the pressure of the incoming fuel and the incoming air. Additionally, or alternatively, the number and/or diameter of the second orifices 1150 can help distribute the flame from the combustion of the mixture throughout the chamber of the pyrolysis reactor. In various embodiments, the burner 1200 can include at least 20 of the second orifices 1250, or between about 20 second orifices 1250 and about 500 of the second orifices 1250. In various embodiments, the second orifices 1250 can have a diameter between about 0.005 in. and about 0.25 in. In some embodiments, the diameter of the second orifices 1250 varies. In some embodiments, the burner 1200 includes 88 of the second orifices 1250 that each have a diameter of about 0.1 in.

Further, during operation of the burner 1200, the outlet component 1240 can absorb heat from the combustion and rise in temperature. To help combat the increase in temperature, the second orifices 1250 can be fully dispersed out around the first orifice 1244. As a result, fuel flowing through the second orifices 1250 can help pull heat out of the outlet component 1240. The radial distribution can also help generate the radial distribution of the resulting combustion and/or transportation of heat through the chamber wall.

Figures 13A, 13B:
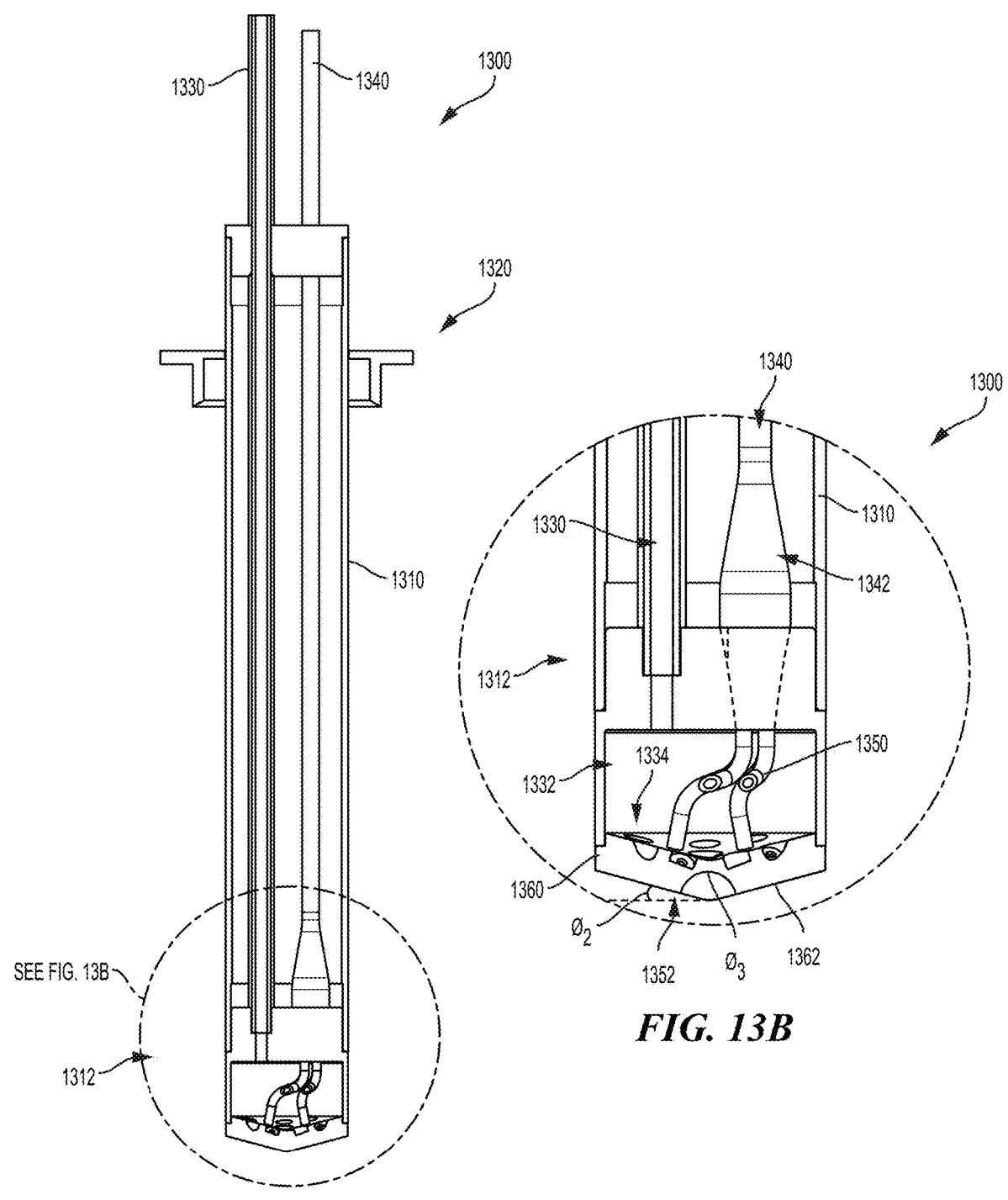
FIGS. 13A-13C are partially schematic cross-sectional and end views of a burner with a sloped nozzle configured in accordance with embodiments of the present technology.
Figure 13C:
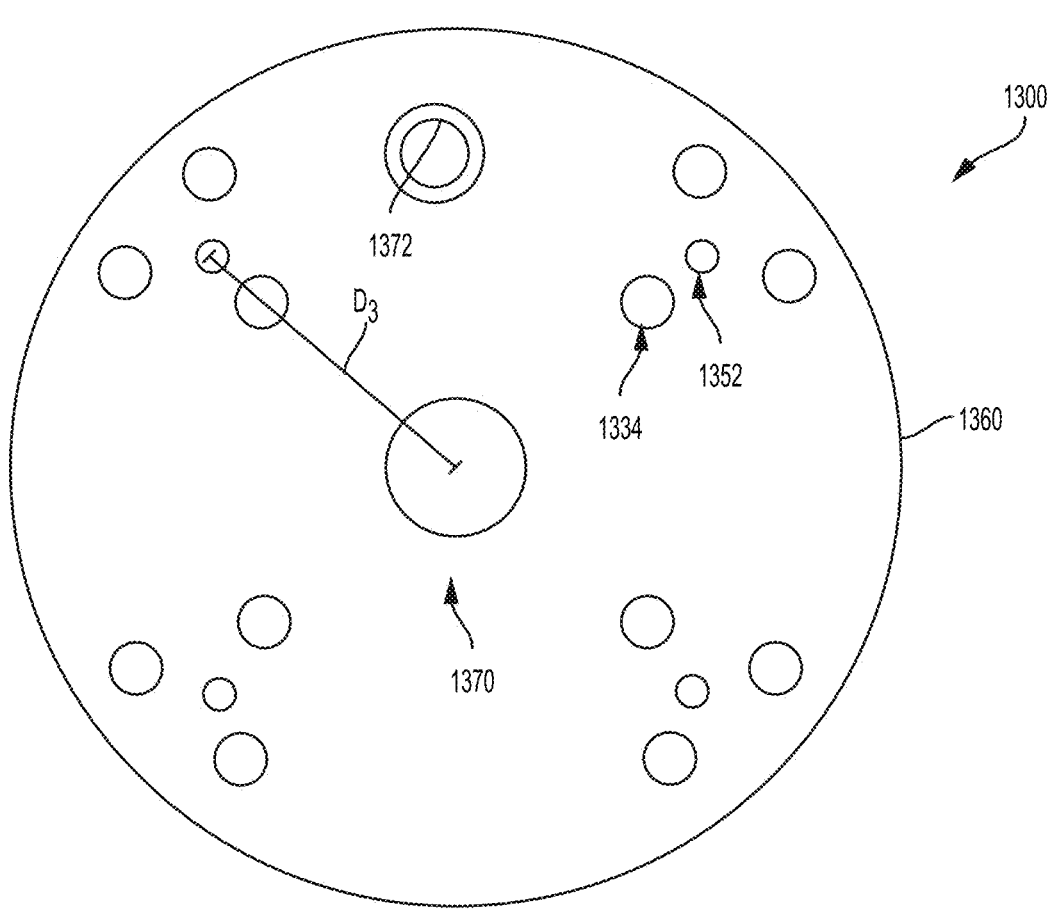

FIGS. 13A-13C are partially schematic cross-sectional and end views of a burner with a sloped output nozzle configured in accordance with embodiments of the present technology. As illustrated in FIG. 13A, the burner 1300 is generally similar to the burner discussed above with reference to FIGS. 7A, 7B, and 9A-11C. For example, the burner includes a main body 1310 and a flange component 1320 to couple the main body 1310 to a chamber of a pyrolysis reactor (e.g., the chamber 630 of FIGS. 6A and 6B). The burner 1300 also includes a first input channel 1330 and a second input channel 1340 extending to a distal end region 1312 of the main body 1310.

As best illustrated in FIG. 13B, however, the distal end region 1312 includes a sloped output nozzle 1360 (e.g., a conical output nozzle) and various components adapting the first and second input channels 1330, 1340 to the output nozzle 1360. For example, the first input channel 1330 can extend to a first manifold 1332 at the distal end region 1312 that is fluidly coupled to a plurality of first orifices 1334 in the output nozzle 1360. The first manifold 1332 can allow, for example, incoming air in the first input channel 1330 to be delivered in a radially dispersed pattern of the first orifices 1334. Similarly, the second input channel 1340 can extend to a second manifold 1342 at the distal end region 1312. In the illustrated embodiments, the second manifold 1342 is fluidly coupled to a plurality of sub-channels 1350 that, in turn, are fluidly coupled to a corresponding one of a plurality of second orifices 1352 at the output nozzle 1360. The plurality of sub-channels 1350 (sometimes also referred to as "downcomers," "fuel pipelines," and/or the like) can provide a flow path for incoming fuel between the second manifold 1342 and the output nozzle 1360 to avoid mixing the fuel with air until downstream from the output nozzle. Similar to the first manifold 1332, the second manifold 1342 can help disperse incoming fuel among the plurality of sub-channels 1350, allowing the incoming fuel to be delivered in a radially dispersed pattern of the second orifices 1352.

In the illustrated embodiment, the burner 1300 includes four of the sub-channels 1350. It will be understood, however, that the technology disclosed herein is not so limited. In various other embodiments, the burner can include one, two, three, five, ten, and/or any other suitable number of the sub-channels 1350. In principle, more of the sub-channels 1350 can result in a more complete radial distribution of the incoming fuel and is therefore advantageous. However, the number of the sub-channels 1350 can be limited by the available space and/or manufacturability challenges (e.g., with bending and/or shaping the pipes, welding the pipes, and/or the like), especially for embodiments that intentionally omit stainless steel.

As further illustrated in FIG. 13B, the output nozzle 1360 can have a distalmost surface 1362 that is sloped with respect to a transverse axis of the burner 1300 (and/or the chamber of the pyrolysis reactor). That is, the distalmost surface 1362 is at a second angle $\Theta_2$ with respect to the transverse axis that is non-zero. In various embodiments, the second angle $\Theta_2$ can range between about 35 degrees and about 10 degrees (creating a third angle $\Theta_3$ between opposite sides of the distal surface of between about 110 degrees and about 160 degrees). In some embodiments, the second angle $\Theta_2$ is about 15 degrees, setting the third angle $\Theta_3$ at about 150 degrees. Further, the first and second orifices 1334, 1352 at the distalmost surface 1362 are generally orthogonal (e.g., perpendicular) to the distalmost surface 1362. As a result, the first and second orifices 1334, 1352 are at a non-zero angle with respect to the longitudinal axis of the burner 1300 (and/or the chamber of the pyrolysis reactor). In various embodiments, similar to the discussion above, the non-zero angle of the first and second orifices 1334, 1352 can be between about 35 degrees and about 10 degrees, or about 15 degrees. The second angle $\Theta_2$ of the distalmost surface 1362 (and therefore the angle of the first and second orifices 1334, 1352 with respect to the longitudinal axis) can help create a transverse component to a flow of a mixture of the air and gas, as well the combustion and/or flue gas from igniting the mixture. As discussed above, the transverse flow can, in turn, help increase heat transfer through a wall of the chamber (e.g., by causing the mixture, combustion flames, and/or flue gas to impinge and/or otherwise contact the wall of the chamber).

In addition to the slope of the distalmost surface 1362, the burner 1300 can include various other features to help generate (or maximize) the transverse and/or radial flow of heat. For example, as best illustrated in FIG. 13C, the first and second orifices 1334, 1352 can be distributed radially about the output nozzle 1360. The radial distribution can help ensure that the mixture (and resulting combustion and heat) are generally evenly distributed about a circumference of the output nozzle 1360 (and/or a circumference of the chamber). Further, the second orifices 1352 can be spaced apart from the center of the output nozzle 1360 by a third distance D₃. In principle, a larger distance between the center of the output nozzle 1360 and the second orifices 1352 is better to help direct the mixture (and combustion) into contact with the wall of the chamber. However, the third distance D₃ can be limited by manufacturing challenges (e.g., bending the sub-channels 1350 (FIG. 13B) without collapse), especially for embodiments that omit stainless steel. In various embodiments, as a result, the third distance D₃ can be between about 0.1 in. and about 0.9 in.

As further illustrated in FIG. 13C, each of the second orifices 1352 can be surrounded by a plurality of the first orifices 1334 (three in FIG. 13C). The ratio of first orifices 1334 to second orifices 1352 can impact combustion efficiency and/or momentum flux of the gasses in the mixture. The illustrated ratio of 3:1 can help balance the momentum flux to help maximize the efficiency of the combustion of the mixture of fuel and air. Still further, the diameter of the first and second orifices 1334, 1352 can impact the flow of the mixture, the heat from combustion, and/or the efficiency of the combustion. In various embodiments, the diameter of the first orifices can be between about 0.016 in. and about 0.1 in, or about 0.048 in. In various embodiments, the diameter of the second orifices 1352 can be between about 0.002 in. and about 0.02 in.

As further illustrated in FIG. 13C, the output nozzle 1360 can also include various other components related to operation of the burner 1300. For example, the output nozzle 1360 can include a first tool orifice 1370 that provides access for an ignition component to the mixture downstream from the output nozzle. In another example, the output nozzle 1360 can include a second tool orifice 1372 that provides access for a flame detector, temperature sensor, pressure sensor, and/or other suitable component to the chamber downstream from the output nozzle 1360.

Figure 14:
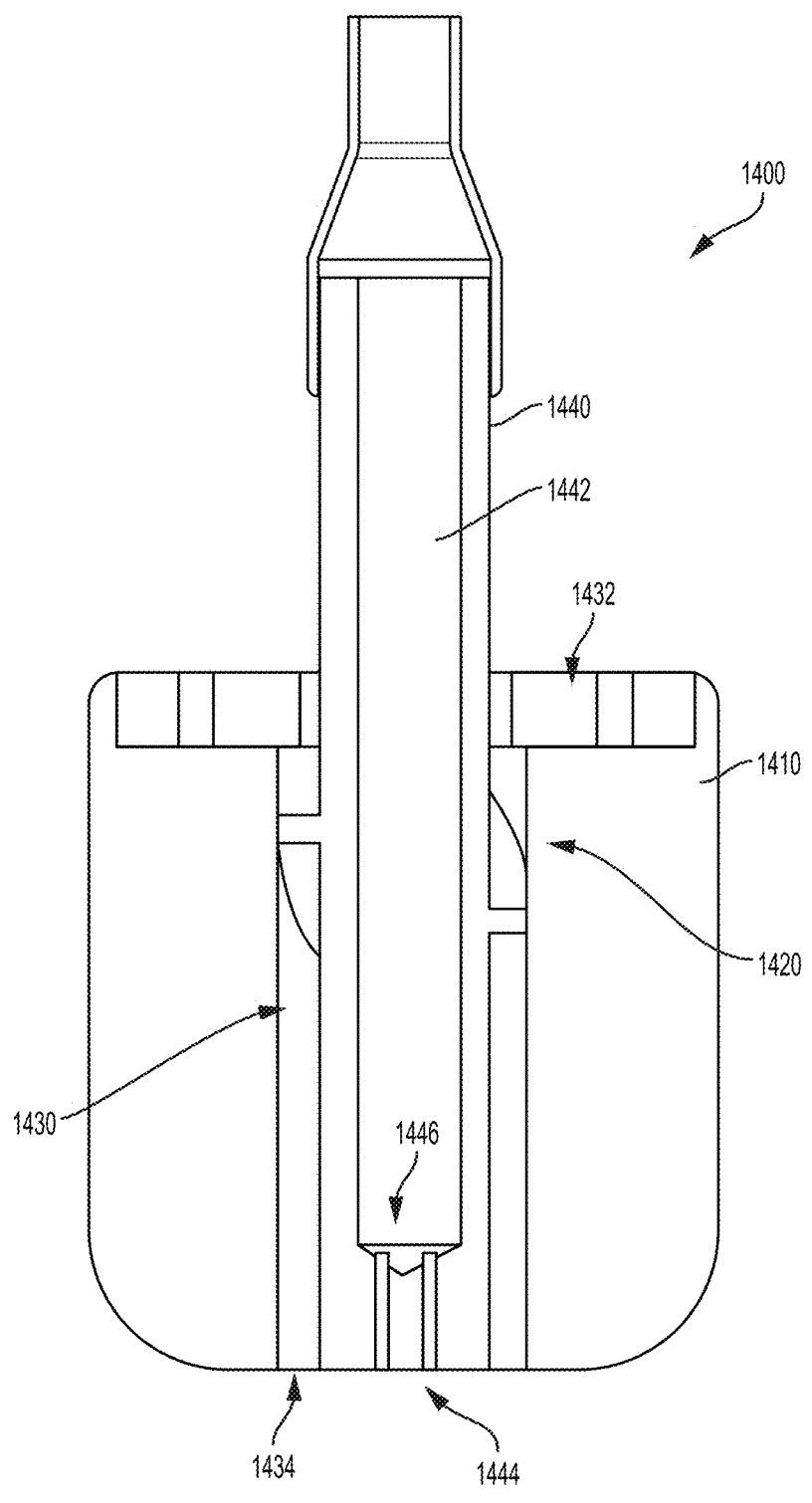
FIG. 14 is a partially schematic cross-sectional view of a burner with a parallel openings configured in accordance with further embodiments of the present technology.

FIG. 14 is a partially schematic cross-sectional view of a burner 1400 with parallel openings configured in accordance with further embodiments of the present technology. As illustrated in FIG. 14, the burner 1400 is generally similar to the burners discussed above with reference to FIGS. 7A, 7B, and 9A-13C. For example, the burner 1400 includes a main body 1410, as well as a first input channel 1430 and a second input channel 1440 each extending through the main body 1410. The first input channel 1430 (e.g., an air input channel) extends between an air inlet 1432 and a first orifice 1434. Similarly, the second input channel 1440 extends through the main body 1410 along a fuel flow path 1442 to one or more second orifices 1444. In the illustrated embodiments, the second orifices 1444 are formed directly into the main body 1410 (e.g., as opposed to being formed in a modified bolt), allowing the main body 1410 to have a generally homogenous construction (e.g., to be a unitary body with the first and second input channels 1430, 1440 formed therein).

As further illustrated in FIG. 14, the burner 1400 can include various components that help generate a radial and/or transverse component to the flow downstream from the burner 1400. For example, the first orifice 1434 can be positioned coaxially with (and annularly around) the second orifices 1444, thereby forcing the air and fuel to move in a transverse direction to mix for a combustion. In another example, the burner can include a swirler component 1420 positioned within the first input channel 1430 to swirl incoming air. As a result, the swirler component 1420 can generate a vortex flow downstream from the burner 1400. In yet another example, the second input channel can include a mixing component 1446 positioned in the fuel flow path 1442 to generate a vortex in the incoming flow of fuel, further contributing to the vortex downstream from the burner 1400. In each of the examples above, the burner 1400 can generate radial and/or transverse components in the flow of the mixture, combustion flames, and/or flue gas downstream from the burner 1400. As a result, as discussed above, the burner 1400 can help increase the transfer of heat through a wall of a chamber that the burner 1400 is positioned at least partially within.

Figures 15A, 15B, 15C:
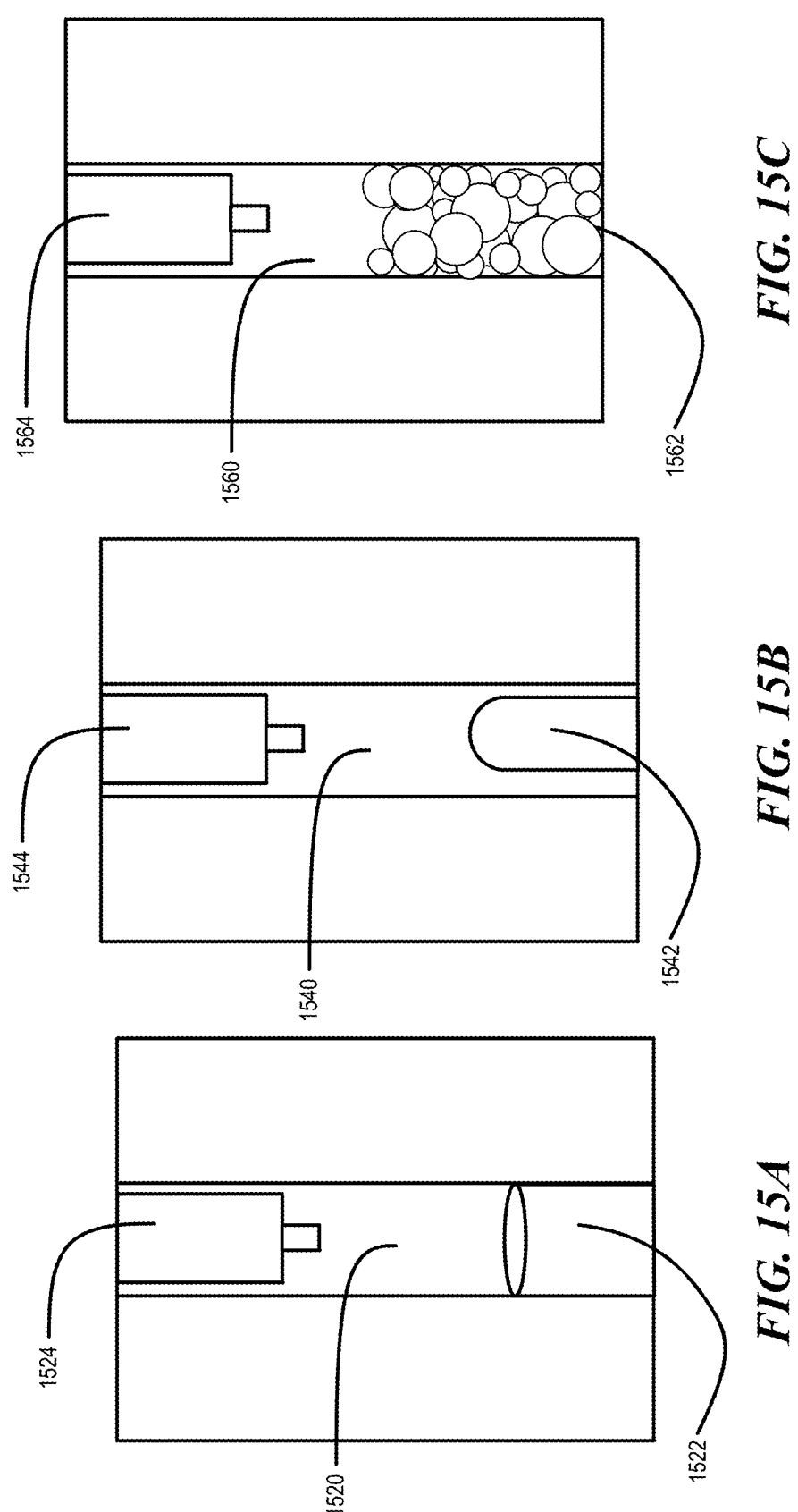
FIGS. 15A-15C are schematic cross-section views illustrating a set of additional components of a combustion chamber in accordance with embodiments of the present technology.

FIGS. 15A-15C are schematic cross-section views illustrating a set of additional components of a combustion chamber in accordance with embodiments of the present technology. More specifically, in which FIG. 15A depicts a monolith-storing combustion chamber 1520, FIG. 15B depicts a rod-storing combustion chamber 1540, and FIG. 15C shows a bead-storing combustion chamber 1560. Some embodiments can include additional heat-related components to increase heat transfer performance. FIG. 15A depicts a monolith-storing combustion chamber 1520 that includes a monolith 1522 and a burner 1524, where the monolith 1522 is positioned at an opposing end of the monolith-storing combustion chamber 1520 with respect to the burner 1524. The monolith 1522 can retain and transport heat through the monolith-storing combustion chamber 1520. During operations, the monolith-storing combustion chamber 1520 is provided with heat generated by the burner 1524.

Referring to FIG. 15B, a rod-storing combustion chamber 1540 includes a rod 1542 and a burner 1544 that is positioned at an opposing end of the rod-storing combustion chamber 1540 with respect to the rod 1542. As the burner 1544 operates, thermal energy can be stored in the rod 1542, which can increase thermal distribution efficiency for transference of heat through the rod-storing combustion chamber 1540 and beyond the rod-storing combustion chamber 1540. For example, the rod 1542 can radiate heat during a pyrolysis operation, such that the rod-storing combustion chamber 1540 can more uniformly and predictably distribute heat in comparison to a combustion chamber without a rod.

Referring to FIG. 15C, a bead-storing combustion chamber 1560 includes a set of ceramic beads 1562 at the bottom of the bead-storing combustion chamber 1560 and a burner 1564 fixed above the set of ceramic beads 1562 that heats the interior of the bead-storing combustion chamber 1560. The ceramic beads 1562 can include beads of varying diameters, though it should be understood that other embodiments may include beads having a uniform diameter. During operations of the bead-storing combustion chamber 1560, the burner 1564 can heat the set of ceramic beads 1562. Once heated, the set of ceramic beads 1562 can retain thermal energy to provide a more uniform distribution of heat throughout the bead-storing combustion chamber 1560. During hydrogen production operations, this set of beads can then increase heating efficiency from the bead-storing combustion chamber 1560 by transferring stored thermal energy into a surrounding chamber, such as a pyrolysis chamber.

Although FIGS. 15A-15C shows cylindrical monoliths, tubes, spherical beads, annular chambers, or tubular chambers, other shapes are possible. For example, a monolith may be square or rectangular in cross-section and a combustion chamber or pyrolysis chamber may have a rectangular cross-sectional profile.

Figure 16:
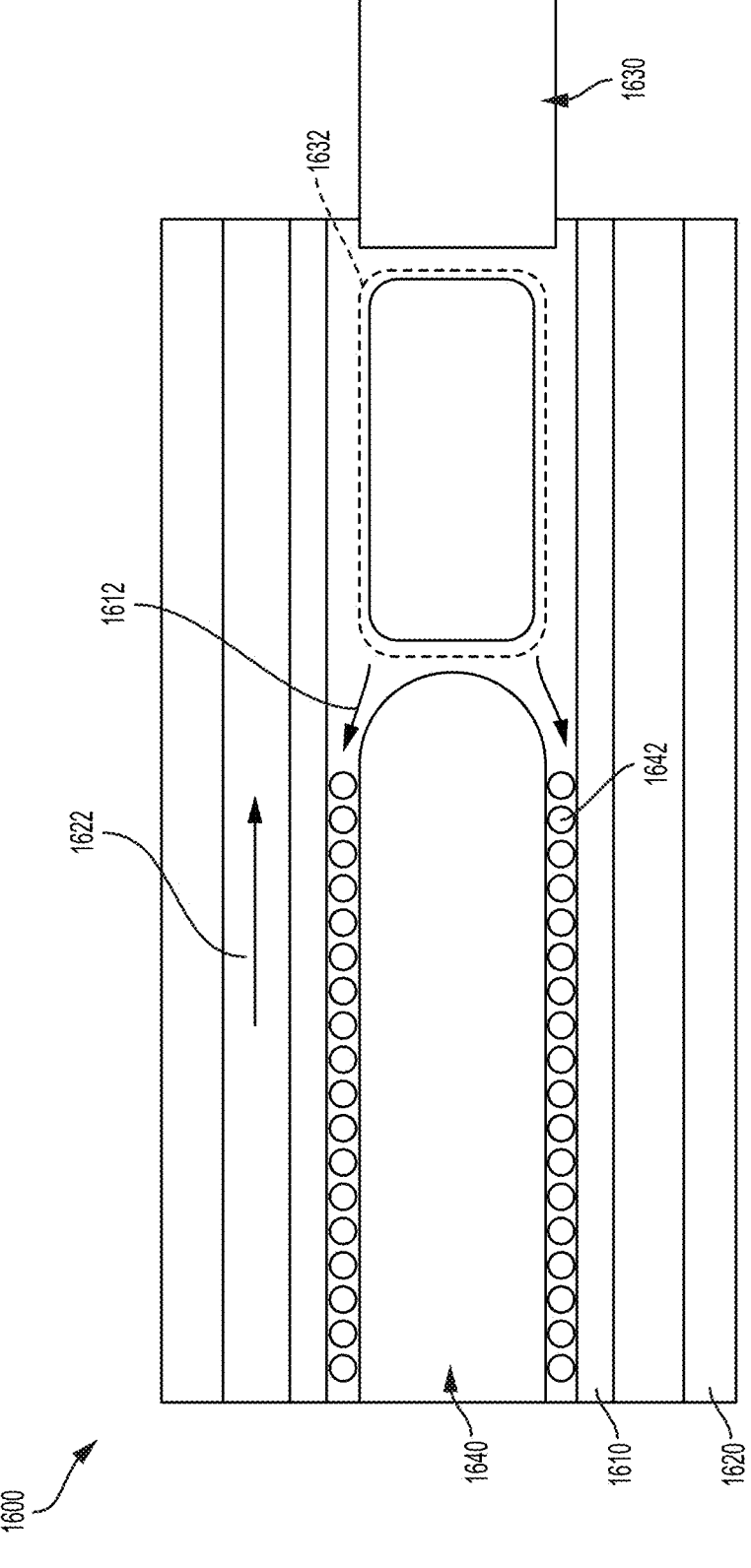
FIG. 16 is a partially schematic cross-sectional diagram of a pyrolysis reactor configured in accordance with further embodiments of the present technology.

FIG. 16 is a partially schematic cross-sectional diagram of a pyrolysis reactor 1600 configured in accordance with further embodiments of the present technology. In the illustrated embodiment, the pyrolysis reactor 1600 is generally similar to the pyrolysis reactors discussed above. For example, the pyrolysis reactor 1600 includes a first chamber 1610, a second chamber 1620 coaxial with the first chamber 1610, and a burner 1630 positioned at least partially within the first chamber 1610. The first chamber 1610 provides a first flow path 1612 for gasses (e.g., flue gasses) to travel therethrough. Similarly, the second chamber 1620 provides a second flow path 1622 for gasses (e.g., pyrolysis feedstock, pyrolysis gasses, and/or a product stream from a pyrolysis reaction) to travel therethrough.

The burner 1630 is positioned to mix incoming fuel (e.g., natural gas, methane, hydrogen gas, and/or the like) with incoming air and combust the mixture in a combustion zone 1632 of the first chamber 1610. As discussed above, the combustion generates heat that can then be at least partially transported (e.g., communicated via conduction and/or convection) from the first flow path 1612 in the first chamber 1610 to the second flow path 1622 in the second chamber 1620 to drive the pyrolysis reaction in the second chamber 1620. The burner 1630 can be generally similar (or identical) to any of the burners discussed above with reference to FIGS. 7A-14. For example, the burner 1630 can include various components that help create a vortex in the first flow path 1612 that increases flame-wall and/or flue gas-wall interactions, thereby helping transport heat from the combustion into the second chamber 1620.

In some embodiments, the first chamber 1610 also (or alternatively) includes features that help increase the amount of heat transported from the combustion to the second chamber 1620. For example, in the illustrated embodiments, the first chamber 1610 includes a center body 1640 and a plurality of conducting components 1642 radially surrounding the center body 1640. The center body 1640 can help reduce a hydraulic diameter of the first chamber 1610 downstream from the combustion zone 1632. As a result, the center body 1640 can force the flue gas to travel along the first flow path 1612 in close proximity to the walls of the first chamber 1610. In turn, the close proximity can help increase thermal transfer out of the flue gas and into the walls (and then into the second chamber 1620). The plurality of conducting components 1642 can include fins attached to and/or spiraling around the center body 1640, ceramic balls (e.g., silicon carbide balls), one or more rings, and/or various other suitable components. The plurality of conducting components 1642 can absorb heat from the flue gas to transfer the heat into the walls of the first chamber 1610. Additionally, or alternatively, the plurality of conducting components 1642 can disrupt (e.g., create turbulence in, extend, direct, and/or the like) the first flow path 1612 to further increase interaction between the flue gas and the walls of the first chamber 1610. As a result of each of the effects discussed above, the center body 1640 and the plurality of conducting components 1642 can help increase the amount of heat from the combustion transported to the second chamber 1620 to drive the pyrolysis reaction therein.

IV. Representative Heat Transfer Systems

The efficiency of heat transfer from a heat source to a pyrolysis zone is an important consideration during pyrolysis reactor operations. Inefficient heat transfer can reduce plant efficiency. Furthermore, pyrolysis systems can use blended fuels as an energy source to generate the heat needed for a pyrolysis operation. Blended fuels for combustion can create ineffective heat transfer characteristics.

Embodiments of the present technology can mitigate these issues of efficient heat transfer via a combination of structural and operational improvements. For example, embodiments of the present technology can operate their reactors under laminar flow conditions, which can increase the size of an ideal reaction zone for pyrolysis and prevent equipment damage from the turbulent flow of solid byproducts or corrosive byproducts. By using more efficient heat transfer systems, some embodiments can avoid issues related to using only high resistance insulation to retain heat. For example, some embodiments can avoid issues related to the susceptibility to significant corrosion damage resulting from the use of high-insulation materials.

Some embodiments can tailor the heat transfer from a combustion chamber to a pyrolysis chamber. Some embodiments can compute the energy required for pyrolysis based on a sum of the sensible heat of the pyrolysis gas and the heat required for a corresponding endothermic pyrolysis reaction and modify combustion operations or reactor designs based on the sum. For example, some embodiments can compute the energy required to convert natural gas to hydrogen and solid carbon and add to this the sensible heat of a reactant gas to determine energy required for pyrolysis. Some embodiments can then use this computed sum to determine a target heat flux or a parameter related to the target heat flux. For example, some embodiments can determine a target heat flux as a function of axial distance along a pyrolysis reactor based on a local heat required for the pyrolysis gas. Some embodiments can then determine heat transfer such that the heat transfer to satisfy each computed local heat flux value at required temperatures to ensure the desired pyrolysis gas temperature distribution along the axial length of the reactor. Some embodiments can then determine one or more reactor operational parameters, such as an amount of fuel to use, a flowrate for pyrolysis gas flowing through a pyrolysis chamber, a flowrate for air or fuel flowing through a combustion chamber, etc.

Some embodiments can operate a pyrolysis reactor with a counterflow heat exchange configuration. The average temperature difference between a combustion chamber and a pyrolysis chamber of a pyrolysis reactor across an axial position of the reactor can be greater than those of a parallel or cross-current configuration under constant fuel consumption conditions. Thus, the use of a counterflow configuration can increase the heat flux between a combustion chamber and a pyrolysis chamber as a result of this increased temperature difference. Furthermore, the greater temperature difference between the pyrolysis chamber and the combustion chamber in a countercurrent configuration can simplify heat transfer surface geometry calculations in laminar flow regimes.

Figure 17:
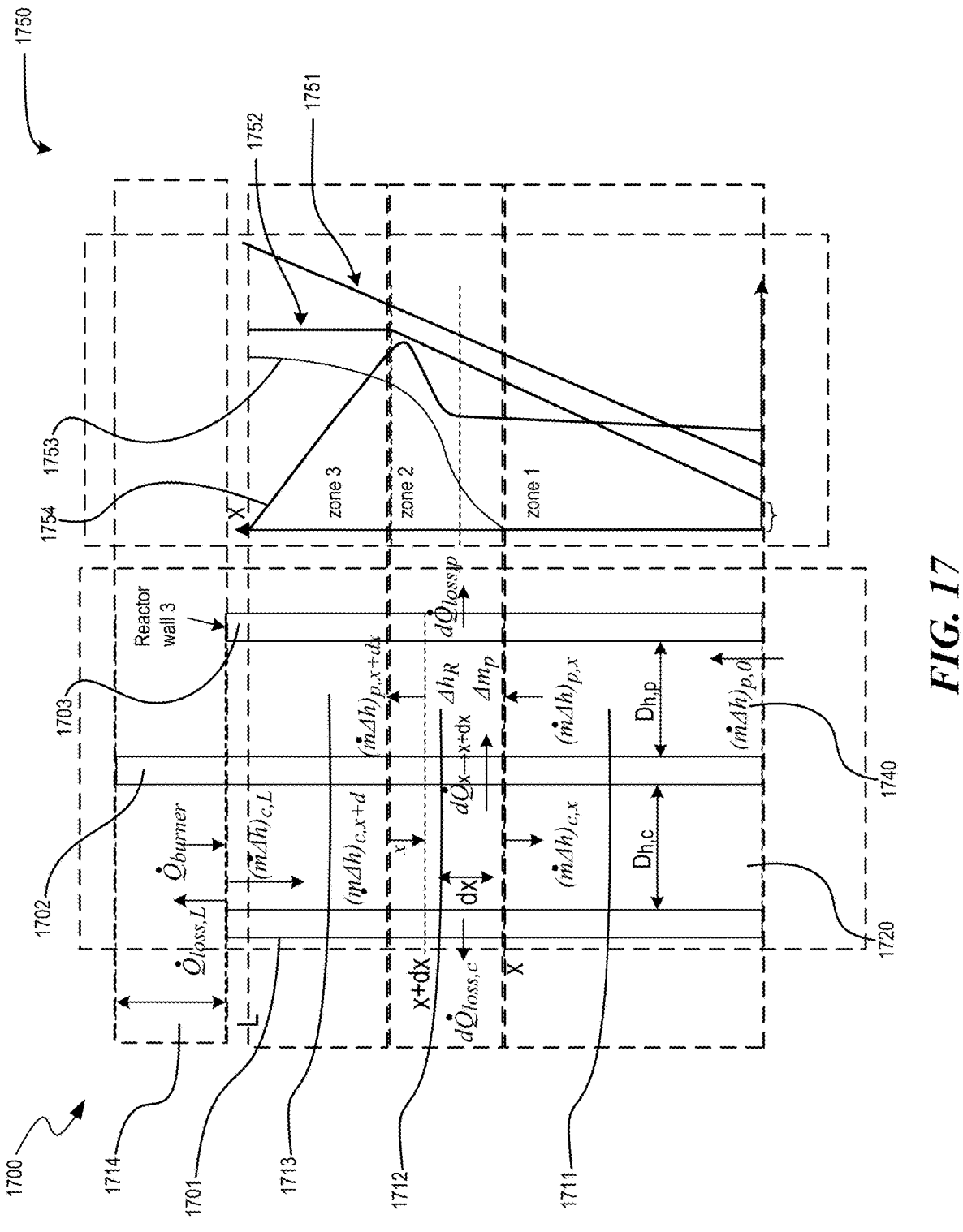
FIG. 17 is a schematic cross-section of a reactor and corresponding temperature chart in accordance with embodiments of the present technology.

FIG. 17 is a schematic cross-section of a reactor 1700 and corresponding temperature chart in accordance with embodiments of the present technology. The reactor 1700 includes a combustion chamber 1720 and a first reactor wall 1701 to act as an inner wall of the combustion chamber 1720, where combustion reactions occur within the combustion chamber 1720 during operation of the reactor 1700. The reactor 1700 also includes a second reactor wall 1702 that is coaxial with the first reactor wall 1701 and a pyrolysis chamber 1740 outside the second reactor wall 1702. The second reactor wall 1702 serves as an outer wall of the combustion chamber 1720 and as an inner wall for the pyrolysis chamber 1740. During operation of the reactor 1700, the pyrolysis chamber 1740 serves as the portion of the reactor 1700 in which pyrolysis reactions occur. The reactor 1700 also includes a third reactor wall 1703 that is coaxial with the second reactor wall 1702 and serves as an outer wall of the pyrolysis chamber 1740. The regions of the pyrolysis chamber 1740 can be separated into a first axial region 1711 in which fluids in the pyrolysis chamber 1740 are heated, a second axial region 1712 in which fluids in the pyrolysis chamber 1740 begin to undergo pyrolysis, a third axial region 1713 in which fluids in the pyrolysis chamber 1740 continue undergoing pyrolysis, and a fourth axial region 1714 in which fluids in the pyrolysis chamber 1740 have finished any pyrolyzing. In some embodiments, the first axial region 1711 can be described as a "heating zone," the second axial region 1712 can be described as a "first pyrolysis zone," and the third axial region 1713 can be described as a "second pyrolysis zone." It should be noted that the provided terminology for the different regions of a reactor should not be considered limiting, e.g., heating can still occur in the second axial region 1712.

A combined graph 1750 is shown with a combustion chamber temperature line 1751, a pyrolysis chamber temperature line 1752, a hydrogen gas concentration line 1753, and a required local heat flux line 1754. For each of the lines 1751-1754, the vertical X-axis represents an axial position along the reactor 1700, where the vertical X-axis position can map to the same vertical position shown in the reactor 1700.

During steady state operation of the reactor shown by the reactor 1700, a mix of an oxygen-carrying gas can mix with fuel and combust in a combustion zone 1722, where the combustion zone 1722 can be a portion of the combustion chamber 1720 that is at the fourth axial region 1714. Carbon dioxide, water, or other combustion products can be pushed down the combustion chamber 1720. The combustion products can serve as a source of heat for gases in the pyrolysis chamber 1740, causing the temperature of the combustion products in the combustion chamber 1720 to decrease as they move downwards. This temperature decrease is reflected in the combustion chamber temperature line 1751, where the horizontal axis of the combustion chamber temperature line 1751 can represent temperature, such that the rightward direction along the horizontal axis represents increasing temperature for the combustion chamber temperature line 1751.

Furthermore, during steady state operation of the reactor shown by the reactor 1700, pyrolysis reactant fluid can flow upwards in the pyrolysis chamber 1740 in a countercurrent direction relative to the flow of combustion product flowing in the combustion chamber 1720. As shown by the pyrolysis chamber temperature line 1752, the temperature of the pyrolysis reactant fluid can increase as a result of heat transfer from the combustion chamber 1720 in the portions of the pyrolysis chamber 1740 corresponding with the first axial region 1711 and the second axial region 1712. As discussed elsewhere in this disclosure, natural gas or other fluids flowing through the first axial region 1711 can be preheated in a separate heat exchanger before entering the first axial region 1711. The use of such a preheating operation can increase an enthalpy stream into the first axial region 1711, which can permit a design that reduces the length of the first axial region 1711 maintaining pyrolysis efficiency.

As pyrolysis gas in the pyrolysis chamber 1740 moves upward through the first axial region 1711, the pyrolysis in the pyrolysis chamber 1740 can increase in temperature. Once the pyrolysis gas reaches the second axial region 1712, the gas in the pyrolysis chamber 1740 is at the pyrolysis temperature and a pyrolysis reaction can occur. Once the pyrolysis gas in the pyrolysis chamber 1740 has flowed to the third axial region 1713, the temperature of the pyrolysis reactant fluid in the pyrolysis chamber 1740 has been sufficiently elevated to initiate a pyrolysis reaction and hydrogen formation can slow down as more methane or other feedstock fluid is converted into hydrogen. In the third axial region 1713 of the pyrolysis chamber 1740, the required thermal power can be determined as an endothermic pyrolysis reaction.

Figure 18:
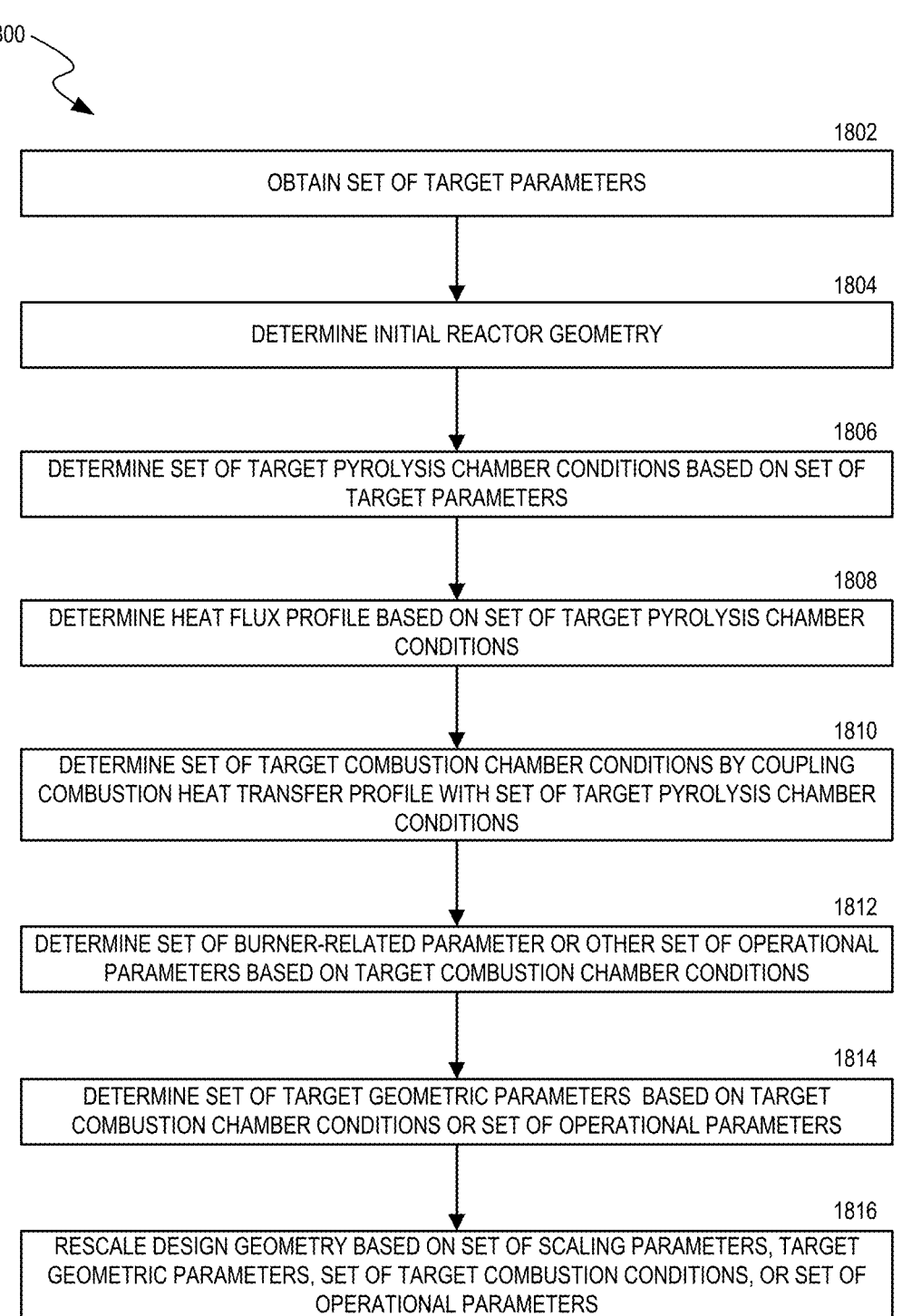
FIG. 18 is a flow diagram of a method for determining reactor geometry and operational parameters, in accordance with embodiments of the present technology.
Figure 19:
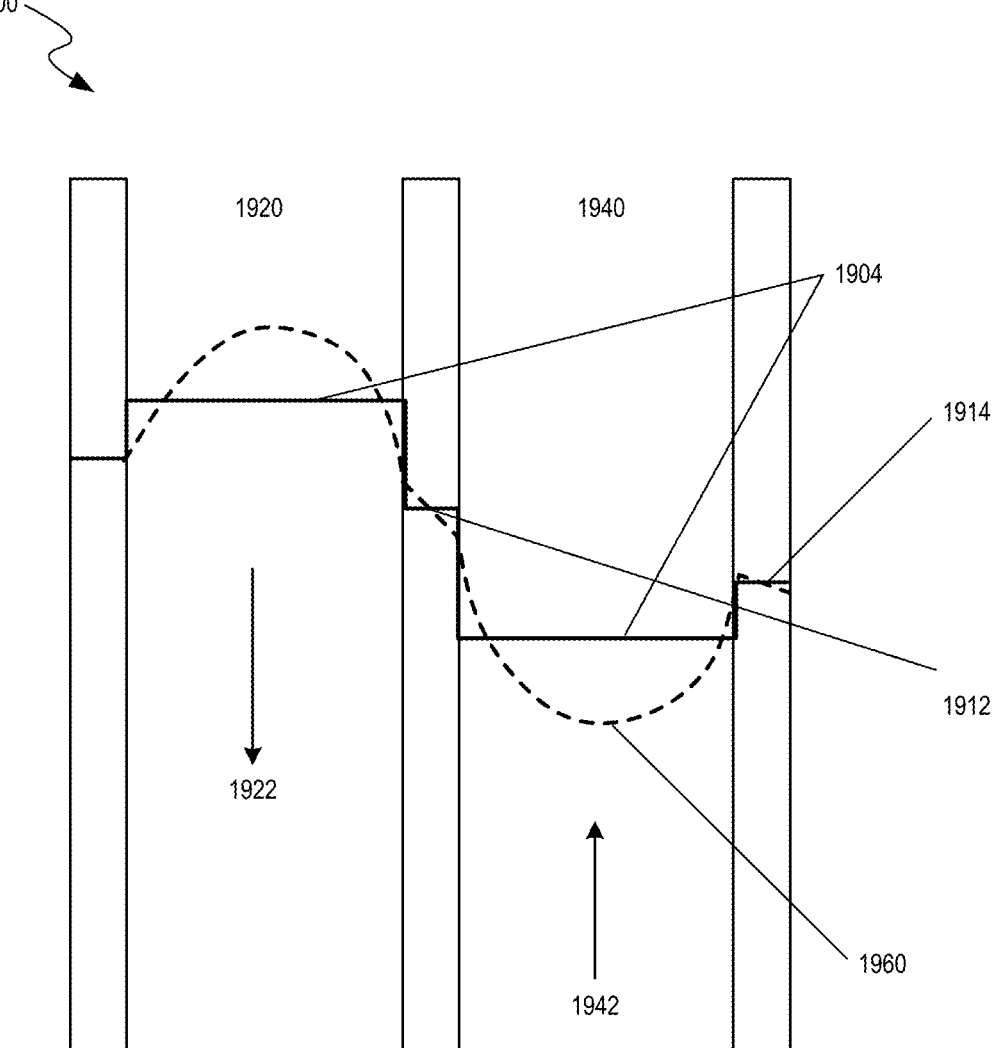
FIG. 19 is a schematic illustration contrasting a less accurate model of a temperature profile with a more accurate model of a temperature profile.
Figure 20:
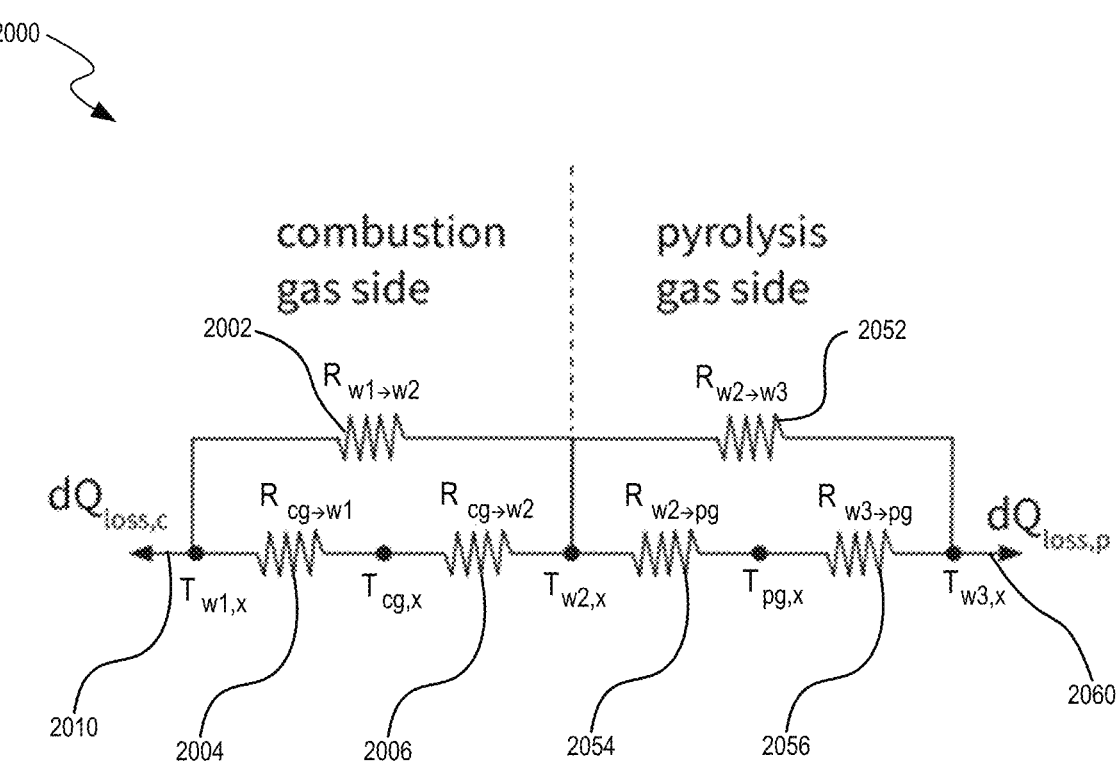
FIG. 20 is a schematic of a thermal resistance network model that can be used to predict thermal behavior of a hydrogen generation system in accordance with embodiments of the present technology.

FIG. 18 is a flow diagram of a method 1800 for determining reactor geometry and operational parameters in accordance with embodiments of the present technology. The method 1800 can be implemented by one or more processors in one or more of the systems described in this disclosure.

The method 1800 can include obtaining a set of target parameters (process portion 1802). Some embodiments can obtain a set of target parameters from a user input provided via a graphical user input, an API, a configuration file, etc. In some embodiments, the set of target parameters can include a target rate, such as a target hydrogen production rate or a target gas consumption. For example, some embodiments can obtain a target hydrogen gas production rate, a target reactant conversion rate, etc. Alternatively, or additionally, some embodiments can obtain a set of parameters correlated with a target production rate, such as a target produced flowrate and a target hydrogen concentration of the target produced flowrate. Some embodiments can also set a target production rate.

Some embodiments can obtain a geometric parameter, which can be related to a physical constraint. For example, some embodiments can obtain a flow cross-sectional area for a pyrolysis chamber, a flow cross-sectional area for a combustion chamber, a reactor length, etc. Some embodiments can establish a range of tolerable dimensions and permit a set of optimization operations to determine a set of reactor geometric parameters that is within the range of tolerable dimensions. For example, some embodiments can obtain a range of annulus dimensions with respect to an annulus length, wall width, material, etc. Some embodiments can perform a series of optimization or modeling operations described in this disclosure for different annulus dimensions.

Some embodiments can obtain constraints to operational parameters, reactor geometry, or other values. Some embodiments can determine a preset type of operating parameter, such as input reactant preheat temperature. For example, some embodiments can obtain a set of limits on a maximum amount of pyrolysis reactant that can be supplied to a reactor and a maximum flowrate through a pyrolysis reactor and a parameter indicating that natural gas entering pyrolysis chamber is preheated to 250° C. or another temperature greater than ambient temperature, or another temperature greater than 100° C. Furthermore, some embodiments can use heating coefficients correlated with the material properties of a pyrolysis chamber that can influence a calculated heat transfer, such as a heat capacity of a wall material used to form a pyrolysis chamber or a combustion chamber.

Various types of constraints can be applied. For example, some embodiments can determine a reactor size constraint, a range of available ceramic tube geometries, a maximum or minimum pyrolysis chamber annulus gap, a maximum or minimum combustion chamber annulus gap, a minimum or maximum pyrolysis gas preheat temperature, or a maximum or minimum combustion air preheat temperature. As described elsewhere, some embodiments can use the target parameters and determine, within the bounds of one or more provided constraints, a set of target geometric parameters or a set of operational parameters. For example, some embodiments can use a set of target parameters and determine, within the bounds of a set of constraints, a reactor length, a flow cross-sectional area of a pyrolysis chamber (e.g., by modifying a pyrolysis chamber annulus gap), a flow cross-sectional area of a combustion chamber (e.g., by modifying a combustion chamber annulus gap), etc. Alternatively, or additionally, some embodiments can use a set of target parameters and determine, within the bounds of a set of constraints, a rate of fuel supplied to a burner, a pyrolysis gas preheating temperature, an air flow preheating temperature.

The method 1800 can include determining an initial reactor geometry (process portion 1804). When determining an initial reactor geometry, some embodiments can generate a reactor having counterflow heat exchange between a pyrolysis chamber and a combustion chamber used to heat the pyrolysis chamber. Some embodiments can generate prismatic geometries for use as pyrolysis chambers or other chambers, where such prismatic geometries can be easier to control with respect to physical maintenance, heat flow, fluid flow, etc. Furthermore, some embodiments can arrange the pyrolysis chamber and combustion chamber in a concentric tube design, where a first tube to be used as a combustion chamber is concentric with and located inside a second tube to be used as a pyrolysis chamber. As discussed elsewhere, some embodiments can optimize a reactor geometry to increase the efficiency of hydrogen production by varying reactor length, varying cross-sectional flow areas of a pyrolysis chamber, or varying cross-sectional flow areas of a combustion chamber.

Some embodiments can generate a reactor structure that does not include fins or other heat-transfer mechanisms. Alternatively, some embodiments can generate a reactor body model that does include one or more fins to increase heat transfer. As discussed elsewhere, some embodiments can remove fins or other physical heat transfer mechanisms from a reactor to reduce the risk of fouling or to increase ease of chamber cleaning.

The method 1800 can include determining a set of target pyrolysis chamber conditions based on the set of target parameters (process portion 1806). Some embodiments can implement an analytical or semi-analytical model when determining a target pyrolysis temperature profile. For example, some embodiments can model pyrolysis gas as entering the a starting position at location x=0 of a pyrolysis chamber, where the pyrolysis gas can be associated with an enthalpy stream $(\dot{m}\Delta h)_{p,0}$, where by the pyrolysis gas mass flowrate can be represented by symbol $\dot{m}_p$ and the enthalpy can be represented by the expression $\Delta h(T-293K)_{p,0}$. A heating zone of a pyrolysis chamber can be in physical contact with the heating zone of a combustion chamber, where heat can transfer from the combustion chamber to the pyrolysis chamber. Some embodiments can model the transfer of heat into the content of the pyrolysis chamber in the heating zone using Equation B.1 below, where a significant portion of the heat is transferred into the sensible heat of the gas/fluid of the pyrolysis chamber, where $(\dot{m}\Delta h)_{p,x}$ represents a required enthalpy stream at axial position x and $(\dot{m}\Delta h)_{CH_4,x}$ represents the temperature-dependent enthalpy at axial position x, under the assumption that the pyrolysis feedstock gas is $CH_4$:

$$(\dot{m}\Delta h)_{p,x} = (\dot{m}\Delta h)_{CH_4,x} \qquad \text{B.1}$$

Some embodiments can further model heat transfer into a pyrolysis chamber by applying different heat flux along different portions of a pyrolysis chamber. While using Equation B.1 as a model for required heat needed for a heating zone, some embodiments can use a different model to determine the amount of heat needed to be transferred into the contents of the pyrolysis chamber in a first pyrolysis zone of a pyrolysis chamber (e.g., the second axial region 1712 of FIG. 17). For example, some embodiment can determine the heat requirements in the first pyrolysis zone based on a sum of the sensible heat of pyrolysis gas, the formed carbon, and the heat of a pyrolysis reaction. For example, some embodiments can model the sum of the sensible heat of pyrolysis gas and the formed carbon using Equations B.2 below, where $(\dot{m}\Delta h)_{H_2,x}$ represents the product of the mass flowrate and enthalpy of $H_2$ at the axial position x, and where $(\dot{m}\Delta h)_C$ represents the product of the mass flowrate and enthalpy of carbon at the axial position x:

$$(\dot{m}\Delta h)_{p,x} = (\dot{m}\Delta h)_{CH_4,x} + (\dot{m}\Delta h)_{H_2,x} + (\dot{m}\Delta h)_{C,x} \qquad \text{B.2}$$

Some embodiments can add this sum to the heat of reaction $\Delta h_R$ for the pyrolysis reaction $CH_4+Energy \rightarrow C+ 2H_2$. Some embodiments can determine an amount of methane conversion at an axial position of the reactor by using a kinetic chemical reaction model. For example, some embodiments can determine reaction kinetics as a function of a local pyrolysis gas temperature and an incremental residence time of the feedstock gas (e.g., the incremental residence time of $CH_4$), where a gas temperature can be approximated as an average temperature for the local axial location. Some embodiments can determine incremental residence time based on an increment length (dx) divided by the pyrolysis gas flow velocity associated with the pyrolysis gas flow velocity. During operations, some embodiments can approximate the pyrolysis gas flow velocity based on a plug flow of the reactor and a measured pyrolysis gas mixture density.

Some embodiments can further model changes in mass flowrate along a pyrolysis chamber, where such mass flowrate changes can be result losses in resulting carbon to the surface of a pyrolysis chamber wall. Alternatively, some embodiments can idealize a pyrolysis reaction such that there is no change in the mass flowrate of pyrolysis gas as it flows through a pyrolysis chamber. In some embodiments, such an idealization can represent pyrolysis operations in which any formed carbon stays fluidized and travels with a pyrolysis gas stream through a pyrolysis chamber.

Some embodiments can further refine a heat transfer model by differentiating a model at a second pyrolysis zone (e.g., the region of a pyrolysis chamber corresponding with the third axial region 1713 of FIG. 17). For example, some embodiments can determine the thermal power demand of a pyrolysis reaction, without any change in temperature in along the axial direction in the second pyrolysis zone. Alternatively, some embodiments can include terms for mass loss (e.g., carbon loss resulting from carbon deposition loss), additional changes in temperature, etc.

Some embodiments can determine one or more constants for use in a model by using one or more types of kinetic models. For example, some embodiments can obtain a target hydrogen concentration and then compare this target value with a predicted hydrogen purity determined with the use of an appropriate kinetic model. Some embodiments can approximate a pyrolysis reaction as a first order kinetic model. Alternatively, some embodiments can use a more complex kinetic model, such as an empirically derived kinetic model that can use a different order for a kinetic model. Furthermore, some embodiments can retrieve a set of model parameters when determining a kinetic model from a database of model parameters based on a reactant or mixture of reactants. For example, some embodiments can select a first set of model parameters for a kinetic model in response to a selection of pure methane as a kinetic model, whereas some embodiments can select a second set of model parameters for a kinetic model in response to a selection of methane, ethane, and propane as a kinetic model. Some embodiments can then determine a maximum reactor temperature based on the target temperature profile.

In some embodiments, a second pyrolysis zone (e.g., the region corresponding with the third axial region 1713 of FIG. 17) can be or otherwise include a region of a pyrolysis chamber where hydrogen formation slows down and a corresponding thermal demand drops. For example, the pyrolysis fluid temperature can remain constant in a second pyrolysis zone (e.g., the third axial region 1713 of FIG. 17). In some embodiments, a constant pyrolysis fluid temperature can be determined primarily by an endothermic pyrolysis reaction. Thus, the thermal power demand can drop far below the thermal demand for sensible heating of the pyrolysis gas, and this drop in demand can accounted for in any temperature profile of a reaction chamber.

The method 1800 can include determining a heat flux profile based on the set of target pyrolysis chamber conditions (process portion 1808). Some embodiments can determine a heat flux using analytical methods, semi-analytical methods, or empirical methods that involve using one or more target pyrolysis chamber conditions as inputs. For example, some embodiments can provide a target pyrolysis chamber temperature profile to a set of heat transfer sub-models based on analytical or semi-analytical heat transfer models to determine a heat flux profile. Furthermore, a condition can include a temperature, a pressure, another state variable (e.g., enthalpy), a composition, etc. A set of conditions can vary along positions of an item being measured.

Some embodiments can generate a conductive heat transfer sub-model (e.g., by using Fourier's Law of heat conduction) through a pipe wall (e.g., a pyrolysis chamber wall). Some embodiments can then compute convective heat transfer at the external surface of the pipe wall and compute a convective heat transfer at the internal surface of the pipe wall. Some embodiments can then further consider radiative heat transfer effects. Some embodiments can then determine a combined heat transfer model based on these heat transfer sub-models, such as by adding their individual components. Some embodiments can then determine one or more possible heat transfer profiles based on the combined heat transfer model.

As described elsewhere, some embodiments can restrict flow to laminar flow in a pyrolysis chamber, where laminar flow can be preferable to turbulent flow due to a reduced risk of equipment clogging or damage from solid carbon byproduct of a pyrolysis reactions. However, though laminar flow can reduce the risk of fouling (e.g., via carbon buildup), such laminar flow can reduce the effectiveness of heat transfer through the pyrolysis chamber. Such difficulties have prevented other pyrolysis reactor systems from operating pyrolysis chambers in a laminar flow regime. However, embodiments of the present technology may overcome these problems by modifying geometry, burner design, and recycling systems to make laminar flow sustainable in pyrolysis reactor operations.

Some embodiments can model heat transfer based on the enthalpy stream of a combustion gas enthalpy stream of the combustion gas $(\dot{m}\Delta h\,(T-293K))_{c,L}$ using Equation B.3, where $(\dot{m}\Delta h)_{c,L}$ represents the enthalpy flow entering a combustion chamber at the axial position of the combustion starting point, L, and where $\dot{Q}_{burner}$ represents a thermal input power from a reactor burner, and where $\dot{Q}_{loss,L}$ represents a lumped heat loss term that includes all heat losses from the combustion gas within the combustion zone:

$$(\dot{m}\Delta h)_{c,L} = \dot{Q}_{burner} - \dot{Q}_{loss,L} \qquad \text{B.3}$$

In some embodiments, the combustion gas mass flowrate $\dot{m}_c$ shown in Equation B.3 can be represented as a sum of the methane mass flowrate $\dot{m}_{CH_4}$ and stoichiometric combustion air mass flowrate $\dot{m}_{AIR,stoich}$. It should be understood to a person of ordinary skill in the art that other combustion fluids, such as methane, ethane, or a mixture of combustion fluids can be used in place of methane.

Some embodiments can approximate the heat generated by the burner using Equation B.4 below, where m represents the mass flowrate of the combustion gas (e.g., $CH_4$), LHV represents the lower heating value (e.g., 802.3 kiloJoules/mole for methane) (thus the combined term $(\dot{m}\times LHV)_{CH_4}$ represents the combustion enthalpy input of the methane fuel), and where the second term is an the enthalpy mass flowrate term for the enthalpy stream in the stoichiometric combustion air $(\dot{m}\Delta h(T-293K))_{AIR,stoich}$:

$$\dot{Q}_{burner} = (\dot{m}\times LHV)_{CH_4} + (\dot{m}\Delta h)_{AIR,stoich} \qquad \text{B.4}$$

Some embodiments can increase the available heat of the combustion gas, some embodiments can preheat air flowing into a combustion chamber. Some embodiments can determine temperature along the length of the reactor using an energy balancing model, such as the energy balancing model represented by Equation B.5 below, where $\dot{m}_c$ represents a combustion gas mass flowrate, and where $(\Delta h_{c,x+dx}-\Delta h_{c,x})$ represents an incremental difference in combustion gas enthalpy between the axial position x and the axial position x+dx, and where $d\dot{Q}_{loss,c}$ represents heat losses on the combustion side of the reactor length, and where $dQ_{loss,p}$ represents heat losses on the pyrolysis side along the reactor length. $\Delta h(T_x-293K)$ $$\dot{m}_c \cdot (\Delta h_{c,x+dx} - \Delta h_{c,x}) - d\dot{Q}_{loss,c} = \qquad \text{B.5}$$

$$(\dot{m}\Delta h)_{c,x+dx} - (\dot{m}\Delta h)_{p,x} + d\dot{Q}_{loss,p} = d\dot{Q}_{x \to x+dx}$$

In an idealized reaction, the combustion gas mass flowrate $\dot{m}_c$ can represents the mass flowrate of carbon dioxide, water vapor and nitrogen. However, some embodiments can include additional refinements to combustion gas mass flowrate to account for other possible byproducts of combustion.

The method 1800 can include determining a set of target combustion chamber conditions by coupling the combustion heat transfer profile with the set of target pyrolysis chamber conditions (process portion 1810). Some embodiments can use the target temperature profiles to determine a target temperature profile of a combustion chamber. For example, some embodiments can apply an energy balancing method to determine a target combustion gas temperature from energy balance with pyrolysis gas temperature profile. Some embodiments can then use the target combustion gas temperature as an intermediate set of values to determine a target combustion chamber wall temperature in order to satisfy a target energy transfer rate that accounts for a sensible heat of material in a pyrolysis chamber, an endothermic heat of reaction of reactants in the pyrolysis chamber, and possible heat losses out of the pyrolysis chamber.

Some embodiments can generate a combined model usable to determine a target combustion chamber temperature profile by coupling the heat transfer of the combustion chamber and the heat transfer of the pyrolysis chamber. For example, some embodiments can linearize a radiation heat transfer and set the combustion side the heat transfer to include a convection heat transfer from combustion gas to a reactor wall between a combustion chamber and a pyrolysis chamber (e.g., the second reactor wall 1702 of FIG. 17). Some models can further include a term to represent convection heat transfer to a first reactor wall.

When coupling a heat transfer from a combustion chamber to the heat transfer into a pyrolysis chamber, some embodiments can model the combustion chamber side of the heat transfer to include a radiative heat transfer from a first reactor wall representing an inner wall of the combustion chamber (e.g., the first reactor wall 1701 of FIG. 17) to a second reactor wall between the convection chamber and the pyrolysis chamber (e.g., the second reactor wall 1702 of FIG. 17). In some embodiments, the radiative heat transfer can be approximated as a convection heat transfer to the first reactor wall, where the first reactor wall then radiatively transfers heat to the second reactor wall. Some embodiments can balance these heat transfer terms on the combustion chamber side with the heat transfer terms on the pyrolysis chamber side. For example, some embodiments can use a model that includes a convective heat transfer from the second reactor wall to a third reactor wall representing the outer wall of a pyrolysis chamber (e.g., the third reactor wall 1703 of FIG. 17) and a radiative heat transfer term representing the thermal loading of another portion of the pyrolysis chamber (e.g., the third axial region 1713 via thermal radiation from the second reactor wall 1702 of FIG. 17). The model can be represented by Equation B.6 below, where $T_{cg,x}$ is the temperature of combustion gas (or other combustion fluid) at the axial position x, and where $R_{cg \to w2}$ represents a convective thermal resistance from the combustion gas in the combustion chamber to the second reactor wall, and where $R_{cg \to w1}$ represents a convective thermal resistance of the first wall, and where $R_{w2 \to pg}$ represents a convective thermal resistance of the second wall, and where $R_{w3 \to pg}$ represents a convective thermal resistance of the third wall, and where $R_{w1 \to w2}$ represents a linearized radiative thermal resistances from the first reactor wall to the third reactor wall, and where $R_{w2 \to w3}$ represents a linearized radiative thermal resistances from the second reactor wall to the third reactor wall:

$$d\dot{Q}_{x \to x+dx} = \frac{(T_{cg,x} - T_{w2,x})}{R_{cg \to w2}} + \frac{(T_{cg,x} - T_{w2,x})}{R_{cg \to w1} + R_{w1 \to w2}} - d\dot{Q}_{loss,c} = \qquad \text{B.6}$$

$$\frac{(T_{w2,x} - T_{pg,x})}{R_{w2 \to pg}} + \frac{(T_{w2,x} - T_{pg,x})}{R_{w3 \to pg} + R_{w2 \to w3}} + d\dot{Q}_{loss,p}$$

In some embodiments, one or more of the above terms can be empirically determined based on sensor data. Alternatively, or additionally, some embodiments can use analytical or semi-analytical methods to determine a pyrolysis gas. For example, some embodiments can determine the term $R_{cg \to w2}$ using Equation B.7 below, where $dA_{w2}$ represents an incremental convection surface area of the second reactor wall, and where $h_{cg}$ represents the convection heat transfer coefficient:

$$R_{cg \to w2} = \frac{1}{dA_{w2}h_{cg}} \qquad \text{B.7}$$

While some embodiments can use a heat transfer model that treats heat transfer coefficient as constant, some embodiments can use more sophisticated models that use a temperature-dependent heat transfer coefficient. Some embodiments can update heat transfer coefficients by using a function that outputs a heat transfer coefficient based on a provided temperature. Furthermore, some embodiments can calculate thermal resistances along each increment of a reactor. Similarly, some embodiments can determine linearized radiative thermal resistances based on approximation, where $F_{1 \to 2}$ is the viewfactor from one reactor wall increment to another, $\varepsilon_{12}$ is the effective emittance for the two surfaces of the first reactor wall and the second reactor wall, and where $\sigma$ is the Stefan-Boltzmann constant:

$$\frac{T_{w_1} - T_{w_2}}{F_{1 \to 2} dA_{w_1} \varepsilon_{12} \sigma \left(T_{w_1}^4 - T_{w_2}^4\right)} \qquad \text{B.8}$$

In some embodiments, the convection heat transfer coefficients can be approximated with a model using Equation B.9, where Nu represents the Nusselt number, $D_h$ represents a hydraulic diameter (where the hydraulic diameter of an annulus is the difference between the annulus' outer and the annulus' inner diameter), and where k represents a thermal conductivity:

$$h = \frac{Nu \cdot k(T)}{D_h} \qquad \text{B.9}$$

In some embodiments, the hydraulic diameter $D_h$ can be modified based on an annulus gap. Thus, by modifying an annulus gap of a combustion chamber, some embodiments can modify the convective heat transfer coefficient h in the annulus, which can thus modify the combustion chamber heat resistance term $R_{cg \to w2}$. Similarly, by modifying the annulus gap of a pyrolysis chamber, some embodiments can modify the pyrolysis chamber thermal resistance term $R_{pg \to w3}$. Furthermore, it should be understood that modifying an annulus gap can have similar effects on other thermal resistance values. Equation B.9 assumes that the Nusselt number Nu is a constant value, where this assumption can be applicable under certain flow regimes, such as a laminar flow regime in which a Reynolds number of the flow is less than 2300. Some embodiments can use other Equations for a convective heat transfer coefficients can be used in other scenarios, such as in a turbulent flow regime in which the Nusselt number Nu can increase with a flow rate.

Some embodiments can apply limits to target combustion chamber temperature profiles based on known limits to combustion. For example, some embodiments can obtain data indicating that a maximum temperature from a combustion reaction is 2,810° C. and, in response, set 2,810° C. as the maximum temperature of a combustion zone in a pyrolysis chamber.

The method 1800 can include determining a set of burner-related parameters or other set of operational parameters based on the set of target combustion chamber conditions (process portion 1812). Some embodiments can determine a burner-related parameter, such as a rate of air flow through a burner, a rate of combustion fuel flow through a burner, etc. Some embodiments can determine the burner-related parameter based on a required thermal power input, where the thermal power input can be determined based on the target combustion chamber temperature profile. In some embodiments, the accumulated thermal power input can represent an available amount of heat resulting from combustion of fuel in the combustion chamber.

In some embodiments, the set of operational parameters can control one or more valves of a reactor, such as valves controlling fuel flow, reactant flow, air flow, etc. Some embodiments can also set operational parameters related to preheating elements, which can raise the temperature of one or more fluids in a reactor before combustion, pyrolysis, or some other chemical reaction. For example, some embodiments can increase an amount of heated fluid flow or electric power to a heating system that preheats air entering a combustion chamber to a target minimum preheating temperature. Some embodiments can set the fuel or air flowing through a burner to change the total heat produced in a combustion chamber to modify a burner power output. Some embodiments can also change the blend used in a combustion fluid if more than one fluid is used for combustion. For example, some embodiments can increase the fractional amount ethane used in a combustion operation relative to the amount of methane used in the combustion operation. Alternatively, or additionally, some embodiments can change the mixture rate of natural gas. In addition, some embodiments can set flow parameters of fluids in a combustion chamber, a pyrolysis chamber, or other portion of a pyrolysis reactor to modify the heat loss in a combustion zone. For example, some embodiments can increase a fluid flow through a heat exchanger to reduce a combustion zone heat loss. In some embodiments, the set of operational parameters can control one or more valves of a reactor, such as valves controlling fuel flow, reactant flow, air flow, etc.

The method 1800 can include determining a set of target geometric parameters based on the set of target combustion chamber conditions or set of operational parameters (process portion 1814). A target geometric parameter can include a combustion gap, a reactor length, or another geometric position. For example, a set of target geometric parameters can include a set of combustion gap distribution along a reactor length. Some embodiments can recommend an annulus gap using a model based on Equation B.9, B.7, and B6. As disclosed elsewhere, some embodiments can use a set of models which indicate a relation between an annulus gap, heat transfer coefficients, and reactor temperatures. Some embodiments can then use this relation to determine an optimal set of gaps by providing the set of models with a determined combustion chamber temperature profile, a pyrolysis chamber temperature profile, or a heat flux profile. By determining a set of annulus gaps, some embodiments can determine a combustion gap distribution to increase a convective heat transfer and radiation contribution. Furthermore, some embodiments can modify the combustion gap distribution to optimize the temperature profile of a set of combustion chamber walls.

When determining a gap distribution, some embodiments can restrict recommended geometries to a uniform gap. For example, if an annulus is used as a combustion chamber, some embodiments can recommend an annulus gap equal to 5.0 centimeters (cm) along the length of the combustion chamber using one or more operations of this disclosure. Alternatively, some embodiments can recommend multiple annulus gaps associated with different positions of the combustion chamber. For example, some embodiments can recommend a first annulus gap equal to 5.0 cm between 0.0 cm to 1.5 cm along an axial length of the combustion chamber, and then can recommend a second annulus gap equal to 3.0 cm between 1.5 cm to 5.0 cm.

The method 1800 can include rescaling the designed geometry based on a set of scaling parameters, set of target combustion chamber conditions, or set of operational parameters (process portion 1816). In some embodiments, the set of scaling parameters can be provided by a user, configuration file, or other data source. To scale a design, some embodiments can use a scaling model that approximates linear scaling of the computed parameters. In some embodiments, the scaling model can permit re-scaling of different parameters under the limitation of a constant scaling factor, where some embodiments can also keep the scaling factor equal to 1. For example, some embodiments can use a model to determine the geometry for a scaled based on Equation B.10, where $A_s$ represents the pyrolysis chamber flow cross-sectional area for a scaled reactor, $P_s$ represents the pyrolysis chamber pressure for the scaled production, $v_s$ represents the pyrolysis chamber fluid velocity for the scaled production, $Nu_s$ represents the pyrolysis chamber fluid velocity for the scaled production, $D_{h,s}$ represents the hydraulic diameter for the scaled production, $L_s$ represents a reactor length for the scaled production, $ID_s$ represents an annulus inner diameter for the scaled production, and where $A_b$ represents the pyrolysis chamber flow cross-sectional area for the determined baseline geometry, $P_b$ represents the pyrolysis chamber pressure for the determined baseline geometry, $v_b$ represents the pyrolysis chamber fluid velocity for the determined baseline geometry, $Nu_b$ represents the pyrolysis chamber fluid velocity for the determined baseline geometry, $D_{h,b}$ represents the hydraulic diameter for the determined baseline geometry, $L_b$ represents a reactor length for the determined baseline geometry, $ID_b$ represents an annulus inner diameter for the determined baseline geometry.

$$h = \frac{A_s P_s v_s}{A_b P_b v_b} \times \frac{Nu_b}{Nu_s} \times \frac{D_{h,s}}{D_{h,b}} \times \frac{L_b}{L_s} \times \frac{ID_b}{ID_s} = \text{scaling ratio} = 1 \qquad \text{B.9}$$

Some embodiments can use a linear scaling approximation to determine different combinations of parameters that can maintain the scaling ratio. For example, some embodiments can rescale a pyrolysis operation of a pyrolysis reactor to increase a mass flowrate (reflected by the product $A_s$ $v_s$) to reflect a target increase in $H_2$ production rate under conditions of a constant reactor length $L_s$ and pyrolysis flow cross-sectional area $A_s$ while increasing a reactor pressure $P_s$ or NG volume flowrate (e.g., by increasing $v_s$), decreasing annulus size As, or increasing the combustion tube diameter.

Some embodiments can further rescale a reactor by generating a reactor system having multiple reactor cores. For example, some embodiments can generate a reactor system having four concentric reactor subsystems, where each concentric reactor subsystem includes a respective annular pyrolysis chamber and a respective annular combustion chamber concentric with the respective annular pyrolysis chamber.

The method 1800 indicates a set of relations between different operational parameters and geometric parameters. For example, by increasing the flow cross-sectional area of a pyrolysis chamber or by increasing a reactor length while keeping the flow rate of reactant into a pyrolysis chamber constant, a reactant fed into the pyrolysis chamber can experience greater residence time. This increased residence time can increase the likelihood that a reactant molecule such as methane or ethane would undergo pyrolysis and thus would increase a methane conversion efficiency. Alternately, some embodiments can maintain a methane gas conversion fraction by increasing a mass flow rate, which can increase total amount of H2 being produced. It should be understood that increasing a flow rate without modifying other parameters can reduce an hydrogen purity of the output of a pyrolysis chamber.

Another additional relationship indicated by models used in the method 1800 include a model indicating the relationship between a hydraulic diameter and hydrogen production. In some embodiments, reducing the hydraulic diameter of a pyrolysis chamber can increase the heat transfer and thermal power input potential to any pyrolysis gas within the pyrolysis chamber. This increased thermal input can support a greater methane conversion fraction or a greater pyrolysis gas mass flow rate or a greater hydrogen production rate. Conversely, reducing the hydraulic diameter of a pyrolysis chamber while keeping the methane conversion fraction and mass flow rates constant can reduce a required reactor surface temperature. By adjusting a local hydraulic diameter of an annulus being used as a combustion chamber, a local combustion heat flux of the combustion chamber can be modified to match a required heat flux to the pyrolysis chamber or a required temperature along the length of a pyrolysis reactor.

FIG. 19 is a schematic illustration 1900 contrasting a less accurate model of a temperature profile with a more accurate model of a temperature profile. As can be seen by a less accurate model temperature profile 1904, a less-accurate model can approximate temperatures based on an average temperature value in a combustion fluid channel 1920 and in a pyrolysis fluid channel 1940. Similarly, as can be seen in a more accurate model temperature profile 1960, the temperature of a fluid at an axial position can vary based on a distance from an axial center of the combustion fluid channel 1920 and the pyrolysis fluid channel 1940.

Fluids flowing in the combustion fluid channel 1920 can be flowing in a first direction 1922, and fluids flowing in the pyrolysis fluid channel 1940 can be flowing in a second direction 1942. The first direction 1922 can be in the opposite direction of the second direction 1942, co-linear with the second direction 1942, parallel with the second direction 1942, and/or the like. Furthermore, during operation of a hydrogen production system that includes the combustion fluid channel 1920 and the pyrolysis fluid channel 1940, the model temperature profile 1904 can indicate a convection temperature drop at a first radial position 1912 and a second radial position 1914, where the first radial position 1912 represents the position of a wall between the combustion fluid channel 1920, and where the second radial position 1914 represents the position of a wall between the pyrolysis fluid channel 1940 and a region outside the pyrolysis fluid channel 1940. Similarly, the more accurate model temperature profile 1960 indicates a convection temperature drop at the positions 1912-1913.

FIG. 20 is a schematic of a thermal resistance network model 2000 that can be used to predict thermal behavior of a hydrogen generation system in accordance with embodiments of the present technology. Some embodiments can use the thermal resistance network model 2000 to predict the thermal behavior of the reactor 1700 of FIG. 17. The thermal resistance network model 2000 includes a first resistor approximation 2002, a second resistor approximation 2004, and a third resistor approximation 2006 to predict, respectively, temperatures for the first reactor wall 1701 of FIG. 17, the second reactor wall 1702 of FIG. 17, and the fluid in the combustion chamber 1720 of FIG. 17. The thermal resistance network model 2000 includes a fourth resistor approximation 2052, a fifth resistor approximation 2054, and a sixth resistor approximation 2056 to predict, respectively, temperatures for the second reactor wall 1702 of FIG. 17, the third reactor wall 1703 of FIG. 17, and the fluid in the pyrolysis chamber 1740 of FIG. 17. In some embodiments, the various resistor approximations 2002, 2004, 2006, 2052, 2054, 2056 can be determined based on equations similar to or the same as at least one of Equations B.1 to B.9. For example, the value the third resistor approximation 2006 can be determined using a model based on Equation B.7.

The first resistor approximation 2002 represents an approximation for a temperature difference from the first reactor wall 1701 of FIG. 17 to the second reactor wall 1702 of FIG. 17 caused by radiative heat transfer between the first reactor wall 1701 and the second reactor wall 1702. The second resistor approximation 2004 represents an approximation for a temperature difference between the first reactor wall 1701 of FIG. 17 and fluid in the combustion chamber 1720 of FIG. 17 caused by thermal conduction or convection between the fluid in the combustion chamber 1720 of FIG. 17 and the first reactor wall 1701 of FIG. 17. The third resistor approximation 2006 represents an approximation for a temperature difference between fluid in the combustion chamber 1720 of FIG. 17 and the second reactor wall 1702 of FIG. 17 caused by thermal conduction or convection between the fluid in the combustion chamber 1720 of FIG. 17 and the second reactor wall 1702 of FIG. 17.

The fourth resistor approximation 2052 represents an approximation for a temperature difference between the second reactor wall 1702 of FIG. 17 and the third reactor wall 1703 of FIG. 17 caused by radiative heat transfer between the second reactor wall 1702 of FIG. 17 and the third reactor wall 1703 of FIG. 17. The fifth resistor approximation 2054 represents an approximation for a temperature difference between the second reactor wall 1702 of FIG. 17 and fluid in the combustion chamber 1720 of FIG. 17, resulting in thermal conduction or convection between the second reactor wall 1702 of FIG. 17 and fluid in the combustion chamber 1720 of FIG. 17. The third resistor approximation 2006 represents an approximation for a temperature difference between fluid in the pyrolysis chamber 1740 of FIG. 17 and the third reactor wall 1703 of FIG. 17 caused by thermal conduction or convection between the fluid in the pyrolysis chamber 1740 of FIG. 17 and the third reactor wall 1703 of FIG. 17. Furthermore, additional heat loss in a combustion reactor can be modeled by a loss term $dQ_{loss,C}$, as shown by a combustion heat loss arrow 2010, and heat loss in a combustion reactor can be modeled by a loss term $dQ_{loss,P}$, as shown by a combustion heat loss arrow 2060. As should be understood, conversion of thermal relationships into simplified resistor approximations of a thermal resistance network can accelerate operations to determine operational states or recommend reactor geometries.

Figures 21A, 21B, 21C:
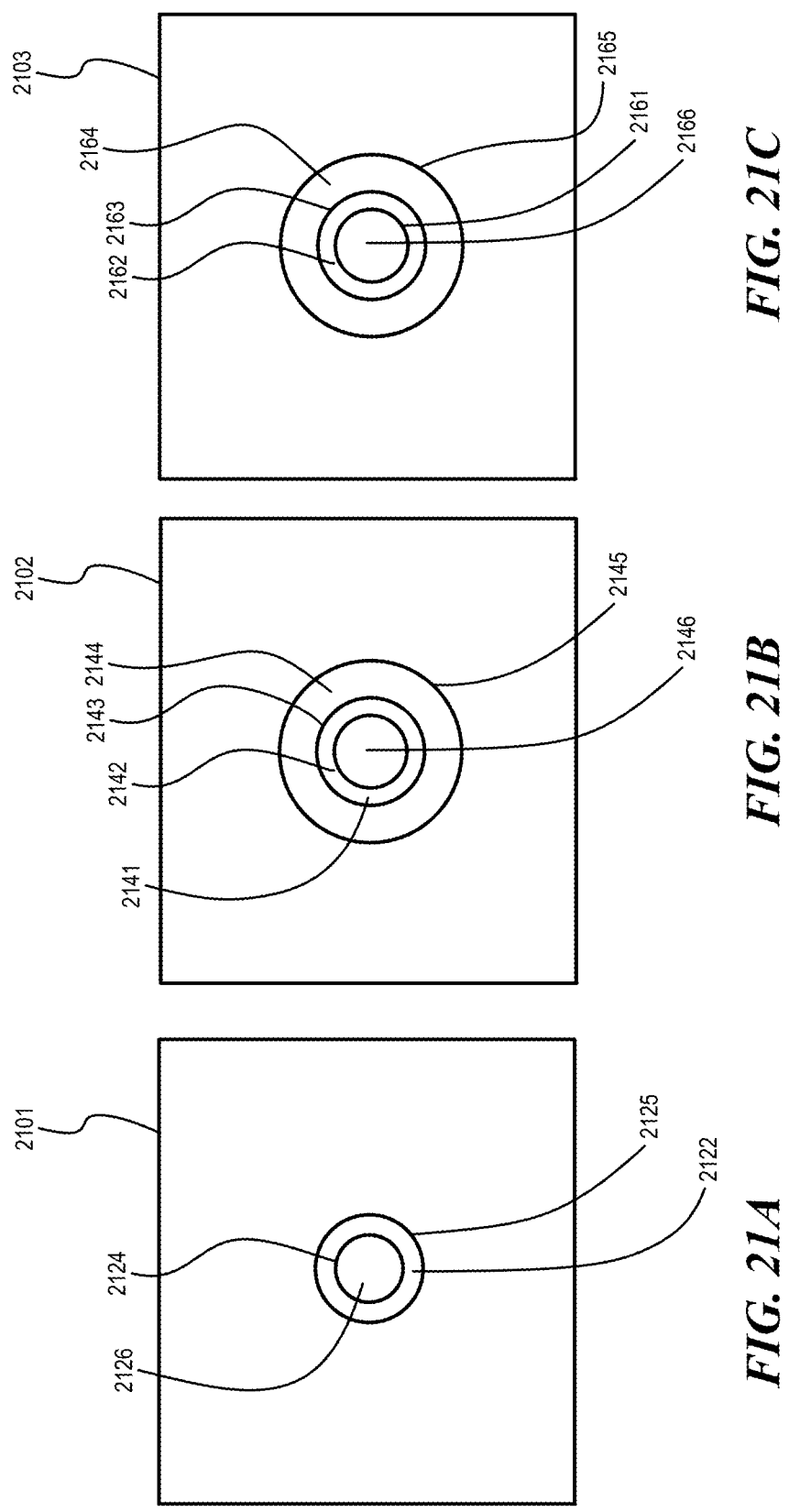
FIGS. 21A-21C are partially schematic top views of pyrolysis reactor designs in accordance with embodiments of the present technology.

FIGS. 21A-21C are partially schematic top views of pyrolysis reactor designs in accordance with further embodiments of the present technology. As illustrated in FIG. 21A, the pyrolysis reactor can be a tubular pyrolysis reactor 2101 that includes a pyrolysis tube 2124 (e.g., a pyrolysis chamber) and combustion tube 2125 (e.g., a combustion chamber) that is coaxial with the pyrolysis tube 2124. The pyrolysis tube 2124 and the combustion tube 2125 are spaced apart by a combustion annulus 2122 such that the pyrolysis tube 2124 serves as an inner wall of the combustion annulus 2122 and the combustion tube 2125 serves as an outer wall of the combustion annulus 2122. The tubular pyrolysis reactor 2101 also includes a tubular pyrolysis region 2126 (e.g., pyrolysis flow path) that is confined by the pyrolysis tube 2124. Similar to the discussion above, a burner (e.g., the burner of any of the embodiments discussed above) of the tubular pyrolysis reactor 2101 can combust a mixture of a combustion fuel (e.g., natural gas, methane, hydrogen gas, and/or the like) and air (or pure oxygen) within the combustion annulus 2122. The combustion, in turn, can heat fluids (e.g., a pyrolysis feedstock, such as natural gas, methane, and/or any other suitable hydrocarbon) flowing through the tubular pyrolysis region 2126 to drive a pyrolysis reaction that generates hydrogen.

In the illustrated embodiments, a hydraulic diameter of the combustion annulus 2122 can be measured based on a difference between the inner diameter of the pyrolysis tube 2124 and the inner diameter of the combustion tube 2125, while a hydraulic diameter of the pyrolysis region 2126 can be measured by the diameter of the pyrolysis tube 2124. As a result, the hydraulic diameter of the combustion annulus 2122 and/or the hydraulic diameter of the pyrolysis region 2126 (and therefore a cross-sectional area of the pyrolysis region 2126) can be controlled along a length of the tubular pyrolysis reactor 2101 (e.g., by varying the outer diameter of the combustion tube 2125 and/or the pyrolysis tube 2124). The variation can, for example, restrict and/or provide additional room for flow through the pyrolysis region 2126, which can help create and/or maintain laminar flow through the pyrolysis region 2126 as a pyrolysis reaction occurs. Further, by allowing the tubular pyrolysis reactor 2101 to create and/or maintain the laminar flow, the variation can allow the tubular pyrolysis reactor 2101 to be more easily scaled.

FIG. 21B illustrates an annular pyrolysis reactor 2102 that is generally similar to the tubular pyrolysis reactor 2101 of FIG. 21A. For example, the annular pyrolysis reactor 2102 includes a pyrolysis tube 2145 and a combustion tube 2143 that is coaxial with the pyrolysis tube 2145. In the illustrated embodiment, however, the combustion tube 2143 is positioned within the pyrolysis tube 2145. Said another way, the pyrolysis tube 2145 annularly surrounds the combustion tube 2143. As a result, the pyrolysis tube 2145 can provide an outer wall for a pyrolysis annulus 2144 while the combustion tube 2143 provides an inner wall for the pyrolysis annulus 2144. Further, the annular pyrolysis reactor 2102 can also include an inner tube 2141 that is coaxial with and positioned within the combustion tube 2143. As a result, the combustion tube 2143 can provide an outer wall for a combustion annulus 2142 while the inner tube 2141 provides an inner wall for the combustion annulus 2142.

Similar to the discussions above, heat generated in the combustion annulus 2142 (e.g., by combustion) can be communicated to the pyrolysis annulus 2144 to provide the thermal energy to drive a pyrolysis reaction therein. That is, combustion within the combustion annulus 2142 can help generate hydrogen gas within the pyrolysis annulus 2144. The efficiency of the annular pyrolysis reactor 2102 can be based on the amount of heat from the combustion that is communicated to the pyrolysis annulus 2144 instead of being carried out of the combustion annulus 2142 by flue gas. In general, the more heat that is communicated, the more efficient the annular pyrolysis reactor 2102 can be. Accordingly, annular pyrolysis reactor 2102 can include features that help increase the amount of heat that is communicated.

For example, the inner tube 2141 can include a thermal rod 2146. The thermal rod 2146 can absorb heat from the combustion and radiate the heat toward the pyrolysis annulus 2144, thereby improving heat transfer into the pyrolysis annulus 2144 over time. Additionally, or alternatively, the thermal rod 2146 can reduce a hydraulic diameter of the combustion annulus 2142, measured as a distance between the inner tube 2141 and the combustion tube 2143. As a result, the thermal rod 2146 can help increase the communication of heat through the combustion tube 2143 and into the pyrolysis annulus 2144. However, the concentric tube design of the annular pyrolysis reactor 2102 can permit the cross-sectional area of the flow paths in the pyrolysis reactor annulus 2144 and/or the combustion annulus 2142 to be decoupled from (or only loosely coupled to) hydraulic diameters within the annular pyrolysis reactor 2102. The decoupling can allow the annular pyrolysis reactor 2102 to be more easily scaled with respect to hydrogen production.

Furthermore, the components of the annular pyrolysis reactor 2102 can help increase the mechanical stability of the pyrolysis annulus 2144. For example, the combustion tube 2143 can be formed from (or include) a ceramic or other suitable compression-resistant material, which can help the combustion tube 2143 withstand an increase in pressure in the pyrolysis annulus 2144 (e.g., as the pyrolysis feedstock heats up and/or undergoes pyrolysis). Still further, the concentric tube design of the combustion annulus 2142 and the pyrolysis annulus 2144 can increase both convective and radiative heat transfer to the pyrolysis annulus 2144 from the combustion annulus 2142. As a result, the annular design can reduce (or minimize) the need for more complex heat transfer mechanisms, such as fins between the chambers.

Additionally, or alternatively, the annular design allows the cross-sectional area of the pyrolysis zone to be defined by the pyrolysis annulus 2144 (e.g., the distance between the combustion tube 2143 and the pyrolysis tube 2145). As a result, the cross-sectional area of the pyrolysis zone can be controlled along a length of the annular pyrolysis reactor 2102 (e.g., by varying a cross-sectional area the combustion tube 2143 and/or the pyrolysis tube 2145, by varying a diameter of the combustion tube 2143 and/or the pyrolysis tube 2145, and/or the like). The variation can restrict and/or provide additional room for flow through the pyrolysis zone, which can help create and/or maintain laminar flow through the pyrolysis annulus 2144 as a pyrolysis reaction occurs. Further, by allowing the annular pyrolysis reactor 2102 to create and/or maintain the laminar flow, the variation can allow the annular pyrolysis reactor 2102 to be more easily scaled.

Figures 22A, 22B, 22C, 22D:
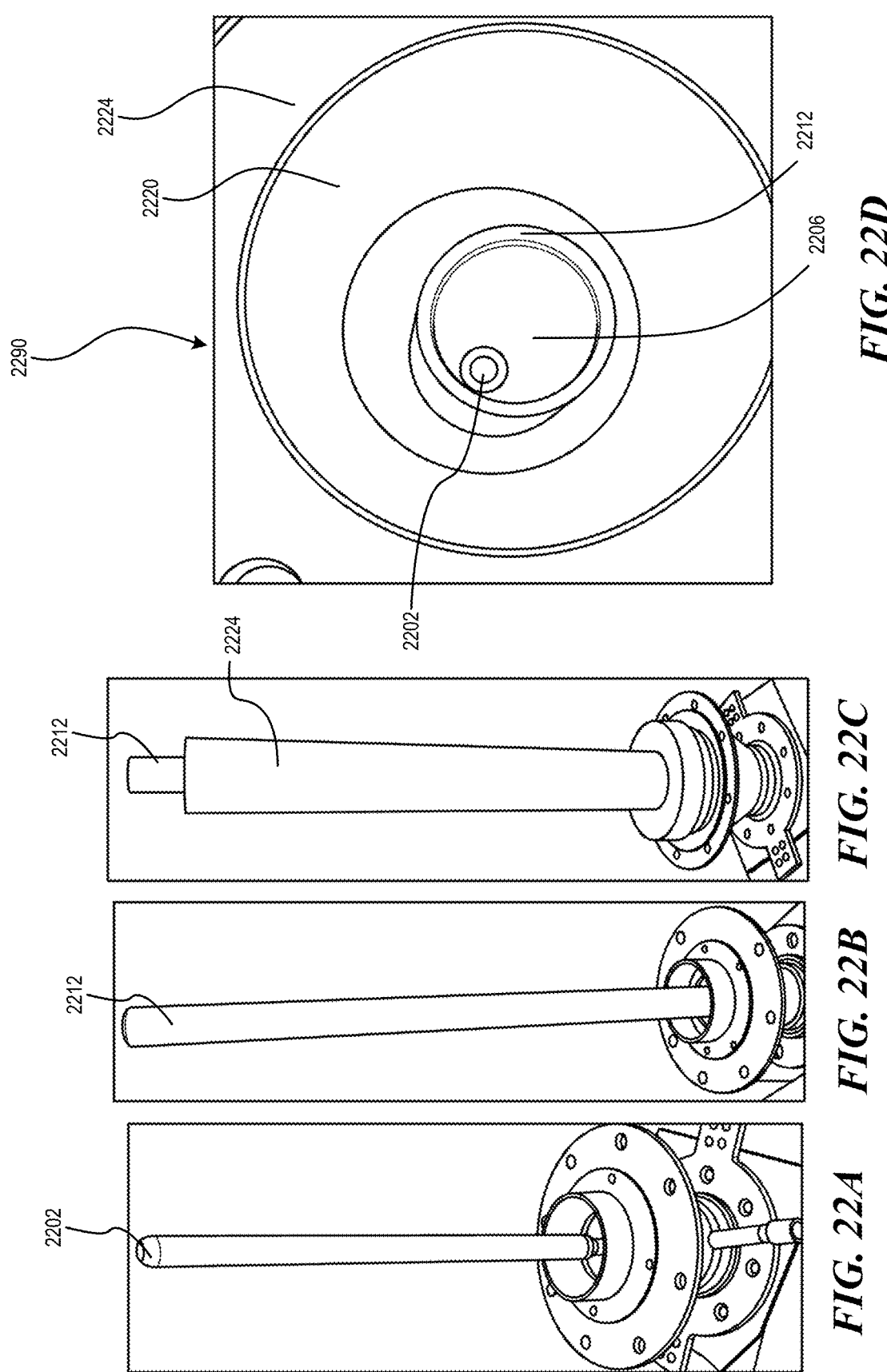
FIGS. 22A-22D are partially schematic top views of components of a pyrolysis reactor configured in accordance with some embodiments of the present technology.

FIG. 21C illustrates a tubular annular pyrolysis reactor 2103 that is generally similar to the tubular pyrolysis reactor 2101 of FIG. 21A and the annular pyrolysis reactor 2102 of FIG. 22B. For example, the tubular annular pyrolysis reactor 2103 includes an inner tube 2161, a combustion tube 2163 that is coaxial with and positioned around the inner tube 2161, and a pyrolysis tube 2165 that is coaxial with and positioned around the combustion tube 2163. Further, the tubular annular pyrolysis reactor 2103 includes a combustion annulus 2162 between the inner tube 2161 and the combustion tube 2163, as well as a pyrolysis annulus 2164 between the combustion tube 2163 and the pyrolysis tube 2165. In the illustrated embodiments, however, the tubular annular pyrolysis reactor 2103 also includes a tubular pyrolysis region 2166 that is defined by the interior of the inner tube 2161.

Said another way, the combustion annulus 2162 is coaxially positioned between inner and out pyrolysis chambers. As a result, heat generated in the combustion annulus 2162 (e.g., via combustion) can provide the thermal energy for pyrolysis reactions in both the pyrolysis annulus 2164 and the tubular pyrolysis region 2166. As a result, the design of tubular annular pyrolysis reactor 2103 can increase the volume of space (and/or the cross-sectional area for gaseous flow) in which pyrolysis reactions can take place, without increasing an overall footprint of the tubular annular pyrolysis reactor 2103 (e.g., as compared to the tubular pyrolysis reactor 2101 of FIG. 21A and the annular pyrolysis reactor 2102 of FIG. 22B)

FIGS. 22A-22D are partially schematic top views of components of a pyrolysis reactor configured in accordance with some embodiments of the present technology. Referring to FIG. 22A, the pyrolysis reactor can include a rod 2202 that is positioned at least partially within a combustion chamber. Similar to the discussion above, the rod 2202 can act as a heat retention/distribution mechanism for the pyrolysis reactor. For example, the rod 2202 can absorb heat from combustions and then radiate the heat toward a pyrolysis chamber of the pyrolysis reactor to help improve heat transfer to the pyrolysis chamber. FIG. 22B illustrates the pyrolysis reactor with a first tube 2212. The first tube 2212 can surround the rod 2202 (FIG. 22A) and provide an outer wall of a combustion annulus in the pyrolysis reactor. FIG. 22C illustrates the pyrolysis reactor with a second tube 2224 that is coaxial with and surrounds the first tube 2212. In such embodiments, a space between the second tube 2224 and the first tube 2212 can provide a pyrolysis annulus for the pyrolysis reactor.

FIG. 22D illustrates a pyrolysis reactor 2290 at an intermediate stage of construction. In the illustrated stage, the pyrolysis reactor 2290 includes the first tube 2212 and the second tube 2224. The space between the first tube 2212 and the second tube 2224 defines a pyrolysis annulus 2220. Further, the space within the first tube 2212 provides a combustion chamber 2206. As further illustrated in FIG. 22D, the pyrolysis reactor 2290 can also include the rod 2202 positioned within the combustion chamber 2206. During the operation of a reactor system that includes the pyrolysis reactor 2290, heat generated within the combustion chamber 2206 can be transferred to the pyrolysis annulus 2220 via interactions between combustion flames and/or flue gas and the first tube 2212. Further, the rod 2202 can absorb and radiate heat generated from the combustion through the first tube 2212 and into the pyrolysis annulus 2220. The heat, in turn, can drive pyrolysis reactions within the pyrolysis annulus 2220.

Although the embodiments of FIGS. 22A-22D are illustrated and described above with circular cross-sections and a particular ratio of dimensions between the components of the pyrolysis reactor. One of skill in the art will understand that the technology is not so limited. In various other embodiments, other dimensions and/or cross-sectional shapes are incorporated into the pyrolysis reactor. Purely by way of example, the rod, combustion tube, and/or pyrolysis tube can have a rectangular, hexagonal, ovular, and/or any other suitable shape in cross-section.

Figure 23:
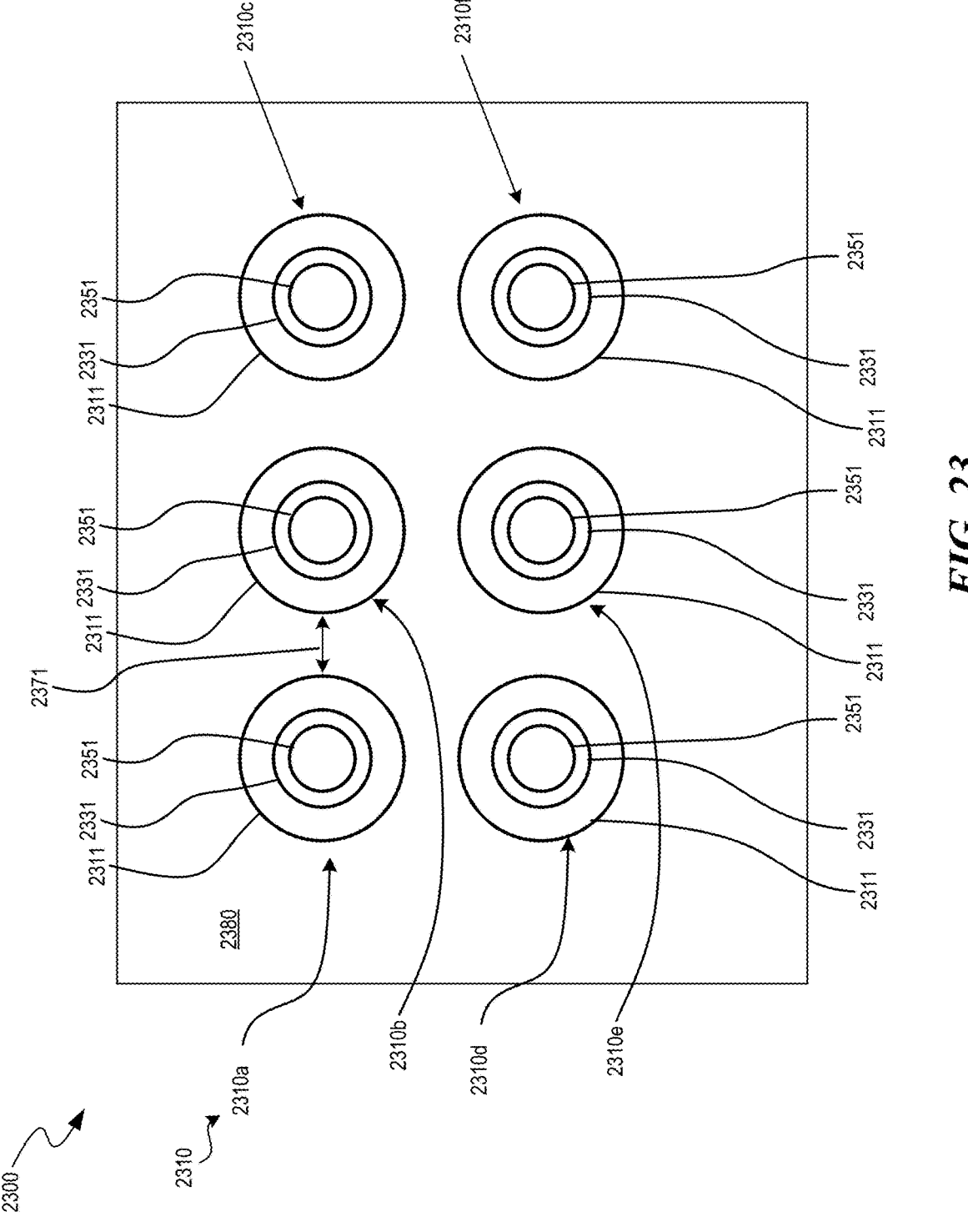
FIG. 23 is a partially schematic top view of a pyrolysis reactor configured in accordance with further embodiments of the present technology.

FIG. 23 is a partially schematic top view of a pyrolysis reactor 2300 configured in accordance with further embodiments of the present technology. The pyrolysis reactor 2300 includes six different reactor chambers 2310 (sometimes referred to individually as "first-sixth annular reactor chambers 2310a-2310f"). Each of the reactor chambers 2310 includes a pyrolysis tube 2311 (e.g., an outermost wall/tube), a combustion tube 2331 (e.g., an intermediate and/or middle wall/tube) coaxial with and within the pyrolysis tube 2311, and a radiation tube 2351 (e.g., an innermost wall/tube) coaxial with and within the combustion tube 2331. As a result of the coaxial positioning, each of the reactor chambers 2310 forms an annular pyrolysis chamber between the pyrolysis tube 2311 and the combustion tube 2331, as well as an annular combustion chamber between the combustion tube 2331 and the radiation tube 2351.

As further illustrated in FIG. 23, each of the reactor chambers 2310 can be constructed to be at least a minimum distance 2371 from a neighboring one of the reactor chambers 2310. In various embodiments, the minimum distance 2371 can be about 4 in., about 1 centimeter (cm), about 10 cm, about 25 cm, about 50 cm, about 100 cm, and/or any other suitable distance. The surrounding reactor material 2380 can be a thermally insulating vacuum, gas, or material, such as concrete, mineral wool, polyurethane foam, polystyrene, cellulose, glass wool, fiberglass, and/or any other suitable material.

It should be understood that while the pyrolysis reactor 2300 is shown with six pyrolysis chambers, other numbers of reactor chambers are possible. Furthermore, while the reactor chambers 2310 are arranged in a rectangular grid pattern, other patterns, such as a triangular or hexagonal arrangement of pyrolysis chambers are possible. Furthermore, while the pyrolysis chambers and combustion chambers are arranged in concentric circular annuluses, other configurations such as neighboring tubes or rectangular cross-sections of pyrolysis and combustion chambers are possible.

V. Representative External Heat Recovery System

Some embodiments can augment the efficiency of pyrolysis operations by recovering heat from the external surface of a pyrolysis system. For example, some embodiments can recover heat from a pyrolysis product stream (e.g., a mixture of $H_2$, solid carbon, unreacted natural gas, and/or byproducts) using various heat recovery components and/or processes. In various embodiments, the pyrolysis system can transfer at least 1%, at least 5%, at least 10%, and/or at least 20% of the heat in the product stream to incoming air, combustion fuel, and/or other components of the pyrolysis system.

As described elsewhere, pyrolysis operations can cause solid carbon to form deposits on reactor walls. These deposits can accumulate over time and require removal to maintain continuous operation. Typical heat exchanger design would reduce hydraulic diameter in small flow areas of a pyrolysis reactor, where carbon deposits could clog or foul the pyrolysis reactor. Further, common heat exchanger surface patterns (e.g., fins, channels, and/or texturing) can also be fouled by carbon particulates in a short period of time. Still further, efficient deposit removal can best be achieved with prismatic shapes. These geometric constraints imposed by the need to run continuously while generating surface deposition can cause a reactor flow to be a laminar flow. However, laminar flow can reduce the overall effectiveness of heat transfer into the heat recycling components compared to a turbulent flow.

Some embodiments can incorporate heat exchangers described in this disclosure to recover heat from the combustion and the pyrolysis exit streams and use the recovered heat to pre-heat the inlet streams to the combustion or pyrolysis sides of the reactor. Some embodiments can use these heat exchangers to overcome limitations with respect to overall reactor size, which limits the available length and surface area for heat transfer.

Figure 24:
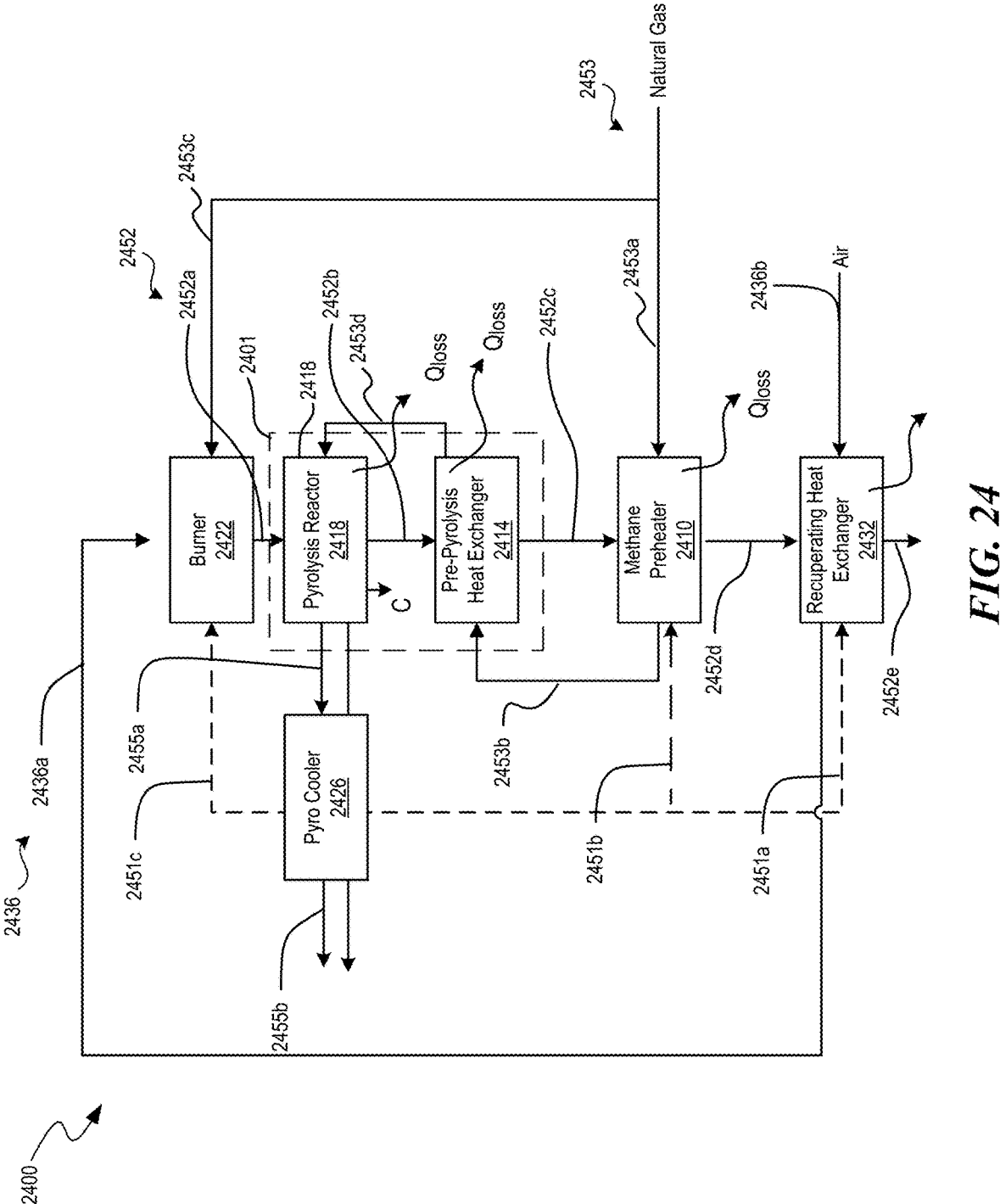
FIG. 24 is a block diagram indicating heat flow recovery in a heat recovery system in accordance with embodiments of the present technology.

FIG. 24 is a block diagram indicating heat flow recovery in a heat recovery system 2400 in accordance with embodiments of the present technology. The heat recovery system 2400 includes a methane preheater 2410, a pre-pyrolysis heat exchanger 2414 that is thermally coupled to the methane preheater 2410 and provides heat to the methane preheater 2410, and a pyrolysis reactor heat exchanger 2418 that obtains excess heat from a pyrolysis reactor 2401 and provides excess heat to the pre-pyrolysis heat exchanger 2414. The heat recovery system 2400 also includes a burner 2422 in thermal contact with at least the pyrolysis reactor heat exchanger 2418 and provides the heat extracted from the pyrolysis reactor heat exchanger 2418. In some embodiments, recycled heat obtained from the pyrolysis reactor heat exchanger 2418 can heat methane, natural gas, or other fluids entering the pyrolysis reactor heat exchanger 2418. The heat recovery system 2400 also includes a pyrolysis cooler 2426 in thermal contact with at least the burner 2422 or the pyrolysis reactor heat exchanger 2418. The pyrolysis cooler 2426 can cool pyrolysis product gas to a target temperature and then can transfer the heat extracted from the pyrolysis product gas to other parts of the system (e.g., via heat flow paths 2451 described in more detail below). The heat recovery system 2400 also includes a recuperating heat exchanger 2432 thermally coupled with the methane preheater 2410 and waste gas from the burner 2422. During the operation of the heat recovery system 2400, the heat recovery system 2400 can extract heat from product gas flow paths 2455a-2455b (e.g., waste heat, excess heat, and/or the like). The heat recovery system 2400 can then send the extracted heat to a combustion chamber, pyrolysis chamber, and/or incoming gasses chamber via a set of heat flow paths 2451a-2451c (collectively referred to as the "heat flow paths 2451"). Additionally, or alternatively, the heat recovery system 2400 can extract heat (e.g., waste heat, excess heat, and/or the like) from one or more flue gas flow paths 2452a-2452e (collectively referred to as the "flue gas flow paths 2452"). The heat recovery system 2400 can then send the extracted heat to a combustion chamber, pyrolysis chamber, and/or incoming gasses. In a specific non-limiting example, the heat recovery system 2400 can use the heat extracted from the product gasses and/or flue gasses to heat one or more flow paths of the natural gas flow paths 2453a-2453d (collectively referred to as the "natural gas flow paths 2453") and/or one or more flow paths of the air flow paths 2436a-2436b (collectively referred to as the "air flow paths 2436"). That is, the heat recovery system 2400 can use the heat extracted from the product gasses and/or flue gasses to pre-heat incoming combustion fuel, pyrolysis feedstock, and/or air.

Said another way, embodiments of the present technology can take advantage of a significant amount of available heat remaining in combustion flue gas produced by the burner 2422. Some embodiments can use the recuperating heat exchanger 2432 to transfer this heat from the flue gas back into the system through either the methane preheater 2410 or the airflow path 2436b. Some embodiments can recover heat from a product gas produced by a pyrolysis system. For example, the pyrolysis reactor heat exchanger 2418 can obtain a portion of heat from a produced gas exiting a pyrolysis chamber and transfer the heat to the methane preheater 2410, the recuperating heat exchanger 2432, or an input gas (e.g., methane, natural gas, air, etc.) of the burner 2422. Some embodiments can incorporate heat exchangers that do not accumulate carbon deposits or otherwise interfere with carbon removal from the reactor.

Figure 25:
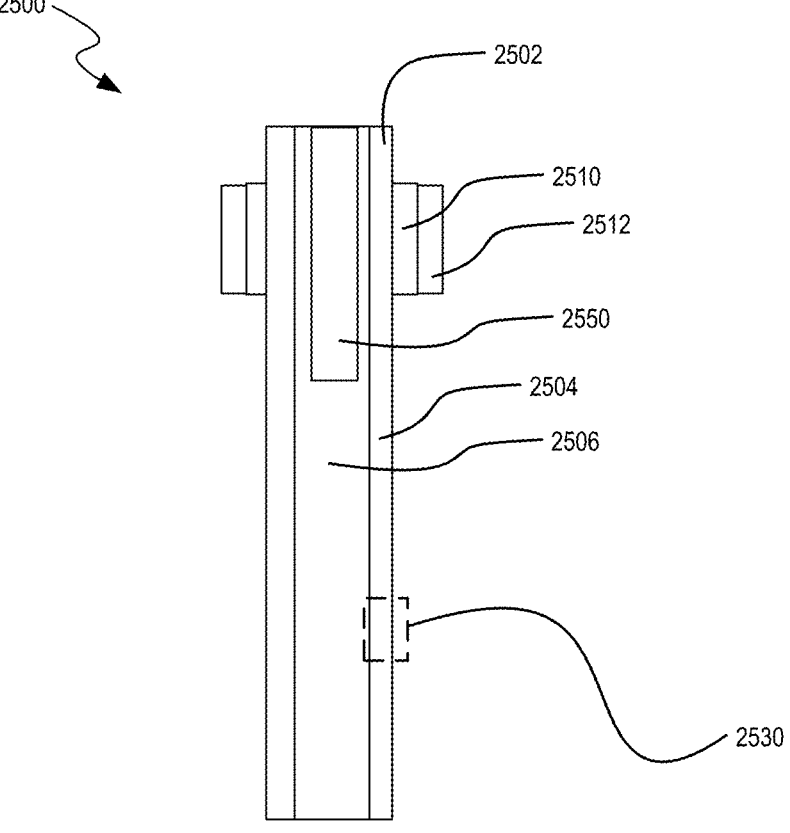
FIG. 25 is a partially schematic cross-sectional view a pyrolysis reactor with a set of heat-exchanging components in accordance with some embodiments of the present technology.

FIG. 25 is a partially schematic cross-sectional view of a pyrolysis reactor 2500 with a set of heat-exchanging components in accordance with some embodiments of the present technology. The pyrolysis reactor 2500 includes an annular pyrolysis chamber 2504 for pyrolysis reactions and a combustion chamber 2506 that is coaxial with and positioned within the annular pyrolysis chamber 2504. The combustion chamber 2506 provides a region for combustion and a flow path for flue gas from the combustion. A burner 2550 positioned at least partially inside the combustion chamber 2506 can drive the combustion. As discussed above, the combustion generates thermal energy that is then carried through the combustion chamber 2506 via the flue gas. As flames from the combustion and/or the flue gas interact with walls of the combustion chamber 2506, at least a portion of the thermal energy is communicated toward the pyrolysis chamber 2506. The thermal energy can then drive a pyrolysis reaction within the pyrolysis chamber 2504, which uses the thermal energy to break down hydrocarbons into a product stream that includes hydrogen gas and solid carbon. In some embodiments, the burner 2550 is operated to provide more thermal energy to the pyrolysis chamber 2504 than is needed to complete a pyrolysis reaction for a volume of pyrolysis feedstock flowing through the pyrolysis chamber 2504. The excess heat can help increase the portion of the pyrolysis feedstock that undergoes the reaction within the pyrolysis chamber 2504 and/or can help break down (or prevent) various byproducts from the reaction. However, the excess heat, if lost to the environment, introduces a source of inefficiency for the pyrolysis reactor 2500.

To help mitigate the loss of excess heat, the pyrolysis reactor 2500 illustrated in FIG. 25 also includes a fluid cooling jacket 2510 surrounding a portion of the annular pyrolysis chamber 2504 and an insulation material 2512 surrounding the fluid cooling jacket 2510. The fluid cooling jacket 2510 can, for example, include a coil that surrounds any suitable length of the annular pyrolysis chamber 2504. As gas flows through an exit port 2502 of an annular pyrolysis chamber 2504, the fluid cooling jacket 2510 can extract heat and transport that heat to another portion of the pyrolysis reactor 2500. For example, the fluid from the fluid cooling jacket 2510 can be thermally coupled to an upstream region 2530 of the pyrolysis chamber 2504. As a result, the fluid cooling jacket 2510 can help heat pyrolysis feedstock in the annular pyrolysis chamber 2504 corresponding with the upstream region 2530, thereby helping ensure the pyrolysis feedstock reaches a reaction temperature with time for the pyrolysis reaction to occur. In another example, the fluid cooling jacket 2510 can be thermally coupled to the pyrolysis feedstock upstream from the pyrolysis reactor 2500 (e.g., to preheat the pyrolysis feedstock), incoming combustion fuel and/or air (e.g., to preheat the combustion fuel and/or air), a peripheral device (e.g., a power generation device and/or a heating device, such as a furnace and/or water heater), and/or any other suitable destination.

Some embodiments can remove carbon particles from the product stream at high temperatures. Doing so can reduce the risk of fouling the heat exchanger with carbon and permit the use of heat exchangers with narrower or more tortuous passages can be used. Furthermore, a high temperature of a carbon-filtered product stream allows more effective heat transfer to the cold stream, which is driven by the difference in temperature between the two streams. Carbon filtering can be performed with the use of a sintered metal filter, a ceramic filter, or some other type of filter.

VI. EXAMPLES

The present technology is illustrated, for example, according to various aspects described below. Various examples of aspects of the present technology are described as numbered examples (A1, A2, A3, . . . B1, B2, B3, etc.) for convenience. These are provided as examples and do not limit the present technology. It is noted that any of the dependent examples can be combined in any suitable manner, and placed into a respective independent example. The other examples can be presented in a similar manner.

Example Set 1: Byproduct Recycler and Control

A.1. A system comprising:

a reaction chamber;

a first fluid separator positioned to receive one or more fluids produced by the reaction chamber;

a combustion chamber in thermal communication with the reaction chamber; and a first valve positioned to control a recycled combustion fuel flow from the first fluid separator to the combustion chamber.

A.2. The system of example A.1, further comprising:

a pyrolysis feedstock supply in fluid communication with the reaction chamber; and a second valve positioned to control a fluid flow between the pyrolysis feedstock supply and the reaction chamber.

A.3. The system of example A.1, further comprising:

an electric energy controller; and a set of electrical heating elements controlled by the electric energy controller, wherein the set of electrical heating elements comprises at least one electrical heating element in thermal communication with the reaction chamber.

A3.1 The system of example A.3 wherein the electrical heating elements are one or more of resistive or heat via microwave or plasma.

A3.2 A system comprising:

a reaction chamber;

a first fluid separator positioned to receive one or more fluids produced by the reaction chamber;

a combustion chamber in thermal communication with the reaction chamber a controller; and a set of heating elements controlled by the controller, wherein the set of heating elements comprises at least one electrical heating element in thermal communication with the reaction chamber.

A.3.3 The system of A.3.2, wherein at the set of heating elements comprises at least one of a solar-powered heating element, geothermal heating element, nuclear-powered heating element, or waste process heating element.

A.4. The system of example A.1, further comprising a byproduct recycler.

A.5. A system comprising one or more processors and a memory storing program instructions that, when executed by the one or more processors, causes the one or more processors to perform operations comprising:

obtaining a set of sensor measurements of a hydrogen production system, wherein the hydrogen production system comprises:

a reaction chamber;

a pyrolysis feedstock supply in fluid communication with the reaction chamber;

a set of heating elements controlled by an electric energy controller, wherein the set of heating elements comprises at least one electrical heating element in thermal communication with the reaction chamber;

a combustion chamber in thermal communication with the reaction chamber;

a combustion fuel supply in fluid communication with the combustion chamber;

a set of valves positioned to control a recycled combustion fuel flow from the reaction chamber to the combustion chamber;

obtaining a target production parameter; and determining a set of operational parameters based on the set of sensor measurements and the target production parameter by:

determining an electrical controller operational parameter based on the target production parameter and the set of sensor measurements; and determining at least one operational parameter for the set of valves based on the electrical controller operational parameter.

A.5.1 A system comprising one or more processors and a memory storing program instructions that, when executed by the one or more processors, causes the one or more processors to perform operations comprising:

obtaining a set of sensor measurements of a hydrogen production system, wherein the hydrogen production system comprises:

a reaction chamber;

a combustion chamber in thermal communication with the reaction chamber; and a set of valves positioned to control a recycled combustion fuel flow from the reaction chamber to the combustion chamber;

obtaining a target production parameter; and determining a set of operational parameters based on the set of sensor measurements and the target production parameter by:

determining an electrical controller operational parameter based on the target production parameter and the set of sensor measurements; and determining at least one operational parameter for the set of valves based on the electrical controller operational parameter.

A.6. The system of example A.5, wherein the target production parameter is a hydrogen production rate of the reaction chamber, a target hydrogen to feedstock conversion ratio, a target carbon dioxide production, avoidance rate, and/or operating cost.

A.7. The system of example A.5, wherein the set of heating elements comprises an electrical heating element in thermal communication with fluid flowing from the combustion fuel supply to the combustion chamber.

A.8. The system of example A.5, wherein the hydrogen production system further comprises an air blower positioned to supply air to the combustion chamber, wherein the set of heating elements comprises an electrical heating element in communication with the air directed from the air blower to the combustion chamber.

A.9. The system of example A.5, wherein the set of heating elements comprises an electrical heating element in thermal communication fluid flowing from the pyrolysis feedstock supply to the reaction chamber.

A.10. The system of examples A5-A9 wherein the electrical heating elements are one or more of resistive or heat via microwave or plasma.

A.11. The system of example A.5, further comprising obtaining a set of other descriptive values, wherein determining the set of operational parameters comprises determining the set of operational parameters based the set of other descriptive values.

A.12. The system of example A.10, wherein the set of other descriptive values comprises at least one of an electricity cost, a hydrocarbon fuel cost, or a carbon dioxide credit cost.

A.13. The system of example A.10, wherein the set of operational parameters is configured such that the heat transferred to the reaction chamber by the combustion chamber is less than the heat transferred to the reaction chamber by the set of heating elements.

A.14. The system of example A.12, wherein the set of operational parameters is configured such that the combustion chamber is deactivated.

A.15. The system of example A.10, wherein the set of operational parameters is configured such that the heat transferred to the reaction chamber by the combustion chamber is greater than the heat transferred to the reaction chamber by the set of heating elements.

A.16. The system of example A.14, wherein the set of operational parameters is configured such that the set of heating elements is deactivated.

A.17. The system of example A.5, wherein the set of operational parameters is a first set of operational parameters, and wherein the operations performed by the one or more processors further comprise:

detecting an update to the set of other descriptive values; and determining a second set of operational parameters based on the updated set of other descriptive values.

A.18. The system of example A.16, wherein a fluid flow of the combustion fuel supply to the combustion chamber indicated by the second set of operational parameters is reduced in comparison to a fluid flow of the combustion fuel supply to the combustion chamber indicated by the first set of operational parameters.

A.19. The system of example A.16, wherein:

the first set of operational parameters is configured such that the heat transferred to the reaction chamber by the combustion chamber is less than the heat transferred to the reaction chamber by the set of heating elements; and the second set of operational parameters is configured such that the heat transferred to the reaction chamber by the combustion chamber is greater than the heat transferred to the reaction chamber by the set of heating elements.

A.20. The system of example A.18, wherein:

the first set of operational parameters is configured such that the heat transferred to the reaction chamber by the combustion chamber is greater than the heat transferred to the reaction chamber by the set of heating elements; and the second set of operational parameters is configured such that the heat transferred to the reaction chamber by the combustion chamber is less than the heat transferred to the reaction chamber by the set of heating elements.

A.21. The system of example A.5, wherein the set of sensor measurements comprises at least one of a temperature, a pressure, a flow rate, a current of a heater of the set of heaters, a voltage of a heater of the set of heaters, or a fluid composition.

A.22. The system of example A.20, wherein the set of sensor measurements comprises at least one of a temperature of the reaction chamber, a pressure of the reaction chamber, a temperature of the combustion chamber, a pressure of the combustion chamber, a current of the electric energy controller, a voltage of the electric energy controller, or a flow rate of fluid through a valve of the set of valves.

A.23. The system of example A.5, wherein the set of valves further comprises a valve to control an amount of recycled fluid that is obtained from the product gas, wherein the recycled fluid is redirected back to the reaction chamber.

A.24. The system of example A.22, further comprising a set of actuators to control the set of valves.

A.25. The system of example A.23, wherein each actuator of the set of actuators is controllable by a set of knobs.

A.26. The system of example A.23, the operations further comprising adjusting at least one of the set of valves by activating an actuator of the set of actuators.

A.27. The system of example A.25, wherein the set of valves comprises:

a first valve controlling a recycled fluid flow stream of a product stream from the reaction chamber; and a second valve controlling the recycled combustion fuel flow, wherein the recycled combustion fuel flow is obtained from the recycled fluid flow stream.

A.28. The system of example A.26, wherein adjusting the at least one of the set of valves comprises adjusting at least one of the first valve or the second valve.

A.29. The system of example A.5, further comprising a byproduct separator, wherein the byproduct separator comprises a byproduct condenser, and wherein the byproduct condenser receives gas produced by the reaction chamber.

A.30. The system of example A.28, wherein the byproduct condenser comprises a primary coalescer, wherein a first valve to controls fluid flow through the primary coalescer.

A.31. The system of example A.29, wherein the byproduct condenser comprise a secondary coalescer, wherein a second valve controls the fluid flow through the secondary coalescer.

A.32. The system of example A.30 wherein the byproduct condenser comprises a condensate reservoir, wherein a third valve controls fluid flow to the condensate reservoir.

A.33. The system of example A.31, the operations further comprising:

closing the second valve; and opening the first valve and the third valve.

A.33.1 The system of example A.31, the operations further comprising:

closing the first valve; and opening the second valve and the third valve.

A.34. The system of example A.28, the operations further comprising redirecting collected byproducts to at least one of the reaction chamber or the combustion chamber.

A.35. The system of example A.5, wherein a feedstock provided by a pyrolysis feedstock supply comprises at least one of methane, ethane, propane, butane, a natural gas mixture, or biogas.

A.36. The system of example A.5, wherein an outlet of the reaction chamber is angled between 10 degrees to 80 degrees with respect to a fluid flow through the reaction chamber.

A.37. The system of example A.5, wherein a bottom of the reaction chamber comprises a flue gas outlet.

A.37.1 The system of example A.5, wherein flow in the reaction chamber is countercurrent with respect to flow in the combustion chamber.

A.37.2 The system of example A.5, wherein flow in the reaction chamber is co-current with respect to flow in the combustion chamber A.38. The system of example A.5, wherein the reaction chamber comprises an annular tube.

A.39. The system of example A.37, the operations further comprising:

directing pyrolysis feedstock gas through an outer tube of the annular tube in a first flow direction; and directing flue gas from the combustion chamber through an inner tube of the annular tube in a counter-current direction with respect to the first flow direction.

A.40. The system of example A.37, wherein the reaction chamber comprises at least one of a rod, a monolith, or a set of beads to increase heat transfer from the inner tube to the outer tube.

A.41. The system of example A.5, the operations further comprising operating flow through the reaction chamber in a laminar regime.

A.42. A method to perform any of the operations described for A.1 to A.40.

A.43. A pyrolysis system, comprising:

a combustion component;

a reaction chamber couplable to a supply of pyrolysis feedstock, wherein the reaction chamber is thermally coupled to the combustion component such that the reaction chamber transfers heat from the combustion component to the pyrolysis feedstock to generate a product stream that includes hydrogen gas and solid carbon; and a recycling component fluidly coupled to an output of the reaction chamber such that the recycling component directs a portion of the hydrogen gas in the product stream into an input channel fluidly coupled to the combustion component.

A.44. The pyrolysis system of example A.43 wherein the product stream further includes byproducts from a pyrolysis reaction, and wherein the recycling component directs at least a portion of the byproducts in the product stream into the input channel toward the combustion component.

A.45. The pyrolysis system of any of examples A.43 and A.44, further comprising a valve fluidly coupled to the input channel, wherein the valve is operable between a first state and a second state, and wherein:

in the first state, the valve allows the portion of the hydrogen gas to flow through the input channel and into the combustion component; and in the second state, the valve prevents the portion of the hydrogen gas from flowing through the input channel and into the combustion component.

A.46. The pyrolysis system of any of examples A.43-A.45, further comprising a valve fluidly coupled to the input channel such that the valve controls a volume of the hydrogen gas flowing through the input channel and into the combustion component.

A.47. The pyrolysis system of claim A.46, further comprising a controller operably coupled to the valve such that the controller sets a position of the valve to adjust the volume of the hydrogen gas flowing through the input channel and into the combustion component.

A.48. The pyrolysis system of claim A.47, further comprising a plurality of sensors operably coupled to the recycling component and the controller such that the plurality of sensors obtain measurements of output parameters related to the product stream and provide the measurements to the controller, and wherein the controller is configured to:

receive the measurements;

determine one or more adjustments to operating parameters of the combustion component; and update a position of the valve based on the one or more adjustments to the operating parameters of the combustion component.

A.49. The pyrolysis system of any of examples A.43-A.48, further comprising a heating element thermally coupled to the product stream between the reaction chamber and the recycling component.

A.50. The pyrolysis system of any of examples A.43-A.49, further comprising a heating element thermally coupled to an input channel for the pyrolysis feedstock upstream from the reaction chamber.

A.51. The pyrolysis system of any of examples A.43-A.50, further comprising a heating element thermally coupled to an input channel for a combustion fuel upstream from the combustion component.

A.52. The pyrolysis system of any of examples A.43-A.51, further comprising a plurality of heating elements thermally coupled to the reaction chamber.

A.53. The pyrolysis system of example A.52 wherein the plurality of heating elements comprise one or more of:

an electric heating element;

a plasma heating element; and/or a microwave heating element.

A.54.1. The pyrolysis system of any of examples A.43-A.53 wherein the recycling component comprises:

a carbon dioxide sequestration component;

a carbon separator;

a byproduct separator downstream from the carbon separator; and a gas separator downstream from the byproduct separator, wherein the byproduct separator includes a first output fluidly couplable to a hydrogen output channel and a second output fluidly coupled to the combustion component via the input channel.

A.54.2. The pyrolysis system of any of examples A.43-A.53, further comprising one or more of:

a carbon dioxide sequestration component (e.g., fluidly coupled to an output of the combustion component and/or an output of the reaction chamber);

a carbon separator fluidly coupled to an output of the reaction chamber;

a byproduct separator fluidly coupled to an output of the reaction chamber; and/or a gas separator fluidly coupled to an output of the reaction chamber, wherein the byproduct separator includes a first output fluidly couplable to a hydrogen output channel and a second output fluidly coupled to the recycling component.

A.55. The pyrolysis system of any of examples A.43-A.54.2 wherein the input channel is a first input channel, wherein the product stream further includes byproducts from a pyrolysis reaction, and wherein the recycling component directs at least a portion of the byproducts in the product stream into a second input channel fluidly coupled to the reaction chamber.

A.56. A method for operating a pyrolysis system, the method comprising:

identifying a target production parameter;

obtaining measurements, via a plurality of sensors in the pyrolysis system, related to a product stream from a reaction chamber in the pyrolysis system;

determining an adjustment to an operating parameter of the pyrolysis system based on the target production parameter and the obtained measurements; and applying the adjustment to the operating parameter to modify operation of the pyrolysis system.

A.57. The method of example A.56 wherein the target production parameter includes one or more of:

a hydrogen production rate of the reaction chamber;

a conversion ratio of hydrogen-to-feedstock;

an emission ratio of carbon dioxide generated by a combustion component of the pyrolysis system to hydrogen produced by the reaction chamber;

an avoidance rate; and/or an operating cost per volume of hydrogen.

A.58. The method of any of examples A.56 and A.57 wherein:

the pyrolysis system comprises a heating element; and the adjustment to the operating parameter comprises an adjustment to the heating element to modify heat produced by the heating element.

A.59. The method of example A.58 wherein the heating element is an electrical heating element, and wherein the adjustment comprises a change to a drive current provided to the heating element.

A.60. The method of any of examples A.58 and A. 59 wherein the heating element is thermally coupled to one of a first input channel to a combustion component of the pyrolysis system, a second input channel to the reaction chamber, the reaction chamber, or output channel between the reaction chamber and a recycling component of the pyrolysis system.

A.61. The method of any of examples A.56-A.60 wherein the heating element is thermally coupled to the reaction chamber, and wherein the adjustment increases heat produced by the heating element to supplement or replace heat from a combustion component.

A.62. The method of any of examples A.56-A.61 wherein:

the pyrolysis system comprises:

a first valve fluidly coupled between a fuel supply and a combustion component of the pyrolysis system; and a second valve fluidly coupled between a recycling component of the pyrolysis system and the combustion component, wherein the recycling component is fluidly coupled to the reaction chamber such that the recycling component receives the product stream from the reaction chamber; and the adjustment to the operating parameter comprises an adjustment to a ratio of hydrocarbon fuel to hydrogen gas combusted by the combustion component via a modification of a first setting of the first valve and a second setting of the second valve.

A.63. The method of example A.62 wherein the modification to the first valve closes the first valve to block hydrocarbon fuel from the combustion component.

A.64. The method of any of examples A.56-A.63, further comprising obtaining a set of descriptive values, wherein determining the adjustment to the operating parameter is further based on the set of descriptive values.

A.65. The method of example A.64 wherein the set of descriptive values comprises one or more of an electricity cost, a hydrocarbon fuel cost, and/or a carbon dioxide credit cost.

A.66. The method of any of examples A.56-A.65 wherein the measurements comprise at least one of a temperature of the product stream, a pressure of the product stream, a flow rate of the product stream, and/or a composition of the product stream.

A.67. The method of any of examples A.56-A.66 wherein:

the measurements are a first set of measurements;

the method further comprises obtaining a second set of measurements from one or more sensors coupled to the pyrolysis system; and determining the adjustment to the operating parameter is further based on the second set of measurements.

A.68. The method of example A.67 wherein the second set of measurements comprise one or more of:

a drive signal at a heating element in the pyrolysis system;

a temperature of the reaction chamber;

a pressure of the reaction chamber;

a temperature of a combustion chamber of the pyrolysis system;

a pressure of the combustion chamber; and/or a flow rate of fluid through a valve in the pyrolysis system.

A.69. The method of any of examples A.56-A.68 wherein applying the adjustment to the operating parameter modifies a volume of hydrogen gas from the product stream that is recycled to a combustion component of the pyrolysis system.

A.70. The method of any of examples A.56-A.69 wherein applying the adjustment to the operating parameter modifies a volume of byproduct gases from the product stream that is recycled to the reaction chamber.

A.71. A system for producing hydrogen gas and solid carbon from a hydrocarbon feedstock, the system comprising:

a reaction chamber fluidly couplable to a supply of the hydrocarbon feedstock;

a combustion component thermally coupled to the reaction chamber, wherein the combustion component is fluidly coupled to a combustion fuel via an input valve;

a plurality of heating elements thermally coupled to the reaction chamber; and a controller operably coupled to the input valve and the plurality of heating elements, the controller comprising at least one processor and a memory storing instructions that, when executed by the at least one processor, cause the controller to:

set a first operational parameter of the input valve such that the input valve controls a volume of combustion fuel flowing into the combustion component and the combustion component provides a first amount of heat to the reaction chamber; and set a second operational parameter the plurality of heating elements such that the plurality of heating elements provide a second amount of heat to the reaction chamber.

A.72. The system of example A.71 wherein the second amount of heat is greater than the first amount of heat.

A.73. The system of example A.71 wherein the second amount of heat is less than the first amount of heat.

A.74. The system of examples A.71 and A. 72 wherein the first operational parameter closes the input valve such that the combustion component provides no heat in the first amount of heat.

A.75. The system of examples A.71 and A.74 wherein the second operational parameter shuts the plurality of heating elements off such that the plurality of heating elements provide no heat in the second amount of heat.

A.76. The system of any of examples A.71-A.75 wherein the instructions further cause the controller to:

identifying a target production parameter;

obtaining measurements, via a plurality of sensors in the system, related to a product stream from the reaction chamber, the product stream comprising the hydrogen gas and the solid carbon; and determining the first operational parameter and the second operational parameter based on the target production parameter and the obtained measurements.

A.77. The system of any of examples A.71-A.76 wherein the input valve is a first input valve, and wherein the system further comprises:

a recycling component fluidly coupled to an output of the reaction chamber such that the recycling component receives a product stream from the reaction chamber, the product stream comprising the hydrogen gas and the solid carbon; and a second input valve fluidly coupled between the recycling component and the combustion component such that the second input valve controls a flow of a portion of the product stream between the recycling component and the combustion component.

A.78. The system of example A.77 wherein the instructions further cause the controller to set a third operational parameter of the second input valve such that the second input valve provides determined volume of the portion of the product stream to the combustion component.

Example Set 2: Burner Design and Operations

B.1. A system comprising:

a burner housing;

a first set of fluid channels inside the burner housing, wherein ends of first set of fluid channels include a first set of orifices; and a second set of fluid channels inside the burner housing, wherein ends of the second set of fluid channels include a second set of orifices.

B.2. The system of example B.1, wherein individual ones of the first set of fluid channels include a plurality of apertures that are less than 4.0 mm.

B.3. The system of example B.1, wherein the first set of fluid channels are positioned to carry a hydrocarbon fuel.

B.4. The system of example B.1, wherein the first set of orifices include an annular orifice.

B.5. The system of example B.1, wherein individual ones of the first set of orifices are directed radially outward with respect to a longitudinal axis of the burner housing.

B.5.1 A system comprising:

a reaction chamber; and a combustion chamber in thermal communication with the reaction chamber, wherein the combustion chamber comprises:

a burner housing;

a first set of fluid channels inside the burner housing, wherein ends of first set of fluid channels include a first set of orifices; and a second set of fluid channels inside the burner housing, wherein ends of the second set of fluid channels include a second set of orifices.

B.6. The system of example B.1, wherein individual ones of the first set of orifices are radially distributed.

B.7. The system of example B.1, wherein individual ones of the first set of orifices are non-perpendicular with respect to individual ones of the second set of orifices.

B.8. The system of example B.1, wherein individual ones of the first set of orifices are at least generally perpendicular to individual ones of the second set of orifices.

B.9. The system of example B.1, further comprising a central housing within the burner housing, wherein:

the central housing is coaxial with the burner housing, individual ones of the first set of orifices are directed towards an axial direction of the central housing;

individual ones of the second set of fluid channels are within the central housing, and individual ones of the second set of are at least generally perpendicular to the first set of orifices.

B.10. The system of example B.1, further comprising:

a face member at an end of the burner housing, wherein the face member comprises a third set of fluid channels that are isolated from the first set of fluid channels and the second set of fluid channels;

a first tube fixed to the face member, wherein the first tube is in fluid communication with the third set of fluid channels; and a second tube fixed to the face member, wherein the second tube is in fluid communication with the third set of fluid channels and the first tube.

B.11. The system of example B.1, wherein:

the first set of orifices comprises a first plurality of orifices, wherein individual orifices of the first plurality of orifices are directed radially outward with respect to a longitudinal axis of the burner housing; and the first set of fluid channels comprises a manifold that extends into the plurality of orifices.

B.12. The system of example B.11, wherein:

the second set of orifices comprises a second plurality of orifices, wherein individual orifices of the second plurality of orifices are directed radially outwards with respect to a longitudinal axis of the burner housing; and the second set of fluid channels comprises a manifold that extends into the plurality of orifices.

B.13. The system of example B.1, wherein:

the second set of orifices comprises a second plurality of orifices, wherein individual orifices of the second plurality of orifices are directed radially outwards; and the second set of fluid channels comprises a manifold that extends into the plurality of orifices.

B.14. The system of example B.1, wherein the burner housing comprises a metal alloy.

B.15. The system of example B.1, wherein the burner housing comprises a Nickel alloy.

B.16. The system of example B.1, wherein the burner housing comprises at least one of the following alloys: UNS 17400, UNS S30300, UNS S30900, UNS S31000, UNS S40300, UNS S44100, UNS N02201, UNS S31600, UNS S30400, UNS K91470, UNS K91670, UNS N02201, UNS NO2200, UNS N10276, or UNS N06002.

B.17. A method for using the system of example B.1 to B.16, comprising:

pumping air through the first set of fluid channels to exit at the first set of orifices;

pumping a fuel through the second set of fluid channels to exit at the second set of orifices, wherein the fuel exiting the second set of orifices combusts with the air exiting the first set of orifices.

B.18. A method for using the system of example B.1 to B.16, comprising:

pumping a fuel through the first set of fluid channels to exit at the first set of orifices;

pumping air through the second set of fluid channels to exit at the second set of orifices, wherein the fuel exiting the first set of orifices combusts with the air exiting the second set of orifices.

B.19. A method comprising:

pumping a fuel through a burner, the burner comprising:

a burner housing;

a first set of fluid channels inside the burner housing, wherein ends of first set of fluid channels comprises a first set of orifices;

a second set of fluid channels inside the burner housing, wherein ends of the second set of fluid channels comprises a second set of orifices;

wherein the pumping the fuel through the burner housing comprises pumping the fuel through the first set of fluid channels; and pumping air through the second set of fluid channels, wherein the fuel exiting the first set of orifices combusts with the air exiting the second set of orifices.

B.20. The method of example B.19, wherein a combustion efficiency of the burner is greater than 75%.

B.21. The method of example B.19, wherein the burner is housed by a combustion chamber wall, further comprising pumping air in an axial direction through the combustion chamber.

B.22. The method of example B.19, wherein a heat flux of the burner is greater than or equal to 400 Watts per square meter.

B.23. The method of example B.19, wherein:

the burner comprises:

a face member at an end of the burner housing, wherein the face member comprises a third set of fluid channels that are isolated from the first set of fluid channels and the second set of fluid channels;

a first tube fixed to the face member, wherein the first tube is in fluid communication with the third set of fluid channels; and a second tube fixed to the face member, wherein the second tube is in fluid communication with the third set of fluid channels and the first tube; and the method further comprises pumping cooling fluid through the first tube, wherein the cooling fluid flows through the face member and the second tube, and wherein the cooling fluid does not flow exit at the first set of orifices or the second set of orifices.

B.24. A pyrolysis reactor, comprising:

a first chamber defining a first flow path;

a second chamber coaxial with and positioned within the first chamber, the second chamber defining a second flow path, and wherein the second flow path is separated from the first flow path by a wall of the second chamber; and a burner positioned at least partially within the second flow path, the burner comprising:

a main body comprising a fuel input channel couplable to a supply of a combustion fuel and an air input channel couplable to an air supply component;

a distal end region comprising a first orifice fluidly coupled to the fuel input channel and a second orifice fluidly coupled to the air input channel, wherein the first orifice and the second orifice are positioned to create a mixture of the combustion fuel and oxygen downstream from the distal end region; and an ignition component positioned to ignite the mixture.

B.25. The pyrolysis reactor of example B.24 wherein the burner further comprises a swirler component coupled between the air input channel and the second orifice.

B.26. The pyrolysis reactor of example B.25 wherein the swirler component comprises a plurality of fins at a non-zero angle with respect to a longitudinal axis of the main body of the burner.

B.27. The pyrolysis reactor of example B.26 wherein the non-zero angle is between about 45 degrees and about 75 degrees.

B.28. The pyrolysis reactor of any of examples B.26 and B.27 wherein individual ones of the plurality of fins have a wall thickness between about 0.03 inches and about 0.125 inches.

B.29. The pyrolysis reactor of any of examples B.26-B.28 wherein individual ones of the plurality of fins extends only along a section of the distal end region, wherein the section has a length between about 0.5 inches and about 1 inch.

B.30. The pyrolysis reactor of any of examples B.24-B.29 wherein the burner does not include stainless steel.

B.31. The pyrolysis reactor of any of examples B.24-B.30 wherein the burner is configured to transfer between 55 percent and 95 percent of heat generated by a combustion of the mixture from the first flow path to the second flow path.

B.32. The pyrolysis reactor of any of examples B.24-B.31 wherein the first orifice is positioned at a non-zero angle with respect to a longitudinal axis of the main body of the burner to direct the combustion fuel radially outward from the burner.

B.33. The pyrolysis reactor of example B.32 wherein the non-zero angle is about 90 degrees.

B.34. The pyrolysis reactor of any of examples B.24-B.33 wherein the second orifice is positioned annularly around the first orifice.

B.35. The pyrolysis reactor of any of examples B.24-B.34 wherein the first orifice is an individual one of a plurality of first orifices arranged annularly around the second orifice.

B.36. The pyrolysis reactor of example B.35 wherein the plurality of first orifices comprises at least twenty orifices.

B.37. The pyrolysis reactor of any of examples B.35 and B. 36 wherein individual ones of the plurality of first orifices have a diameter of at least 0.005 inches.

B.38. The pyrolysis reactor of any of examples B.35-B.37 individual ones of the plurality of first orifices have a diameter of about 0.1 inches, and wherein the second orifice has a diameter of about 0.65 inches.

B.39. The pyrolysis reactor of any of examples B.24-B.38 wherein the distal end region further comprises an output nozzle having a conical distal-most surface, and wherein the first orifice and the second orifice are positioned on the conical distal-most surface.

B.40. The pyrolysis reactor of example B.39 wherein:

the ignition component extends out of an ignition orifice in an intermediate region of the conical distal-most surface;

the first orifice is an individual one of a plurality of first orifices distributed radially around the conical distal-most surface; and the second orifice is an individual one of a plurality of subsets of second orifices, wherein each of the plurality of subsets is positioned radially around a corresponding one of the plurality of first orifices.

B.41. The pyrolysis reactor of example B.40 wherein each of the plurality of subsets of second orifices comprises three second orifices.

B.42. The pyrolysis reactor of any of examples B.24-B.41 wherein the first orifice and the second orifice are positioned to generate a turbulent or laminar flow in the mixture.

B.43. The pyrolysis reactor of any of examples B.24-B.42 wherein burner does not mix the combustion fuel with air from the air supply component until after the combustion fuel flows out of the first orifice and the air flows out of the second orifice.

B.44. The pyrolysis reactor of any of examples B.24-B.43 wherein the first orifice and the second orifice are positioned to create the mixture downstream from the burner.

B.45. The pyrolysis reactor of any of examples B.24-B.44 wherein the combustion fuel comprises natural gas.

B.46. The pyrolysis reactor of any of examples B.24-B.45 wherein the combustion fuel comprises hydrogen gas.

B.47. The pyrolysis reactor of any of examples B.24-B.46 wherein the distal end region has a distalmost surface, and wherein a temperature of the distalmost surface during operation of the pyrolysis reactor is between about 1200° Celsius and about 1400° Celsius.

B.48. The pyrolysis reactor of any of examples B.24-B.47, further comprising a preheating component thermally coupled between a distalmost surface the burner and the fuel input channel to preheat at least a portion of the combustion fuel.

B.49. The pyrolysis reactor of any of examples B.24-B.48 wherein the burner comprises Nickle-200, Nickle-201, Haynes-214, Haynes-230, Inconel-602CA, Inconel-301, Inconel-800H, Inconel-718, Inconel-625, HastelloyX, Ohmalloy-145B, Kanthal APM, and/or Kanthal APMT.

B.50. The pyrolysis reactor of any of examples B.24-B.48 wherein the burner comprises Nickel-201, Haynes-214, Ohmalloy-145B, Kanthal APMT, and/or Inconel-602CA.

B.51. A method for providing heat to a pyrolysis chamber to drive a pyrolysis reaction of a hydrocarbon fuel within the pyrolysis chamber, the method comprising:

delivering, via an output nozzle of a burner component, a combustion fuel to a combustion chamber positioned within the pyrolysis chamber, wherein a first flow path in the combustion chamber is separated from a second flow path in the pyrolysis chamber by an internal wall;

delivering, via the output nozzle, a flow of air to the combustion chamber to create a mixture of the combustion fuel and the flow of air downstream from the output nozzle; and igniting the mixture within the combustion chamber.

B.52. The method of example 51, further comprising transferring at least 65 percent of heat generated by a combustion of the mixture from the first flow path in the combustion chamber to the second flow path in the pyrolysis chamber.

B.53. The method of any of examples B.51 and B.52 wherein delivering the flow of air to the combustion chamber comprises directing the flow of air through a swirler component in the output nozzle to create a vortex flow in the mixture within the combustion chamber.

B.54. The method of any of examples B.51-B.53, further comprising preheating the combustion fuel via heat from a combustion of the mixture.

B.55. The method of any of examples B.51-B.54, further comprising preheating the flow of air via heat from a combustion of the mixture.

B.56. The method of any of examples B.51-B.55 wherein delivering the combustion fuel to the combustion chamber comprises directing the combustion fuel out of a distal end region of the output nozzle at a non-zero angle with respect to a longitudinal axis of the combustion chamber.

B.57. The method of any of examples B.51-B.56 wherein delivering flow of air to the combustion chamber to create the mixture comprises creating a radial component to the first flow path within the combustion chamber.

B.58. The method of any of examples B.51-B.57 wherein delivering flow of air to the combustion chamber to create the mixture comprises creating a transverse component to the first flow path within the combustion chamber.

B.59. The method of any of examples B.51-B.58 wherein delivering flow of air to the combustion chamber to create the mixture comprises creating turbulence in the first flow path within the combustion chamber.

B.60. A combustion component for delivering heat to a pyrolysis reactor, the combustion component comprising:

a main body having a distal end region positionable within a combustion chamber of the pyrolysis reactor, the distal end region comprising a first orifice and a second orifice, wherein the first orifice and the second orifice are positioned to create a mixture of combustion fuel and oxygen within the combustion chamber;

a first input channel extending through the main body and fluidly coupled to the first orifice at the distal end region;

a second input channel extending through the main body and fluidly coupled to the second orifice at the distal end region; and an ignition component positioned to ignite the mixture.

B.61. The combustion component of example B.60, further comprising a flame detection component at the distal end region.

B.62. The combustion component of any of examples B.60 and B.61, further comprising a swirler component positioned at least partially within the second input channel.

B.63. The combustion component of example B.62 wherein the swirler component comprises a plurality of fins at a non-zero angle with respect to a longitudinal axis of the main body.

B.64. The combustion component of any of examples B.60-B.63 wherein the combustion component does not include stainless steel.

B.65. The combustion component of any of examples B.60-B.64 wherein the first orifice is perpendicular to a longitudinal axis of the main body.

B.66. The combustion component of any of examples B.60-B.65 wherein the second orifice forms an annulus around the first orifice.

B.67. The combustion component of any of examples B.60-B.66 wherein the first orifice is one of a plurality of first orifices.

B.68. The combustion component of example B.67 wherein each of the plurality of first orifices is radially inward from the second orifice with respect to a central longitudinal axis of the main body.

B.69. The combustion component of any of examples B.67 and B. 68 wherein each of the plurality of first orifices is radially outward from the second orifice with respect to a central longitudinal axis of the main body.

B.70. The combustion component of any of examples B.60-B.69 wherein the main body includes a distalmost surface at a non-zero angle with respect to a transverse axis of the main body, and wherein the first orifice and the second orifice are each positioned on the distalmost surface.

B.71. The combustion component of example B.70 wherein the distalmost surface is a conical surface.

B72. The combustion component of any of examples B.60-B.71 wherein the first orifice is one of a plurality of first orifices, wherein the second orifice is one of a plurality of second orifices, and wherein each of the plurality of first orifices is radially surrounded by two or more of the plurality of second orifices.

B.73. The combustion component of any of examples B.60-B.72 wherein the first input channel is fluidly isolated from the second input channel proximal from the first orifice and the second orifice.

B.74. The combustion component of any of examples B.60-B.73, further comprising a thermally conductive component thermally coupled to a distalmost surface the main body and the first input channel.

Example Set 3: Reactor Structure and Design Optimization

C.1. A system comprising:

a first tube;

a second tube within the first tube; and a burner disposed inward of the second tube.

C.1.1. A system comprising an array of reactors, wherein a first reactor of the array of reactors comprises the system of C.1, and wherein a second reactor of the array of reactors comprises the system of C.2.

C.2. The system of example C.1, wherein:

the first tube forms an outer wall of a pyrolysis chamber;

the second tube forms an inner wall of a pyrolysis chamber;

the second tube forms an outer wall of the combustion chamber; and at least one of a rod or a third tube is situated inside the combustion chamber.

C.3. The system of example C.1, wherein at least one of the first tube or the second tube comprises a ceramic material.

C.4 The system of example C.1, wherein the first tube is concentric with the second tube and the burner.

C.5. The system of example C.1, further comprising a third tube within the second tube, wherein the third tube is concentric with the second tube.

C.6. The system of example C.1, wherein at least one of the first tube and the second tube vary in diameter along an axial length of the first tube or the second tube.

C.7. The system of example C.1, wherein a gap distance of an annular volume formed by the first tube and the second tube changes at least one position along an axial length of the first tube.

C.8. The system of example C.1, further comprising a rod to retain thermal energy, wherein the rod is inside the second tube.

C.9. The system of example C.1, wherein the first tube and the second tube form at least part of a first reactor subsystem, and wherein the system further comprises:

an insulating material, wherein at least a portion of the first reactor subsystem is embedded in the insulating material; and a second reactor subsystem comprising a third tube and a fourth tube within the third tube, wherein the second reactor subsystem is embedded in the insulating material.

C.10. The system of example C.1, wherein at least one of the first tube or the second tube has length less than or equal to 10 meters.

C.11. A pyrolysis reactor, comprising:

a first tube comprising an end region and defining a first flow path;

a burner coupled to the end region of the first tube such that the burner delivers heat to the first flow path via combustion;

a second tube coaxial with and surrounding the first tube, wherein an annulus between the second tube and the first tube defines a second flow path thermally coupled to the first tube such that a portion of the heat from the combustion is received by the first tube; and a thermal component positioned at least partially within the first tube.

C.12. The pyrolysis reactor of example C.11 wherein the thermal component is configured to increase the portion of the heat from the combustion received by the second flow path.

C.13. The pyrolysis reactor of any of examples C.11 and C.12 wherein the annulus is a second annulus, wherein the thermal component comprises:

a main body restricting the first flow path to a first annulus between the first tube and the main body; and a plurality of conductive balls positioned within the first annulus to absorb at least a portion of the heat from the combustion and communicate (e.g., radiate, convect, and/or conduct) the heat toward the second flow path.

C.14. The pyrolysis reactor of any of examples C.11-C.13 wherein the annulus is a second annulus, wherein the thermal component comprises:

a main body restricting the first flow path to a first annulus between the first tube and the main body; and a plurality of protrusions positioned within the first annulus such that the plurality of protrusions increases interactions between a flue gas from the combustion and the first tube.

C.15. The pyrolysis reactor of any of examples C.11-C.14 wherein the annulus is a second annulus, and wherein the thermal component comprises an inner tube restricting the first flow path to an annulus between the first tube and the inner tube such that the inner tube increases interactions between a flue gas from the combustion and the first tube.

C.16. The pyrolysis reactor of any of examples C.11-C.15 wherein the thermal component comprises a rod extending through at least a portion of the first tube such that the rod absorbs at least a portion of the heat from the combustion and communicates (e.g., radiates, convects, and/or conducts) the heat toward the second flow path.

C.17. The pyrolysis reactor of any of examples C.11-C.17 wherein the thermal component comprises a monolithic structure extending through at least a portion of the first tube.

C.18. The pyrolysis reactor of example C.17 wherein the first flow path and the second flow path travel in generally opposite directions, and wherein the monolithic structure is positioned within a second end region of the first tube.

C.19. The pyrolysis reactor of any of examples C.11-C.17 wherein the first flow path and the second flow are generally parallel.

C.20. The pyrolysis reactor of any of examples C.11-C.17 wherein at least one of the first flow path and the second flow path includes a turn.

C.21. The pyrolysis reactor of any of examples C.11-C.20 wherein the first tube and second tube are each one of a plurality of annular chambers, wherein the burner is one of a plurality of burners each individually positioned within a corresponding one of the plurality of annular chambers, and wherein the thermal component is one of a plurality of thermal components each individually positioned within a corresponding one of the plurality of annular chambers.

C.22. The pyrolysis reactor of any of examples C.11-C.21 wherein the thermal component comprises one or more ceramic balls positioned within the first flow path.

C.23. The pyrolysis reactor any of examples C.11-C.22 wherein the annulus between the second tube and the first tube is configured to create a laminar flow in the second flow path of an incoming pyrolysis gas and outgoing product stream.

C.24. The pyrolysis reactor of any of examples C.11-C.23 wherein a diameter of the second tube varies along a length of the second tube such that a cross-sectional area of the annulus along the length of the second tube varies.

C.25. The pyrolysis reactor of any of examples C.11-C.24 wherein a diameter of the first tube varies along a length of the first tube such that a cross-sectional area of the annulus along the length of the first tube varies.

C.26. The pyrolysis reactor of any of examples C.11-C.25 wherein the burner is configured to create a non-laminar flow within the first flow path adjacent to the burner.

C.27. The pyrolysis reactor of any of examples C.11-C.26 wherein the first tube comprises a ceramic material.

C.28. The pyrolysis reactor of any of examples C.11-C.27, further comprising a heat recycling component thermally coupled between an output of the second flow path and an input of the burner such that the heat recycling component transfers a portion of excess heat in a product stream at the output of the second flow path to the input of the burner.

C.29. A pyrolysis system, comprising:

a combustion chamber comprising an end region and defining a first flow path;

a burner coupled to the end region of the combustion chamber, the burner configured to generate heat via combustion generating a hot flue gas that flows along the first flow path;

a pyrolysis chamber coaxial with and surrounding the combustion chamber, wherein:

the pyrolysis chamber is fluidly couplable to a supply of reaction fuel;

a space between the pyrolysis chamber and the combustion chamber defines a second flow path for the reaction fuel through the pyrolysis chamber;

the second flow path is thermally coupled to the combustion chamber to receive a portion of the heat from the combustion; and the portion of the heat received from the combustion chamber drives a pyrolysis reaction to generate a product stream along the second flow path, the product stream comprising hydrogen gas and solid carbon; and a heat recycling component thermally coupled to an output of the pyrolysis chamber such that the heat recycling component absorbs excess heat from the product stream.

C.30. The pyrolysis system of example C.29 wherein the heat recycling component comprises a heat exchanger thermally coupled to a distal end portion of the pyrolysis chamber.

C.31. The pyrolysis system of any of examples C.29 and C.30 wherein the heat recycling component comprises a heat exchanger positioned at least partially within the second flow path at a distal end portion of the pyrolysis chamber.

C.32. The pyrolysis system of any of examples C.29-C.31 wherein the heat recycling component comprises a fluid coil wrapped around a distal end portion of the pyrolysis chamber.

C.33. The pyrolysis system of examples C.29-C.32 wherein the heat recycling component is further thermally coupled to an input channel for the pyrolysis chamber.

C.34. The pyrolysis system of examples C.29-C.33 wherein the heat recycling component is further thermally coupled to an input channel for the burner.

C.35. The pyrolysis system of examples C.29-C.34 wherein the heat recycling component is further thermally coupled to an input channel for the burner.

C.36. The pyrolysis system of examples C.29-C.35 wherein the heat recycling component is a first heat recycling component, and wherein the pyrolysis system further comprises a second heat recycling component thermally coupled to an output of the combustion chamber to absorb unused heat from the hot flue gas.

C.37. A pyrolysis system, comprising:

a combustion chamber comprising an end region and defining a first flow path;

a combustion component positioned to drive combustion at the end region of the combustion chamber, wherein the combustion generates heat carried by a hot flue gas along the first flow path;

a pyrolysis chamber coaxial with and surrounding the combustion chamber, wherein:

the pyrolysis chamber is fluidly couplable to a supply of reaction fuel;

the pyrolysis chamber defines a second flow path for the reaction fuel through the pyrolysis chamber radially around the combustion chamber; and the second flow path is thermally coupled to the combustion chamber such that the second flow path receives a portion of the heat from the combustion, wherein the portion of the heat drives a pyrolysis reaction along the second flow path; and a heat recycling component thermally coupled to an output of the combustion chamber such that the heat recycling component absorbs unused heat from the hot flue gas.

C.38. The pyrolysis system of example C.37 wherein the heat recycling component comprises a heat exchanger positioned within a third flow path for the output from the heat exchanger.

C.39. The pyrolysis system of any of examples C.37 and C.38 wherein the heat recycling component comprises a heat exchanger positioned at least partially within the first flow path at a distal end portion of the combustion chamber.

C.40. The pyrolysis system of any of examples C.37-C.39 wherein the heat recycling component is further thermally coupled to an input channel for the pyrolysis chamber.

C.41. The pyrolysis system of any of examples C.37-C.40 wherein the heat recycling component is further thermally coupled to an input channel for the combustion chamber.

C.42. The pyrolysis system of any of examples C.37-C.41 wherein the heat recycling component is a first heat recycling component, and wherein the pyrolysis system further comprises a second heat recycling component thermally coupled to an output of the pyrolysis chamber.

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Further, the terms "approximately" and "about" are used herein to mean within at least within 10% of a given value or limit. Purely by way of example, an approximate ratio means within 10% of the given ratio.

Several implementations of the disclosed technology are described above in reference to the figures. The computing devices on which the described technology can be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

From the foregoing, it will also be appreciated that various modifications can be made without deviating from the disclosure or the technology. For example, one of ordinary skill in the art will understand that various components of the technology can be further divided into subcomponents, or that various components and functions of the technology can be combined and integrated. In addition, certain aspects of the technology described in the context of particular embodiments can also be combined or eliminated in other embodiments.

Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

We claim:

1. A pyrolysis system, comprising:

a combustion component;

a reaction chamber couplable to a supply of pyrolysis feedstock, wherein the reaction chamber is thermally coupled to the combustion component such that the reaction chamber transfers heat from the combustion component to the pyrolysis feedstock to generate a product stream that includes hydrogen gas and solid carbon; and a recycling component fluidly coupled to an output of the reaction chamber such that the recycling component directs a portion of the hydrogen gas from the product stream into an input channel fluidly coupled to the combustion component, wherein the recycling component comprises:

a carbon separator;

a byproduct separator downstream from the carbon separator, wherein the byproduct separator is configured to send a partially purified gas product to the reaction chamber and/or the combustion component; and a gas separator downstream from the byproduct separator, wherein the gas separator includes a first output fluidly couplable to a hydrogen output channel and a second output fluidly coupled to the combustion component via the input channel.

2. The pyrolysis system of claim 1 wherein the product stream further includes byproducts from a pyrolysis reaction, and wherein the recycling component directs at least a portion of the byproducts from the product stream into the input channel toward the combustion component.

3. The pyrolysis system of claim 1, further comprising:

a valve fluidly coupled to the input channel such that the valve controls a volume of the hydrogen gas flowing through the input channel and into the combustion component; and a controller operably coupled to the valve such that the controller sets a position of the valve to adjust the volume of the hydrogen gas flowing through the input channel and into the combustion component.

4. The pyrolysis system of claim 1, further comprising a heating element thermally coupled to one of:

the product stream between the reaction chamber and the recycling component;

an input channel for the pyrolysis feedstock upstream from the reaction chamber;

an input channel for a combustion fuel upstream from the combustion component; or the reaction chamber.

5. The pyrolysis system of claim 1 wherein the input channel is a first input channel, wherein the product stream further includes byproducts from a pyrolysis reaction, and wherein the recycling component directs at least a portion of the byproducts from the product stream into a second input channel fluidly coupled to the reaction chamber.

6. The pyrolysis system of claim 1, further comprising a carbon dioxide sequestration component fluidly coupled to an output of the combustion component.

7. The pyrolysis system of claim 1, wherein the reaction chamber is configured to direct a portion of the product stream from the reaction chamber to the input channel fluidly coupled to the combustion component and/or a second input channel fluidly coupled to the reaction chamber.

8. The pyrolysis system of claim 1, wherein:

the recycling component comprises a hydrogen conditioning system; and the hydrogen conditioning system is configured to:

separate at least a portion of the byproducts from the product stream; and direct at least a portion of the separated byproducts to an input stream for the reaction chamber.

9. The pyrolysis system of claim 3, further comprising a plurality of sensors operably coupled to the recycling component and the controller such that the plurality of sensors obtain measurements of output parameters related to the product stream and provide the measurements to the controller, and wherein the controller is configured to:

receive the measurements;

determine one or more adjustments to operating parameters of the combustion component; and update a position of the valve based on the one or more adjustments to the operating parameters of the combustion component.

10. The pyrolysis system of claim 3, wherein:

the controller is configured to balance an amount of hydrogen gas recycled back into the reaction chamber and the combustion component to satisfy one or more targets, the one or more targets comprising at least one of a hydrogen production rate target, a hydrogen gas purity target, a GHG emission target, and a total production rate target.

11. The pyrolysis system of claim 1, wherein: the carbon separator is configured to remove the solid carbon from the product stream; and the carbon separator comprises a third output couplable to the reaction chamber such that at least a portion of the removed solid carbon is directed from the third output to the reaction chamber.

12. The pyrolysis system of claim 1, wherein: the byproduct separator is configured to remove byproducts from the product stream; the byproduct separator comprises a third output couplable to the combustion component and a fourth output couplable to the reaction chamber such that at least a portion of the removed byproducts is directed from the third output to the combustion component and/or from the fourth output to the reaction chamber.

13. The pyrolysis system of claim 1, wherein: the gas separator is configured to separate filtered byproducts and filtered gas product.

14. The pyrolysis system of claim 13, wherein:

the gas separator further comprises a third output fluidly coupled to the reaction chamber; and the gas separator is configured to direct at least a portion of the filtered byproducts from the third output to the reaction chamber and/or from the second output to the combustion component.

15. The pyrolysis system of claim 13, wherein the gas separator is configured to redirect at least a portion of the filtered gas product to the reaction chamber and/or the combustion component.

* * * * *